(12) United States Patent
Kusashima et al.

(10) Patent No.: US 11,716,769 B2
(45) Date of Patent: *Aug. 1, 2023

(54) COMMUNICATION APPARATUS AND COMMUNICATION METHOD

(71) Applicant: SONY GROUP CORPORATION, Tokyo (JP)

(72) Inventors: Naoki Kusashima, Kanagawa (JP); Kazuyuki Shimezawa, Kanagawa (JP); Hiroki Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,915

(22) Filed: Dec. 13, 2021

(65) Prior Publication Data

US 2022/0104282 A1 Mar. 31, 2022

Related U.S. Application Data

(63) Continuation of application No. 16/620,041, filed as application No. PCT/JP2018/018081 on May 10, 2018, now Pat. No. 11,240,851.

(30) Foreign Application Priority Data

Jun. 15, 2017 (JP) .................................. 2017-117977

(51) Int. Cl.
*H04W 74/08* (2009.01)
*H04L 5/00* (2006.01)
(Continued)

(52) U.S. Cl.
CPC ....... *H04W 74/0841* (2013.01); *H04L 5/0048* (2013.01); *H04L 5/0053* (2013.01);
(Continued)

(58) Field of Classification Search
CPC ............. H04W 74/0841; H04W 16/28; H04W 72/042; H04W 72/0446; H04W 74/06;
(Continued)

(56) References Cited

U.S. PATENT DOCUMENTS

| 2016/0234865 | A1 | 8/2016 | Vasukawa et al. |
| 2016/0254894 | A1* | 9/2016 | Tomeba ................ H04L 1/0026 370/329 |
| 2017/0099092 | A1 | 4/2017 | Kakishima et al. |

FOREIGN PATENT DOCUMENTS

| CN | 104541460 A | 4/2015 |
| CN | 105580483 A | 5/2016 |

(Continued)

OTHER PUBLICATIONS

Office Action for JP Patent Application No. 2017-117977 dated Aug. 24, 2021, 03 pages of Office Action and 03 pages of English Translation.

(Continued)

*Primary Examiner* — Dady Chery
(74) *Attorney, Agent, or Firm* — Chip Law Group

(57) ABSTRACT

[Object] To provide a wireless link usable in a more stable manner in a situation where beam management is performed. A communication apparatus includes: a control unit that performs control such that a plurality of reference signals associated with pieces of antenna information different from each other is transmitted to a terminal apparatus; and an acquisition unit that acquires control information corresponding to at least any one of the plurality of reference signals from the terminal apparatus after a random access response in a random access procedure is transmitted to the terminal apparatus. The control unit controls following communication with the terminal apparatus on the basis of the antenna information corresponding to the acquired control information.

17 Claims, 22 Drawing Sheets

(51) Int. Cl.
| | |
|---|---|
| *H04W 16/28* | (2009.01) |
| *H04W 72/0446* | (2023.01) |
| *H04W 74/06* | (2009.01) |
| *H04W 72/23* | (2023.01) |

(52) U.S. Cl.
CPC ....... *H04W 16/28* (2013.01); *H04W 72/0446* (2013.01); *H04W 72/23* (2023.01); *H04W 74/06* (2013.01)

(58) Field of Classification Search
CPC .............. H04W 74/0833; H04W 24/08; H04L 5/0048; H04L 5/0053; H04L 5/0023; H04B 7/0695
See application file for complete search history.

(56) References Cited

FOREIGN PATENT DOCUMENTS

| EP | 2645592 A1 | 10/2013 |
|---|---|---|
| JP | 2015-065603 A | 4/2015 |
| JP | 2015-185954 A | 10/2015 |

OTHER PUBLICATIONS

AT&T., "Considerations on DL Tx Beam Reporting in msg. 3", 3GPP TSG RAN WG1, 89th Meeting, R1-1707749, Hangzhou, China, May 15-19, 2017, 4 pages.

Media TEK Inc., "Simulation on Beam Tracking with SS Block set periodi city consideration", R1-1700161, 3GPP TSG RAN WG1 NR, Ad Hoc Meeting, Spokane, USA, Jan. 16-20, 2017, 6 pages.

"Beam Management Procedure for NR MIMO", Huawei, HiSilicon, 3GPP TSG RAN WG1, 86th Meeting, Gothenburg, Sweden, Aug. 22-26, 2016, 06 pages.

Sony, "Remaining Issues on 4-step RACH Procedure", 3GPP TSG RAN WG1, 89th Meeting, Hangzhou, China, R1-1708252, XP051273445, May 15-19, 2017, 04 pages.

QUALCOMM Incorporated, "4-step RACH procedure consideration", 3GPP TSG-RAN WG1, Meeting 88bis, Spokane, USA, RI-1705572, XP051243700, Apr. 3-7, 2017, 11 pages.

Extended European Search Report of EP Application No. 18817125.0, dated Apr. 8, 2020, 09 pages.

International Search Report and Written Opinion of PCT Application No. PCT/JP2018/018081, dated Jul. 17, 2018, 07 pages of English Translation and 07 pages of ISRWO.

Notice of Allowance for U.S. Appl. No. 16/620,041 dated Dec. 22, 2021, 3 pages.

Notice of Allowance for U.S. Appl. No. 16/620,041 dated Sep. 3, 2021, 6 pages.

Non-Final Office Action for U.S. Appl. No. 16/620,041 dated May 11, 2021, 14 pages.

International Preliminary Report on Patentability of PCT Application No. PCT/JP2018/018081, dated Dec. 26, 2019, 07 pages of English Translation and 04 pages of IPRP.

QUALCOMM Incorporated "4-step Rach procedure consideration", 3GPP TSG-RAN WG1; R 1705572 4-Step Rach Procedure Consideration, 3rd Generation Partnership Project (3GPP), Mobile Competence Centre, 650, Route Des Lucioles, F-06921 Sophia-Antipolis Cedex, France, RAN WG1, No. Spokane, USA; Apr. 3, 2017-Apr. 7, 2017 Apr. 2, 2017, 11 Pages.

AT&T "Considerations on DL Tx Beam Reporting in msg. 3", 3GPP Draft, R M 707749 Considerations on DL TX Beam Reporting in msgs 3, 3rd Generation Partnership Project (3GPP), Mobile Competence Centre, 650, Route Des Lucioles, F-06921 Sophia-Antipolis Cedex, vol. RAN WG1, No. Hangzhou, China; May 15, 2-17-May 19, 2017, May 7, 2017.

Sony "Remaining Issues on 4-step RACH Procedure", 3GPP Draft; R1-1708252—4STEPRACH, 3rd Generation Partnership Project (3GPP), Mobile Competence Centre, 650, Route Des Lucioles, F-06921 Sophia-Antipolis Cedex, France, RAN WG1, No. Hangzhou; May 15, 2017-May 19, 2017, May 19, 2017, 4 Pages.

Office Action for EP Patent Application No. 18817125.0, dated Nov. 30, 2021, 07 pages of Office Action.

* cited by examiner

DOWNLINK TRANSMISSION     UPLINK TRANSMISSION     GP

| TIME INDEX | CRC MASK $<c_0, c_1, ..., c_{15}>$ |
|---|---|
| 0 | $<0,0,0,0,0,0,0,0,0,0,0,0,0,0,0,0>$ |
| 1 | $<1,1,1,1,1,1,1,1,1,1,1,1,1,1,1,1>$ |
| 2 | $<0,1,0,1,0,1,0,1,0,1,0,1,0,1,0,1>$ |
| ⋮ | ⋮ |
| N | $<1,0,1,0,1,0,1,0,1,0,1,0,1,0,1,0>$ |

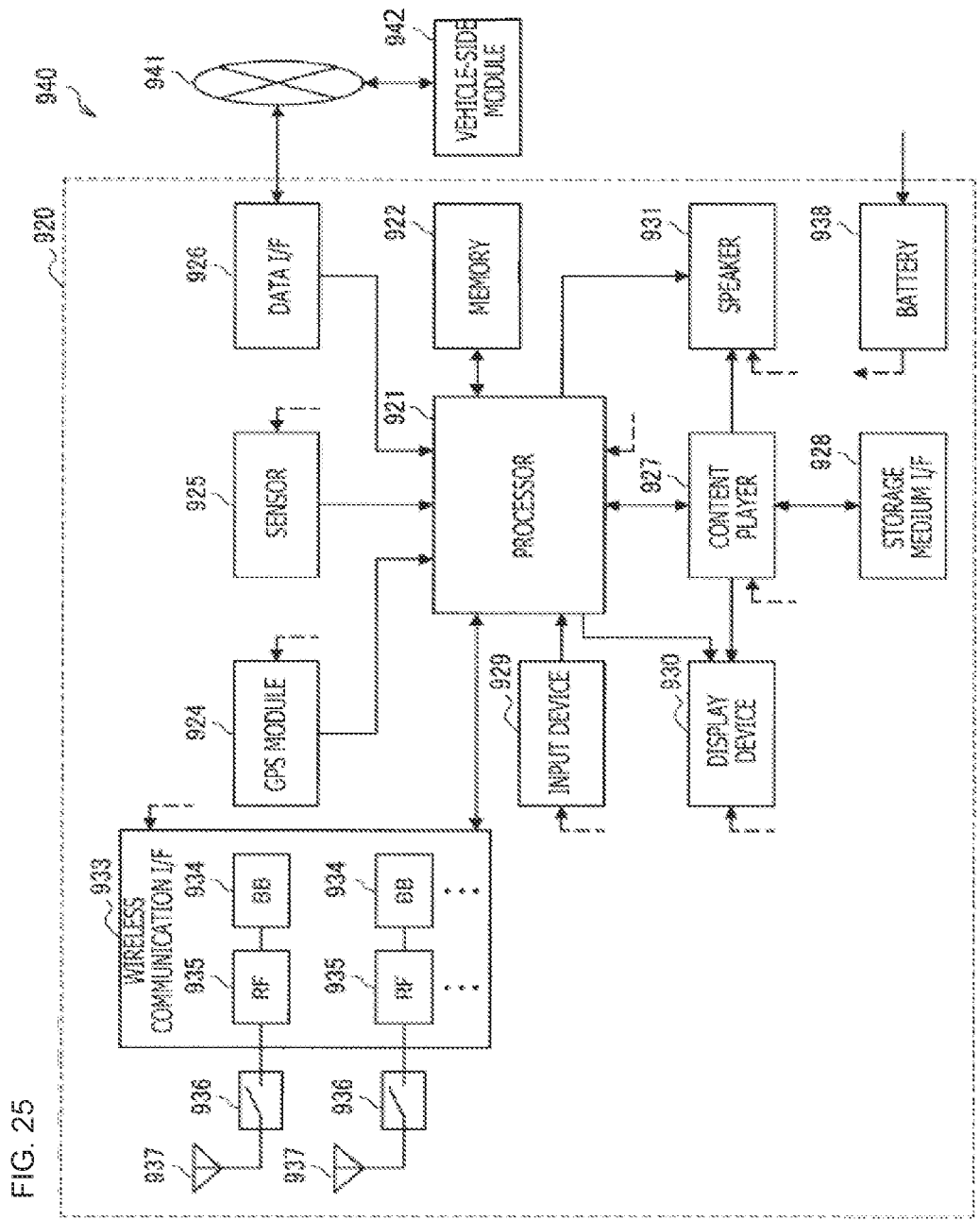

COMMUNICATION APPARATUS AND COMMUNICATION METHOD

CROSS REFERENCE TO RELATED APPLICATIONS

This application is a continuation of U.S. application Ser. No. 16/620,041 filed Dec. 6, 2019 which is a U.S. National Phase of International Patent Application No. PCT/JP2018/018081 filed May 10, 2018, which claims priority benefit of Japanese Patent Application No. JP 2017-117977 filed in the Japan Patent Office on Jun. 15, 2017. Each of the above-referenced applications is hereby incorporated herein by reference in its entirety.

TECHNICAL FIELD

The present disclosure relates to a communication apparatus, a communication method, and a program.

BACKGROUND ART

Wireless access methods and wireless networks of cellular mobile communication (hereinafter also referred to as "Long Term Evolution (LTE)," "LTE-Advanced (LTE-A)," "LTE-Advanced Pro (LTE-A pro)," "New Radio (NR)," "New Radio Access Technology (NRAT)," "Evolved Universal Terrestrial Radio Access (EUTRA)," or "Further EUTRA (FEUTRA)") have been studied in 3rd generation partnership project (3GPP). Note that LTE includes LTE-A, TTE-A pro, and EUTRA, and that NR includes NRAT and FEUTRA in the following description. A base station apparatus (base station) in LTE is also referred to as eNodeB (evolved NodeB). A base station apparatus (base station) in NR is also referred to as gNodeB. A terminal apparatus (mobile station, mobile station apparatus, or terminal) in each of LTE and NR is also referred to as UE (User Equipment). Each of LTE and NR is a cellular communication system where a plurality of areas covered by a base station apparatus is arranged in a form of cells. The single base station apparatus may manage a plurality of cells.

NR as a next-generation wireless access system for LTE is RAT (Radio Access Technology) different from LTE. NR is an access technology capable of coping with various use cases including eMBB (Enhanced mobile broadband), mMTC (Massive machine type communications), and URLLC (Ultra reliable and low latency communications). NR has been studied with an aim of providing a technical framework coping with a use scenario, a requirement condition, an arrangement scenario and the like in each of these use cases of NR.

NR performs beamforming for purposes of coverage extension, high-quality communication and the like. A high-quality link can be provided by aligning directions of transmission and reception beams of a base station apparatus and a terminal apparatus in an appropriate direction. The appropriate beam varies in accordance with a shift of the terminal apparatus and a change of channel quality. Accordingly, beam management is performed between the base station apparatus and the terminal apparatus on each occasion. Details of the beam management are disclosed in NPL 1, for example.

CITATION LIST

Non Patent Literature

[NPL 1]
Huawei, HiSilicon, "Beam Management Procedure for NR MIMO," R1-166089, 3GPP TSG RAN WG1 Meeting #86, Gothenburg, Sweden, August, 2016.

SUMMARY

Technical Problem

Meanwhile, in a situation where the foregoing beam management is performed, it is an important object to provide a wireless link usable in a stable manner. Particularly during a random access procedure, the procedure is difficult to complete in a case where an unstable wireless link is provided between the base station apparatus and the terminal apparatus. In this case, a start of communication may become difficult.

Accordingly, the present disclosure proposes a communication apparatus, a communication method, and a program capable of providing a wireless link usable in a more stable manner in a situation where beam management is performed.

Solution to Problem

Provided according to the present disclosure is a communication apparatus including: a control unit that performs control such that a plurality of reference signals associated with pieces of antenna information different from each other is transmitted to a terminal apparatus; and an acquisition unit that acquires control information corresponding to at least any one of the plurality of reference signals from the terminal apparatus after a random access response in a random access procedure is transmitted to the terminal apparatus. The control unit controls following communication with the terminal apparatus on the basis of the antenna information corresponding to the acquired control information.

In addition, provided according to the present disclosure is a communication apparatus including: a selection unit that selects at least a part of a plurality of reference signals transmitted from a base station and associated with pieces of antenna information different from each other, the part of the plurality of reference signals being selected in accordance with a reception result of the reference signals; and a notice unit that gives a notice of control information corresponding to the selected reference signal to the base station after reception of a random access response transmitted from the base station in a random access procedure.

In addition, provided according to the present disclosure is a communication method performed by a computer, the method including: performing control such that a plurality of reference signals associated with pieces of antenna information different from each other is transmitted to a terminal apparatus; acquiring control information corresponding to at least any one of the plurality of reference signals from the terminal apparatus after a random access response in a random access procedure is transmitted to the terminal apparatus; and controlling following communication with the terminal apparatus on the basis of the antenna information corresponding to the acquired control information.

In addition, provided according to the present disclosure is a communication method performed by a computer, the method including: selecting at least a part of a plurality of reference signals transmitted from a base station and associated with pieces of antenna information different from each other, the part of the plurality of reference signals being selected in accordance with a reception result of the reference signals; and giving a notice of control information corresponding to the selected reference signal to the base station after reception of a random access response transmitted from the base station in a random access procedure.

In addition, provided according to the present disclosure is a program under which a computer executes: performing control such that a plurality of reference signals associated with pieces of antenna information different from each other is transmitted to a terminal apparatus; acquiring control information corresponding to at least any one of the plurality of reference signals from the terminal apparatus after a random access response in a random access procedure is transmitted to the terminal apparatus; and controlling following communication with the terminal apparatus on the basis of the antenna information corresponding to the acquired control information.

In addition, provided according to the present disclosure is a program under which a computer executes: selecting at least a part of a plurality of reference signals transmitted from a base station and associated with pieces of antenna information different from each other, the part of the plurality of reference signals being selected in accordance with a reception result of the reference signals; and giving a notice of control information corresponding to the selected reference signal to the base station after reception of a random access response transmitted from the base station in a random access procedure.

Advantageous Effect of Invention

As described above, provided according to the present disclosure are a communication apparatus, a communication method, and a program capable of providing a wireless link usable in a more stable manner in a situation where beam management is performed.

Note that advantageous effects to be produced are not limited to the advantageous effect described above. Any advantageous effects presented in the present description, or other advantageous effects conceivable from the present description may be produced in addition to or in placed of the advantageous effect described above.

BRIEF DESCRIPTION OF DRAWINGS

FIG. 25 is a block diagram depicting an example of a schematic configuration of a car navigation apparatus.

DESCRIPTION OF EMBODIMENT

Figure 1:
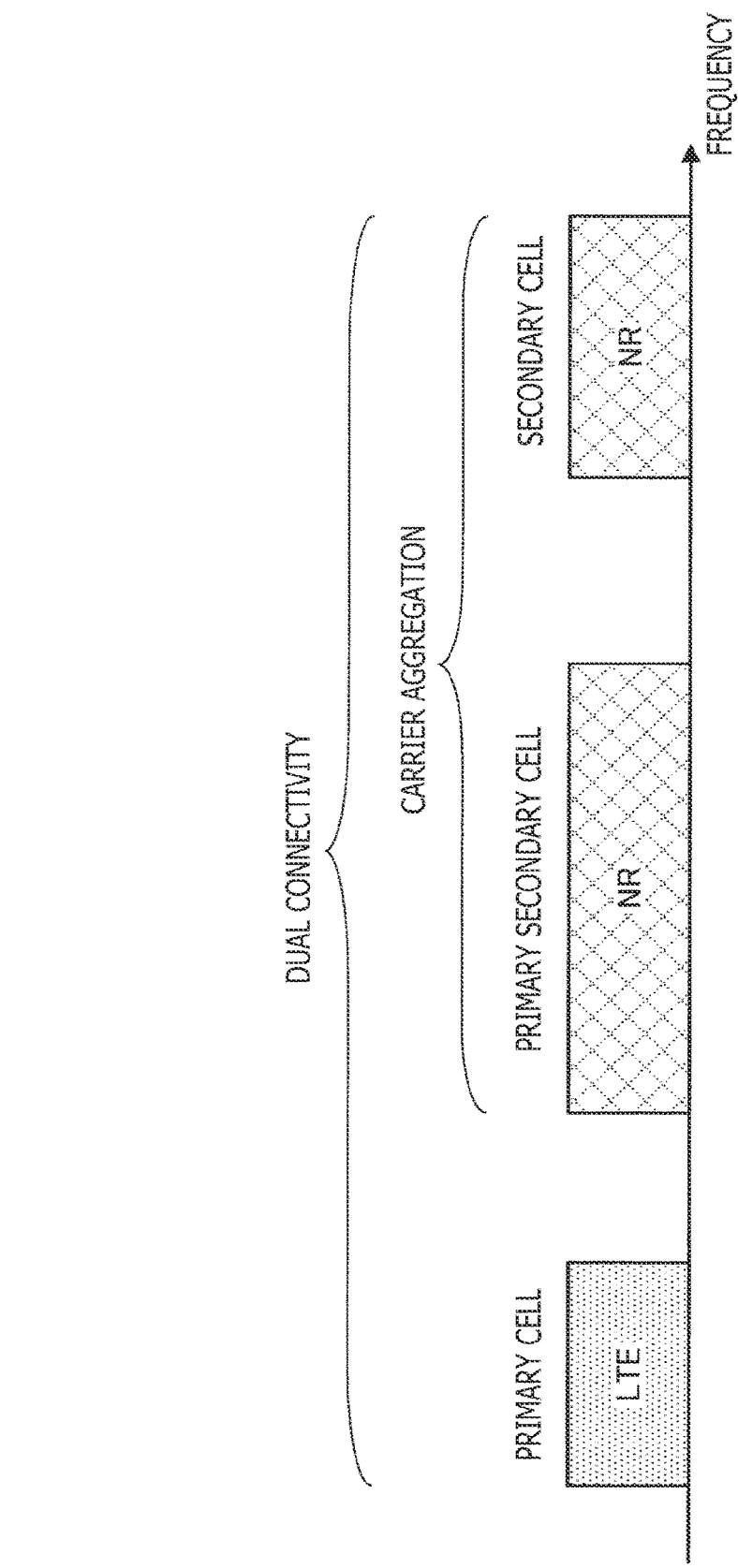
FIG. 1 is a diagram depicting an example of setting of a component carrier according to an embodiment of the present disclosure.

A preferred embodiment according to the present disclosure will be hereinafter described in detail with reference to the accompanying drawings. Note that components having substantially identical functional configurations in the present specification and the drawings are given identical reference numbers, and therefore are not repeatedly described.

Note that the description will be presented in a following order.

1. Embodiment
2. Application Examples
2.1. Application Example of Base Station
2.2. Application Example of Terminal Apparatus
3. Conclusion 1. Embodiment A preferred embodiment according to the present disclosure will be hereinafter described in detail with reference to the accompanying drawings. Note that components having substantially identical functional configurations in the present specification and the drawings are given identical reference numbers, and therefore are not repeatedly described. In addition, all items of the description, such as technologies, functions, methods, configurations, and procedures described hereinafter are applicable to LTE and NR unless otherwise stated.

<Wireless Communication System in Present Embodiment>

A wireless communication system in the present embodiment includes at least a base station apparatus 1 and a terminal apparatus 2. The base station apparatus 1 is capable of containing a plurality of terminal apparatuses. The base station apparatus 1 is connectable to other base station apparatuses by means of an X2 interface. In addition, the base station apparatus 1 is connectable to EPC (Evolved Packed Core) by means of an S1 interface. Moreover, the base station apparatus 1 is connectable to MME (Mobility Management Entity) by means of an S1-MME interface, and is connectable to S-GW (Serving Gateway) by means of an S1-U interface. The S1 interface supports many-to-many connection between MME and/or S-GW and the base station apparatus 1. Furthermore, each of the base station apparatus 1 and the terminal apparatus 2 in the present embodiment supports LTE and/or NR.

<Wireless Access Technology in Present Embodiment>

Each of the base station apparatus 1 and the terminal apparatus 2 in the present embodiment supports one or more wireless access technologies (RATs). For example, The RATs include LTE and NR. The one RAT corresponds to one cell (component carrier). More specifically, in a case where a plural RATs are supported, these RATs are associated with corresponding cells different from each other. Each cell in the present embodiment is constituted by a combination of a downlink resource, an uplink resource, and/or a side link. In addition, in the following description, a cell corresponding to LTE is referred to as an LTE cell, while a cell corresponding to NR is referred to as NR cell. Downlink communication is communication from the base station apparatus 1 to the terminal apparatus 2. Downlink transmission is transmission from the base station apparatus 1 to the terminal apparatus 2, and transmission of a downlink physical channel and/or a downlink physical signal. Uplink communication is communication from the terminal apparatus 2 to the base station apparatus 1. Uplink transmission is transmission from the terminal apparatus 2 to the base station apparatus 1, and transmission of an uplink physical channel and/or an uplink physical signal. Side link communication is communication from the terminal apparatus 2 to another terminal apparatus 2. Side link transmission is transmission from the terminal apparatus 2 to another terminal apparatus 2, and transmission of a side link physical channel and/or a side link physical signal.

The side link communication is defined for near and direct detection and near and direct communication between the terminal apparatuses. The side link communication may have a frame configuration similar to that of the uplink and the downlink. In addition, the side link communication may be limited to a part (sub-set) of the uplink resource and/or the downlink resource.

Each of the base station apparatus 1 and the terminal apparatus 2 is capable of supporting communication which uses an aggregation of one or more cells in each of the downlink, the uplink, and/or the side link. An aggregation of a plurality of cells or communication using an aggregation of a plurality of cells is also referred to as a carrier aggregation or dual connectivity. Details of the carrier aggregation or the dual connectivity will be described below. In addition, each cell uses a predetermined frequency bandwidth. A maximum value, a minimum value, and settable values in the predetermined frequency bandwidth may be specified in advance.

FIG. 1 is a diagram depicting an example of setting of a component carrier according to the present embodiment. In the example of FIG. 1, one LTE cell and two NR cells are set. The one LTE cell is set as a primary cell. The two NR cells are set as a primary secondary cell and a secondary cell, respectively. The two NR cells are converged by carrier aggregation. In addition, the LTE cell and the NR cell are converged by dual connectivity. Note that the LTE cell and the NR cell may be converged by carrier aggregation. In the example of FIG. 1, connection of NR can be assisted by the LTE cell as the primary cell. Accordingly, a part of functions such as a function for achieving stand-alone communication need not be supported. The function for achieving stand-alone communication includes a function necessary for initial connection.

Figure 2:
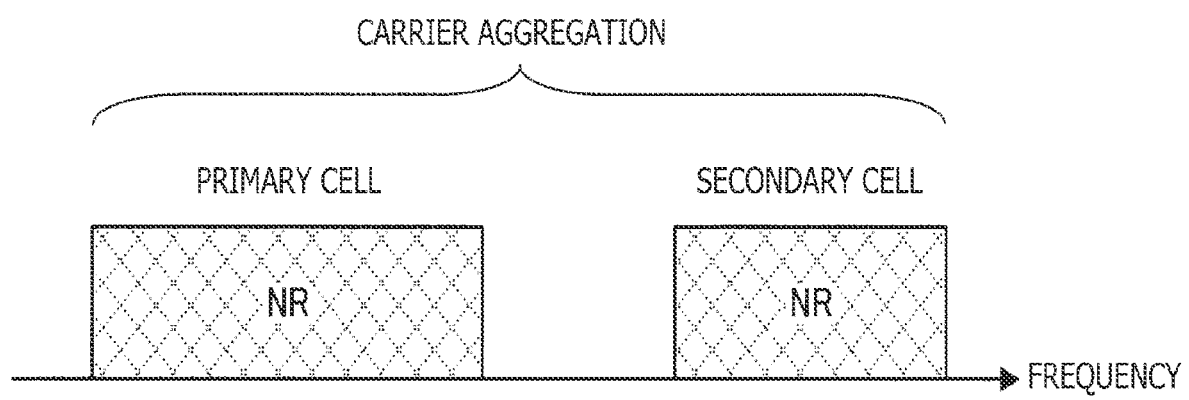
FIG. 2 is a diagram depicting an example of setting of the component carrier according to the embodiment.

FIG. 2 is a diagram depicting an example of setting of the component carrier according to the present embodiment. In the example of FIG. 2, two NR cells are set. The two NR cells are set as a primary cell and a secondary cell, respectively, and converged by carrier aggregation. In this case, the NR cell supports the function for achieving stand-alone communication, wherefore assistance by the LTE cell is unnecessary. Note that the two NR cells may be converged by dual connectivity.

<Wireless Frame Configuration in Present Embodiment>

In the present embodiment, wireless frames (radio frames) each having 10 ms (milliseconds) are specified. Each of the wireless frames includes two half frames. Each of the half frames has a time interval of 5 ms. Each of the half frames includes five sub frames. Each of the sub frames has a time interval of 1 ms, and is defined by two successive slots. Each of the slots has a time interval of 0.5 ms. An ith sub frame in the wireless frame includes a (2×i)th slot and a (2×i+1)th slot. Accordingly, 10 sub frames are specified in each of the wireless frames.

<Frame Configuration of NR in Present Embodiment>

One or more predetermined parameters are used in a predetermined time length (e.g., sub frame) in each of NR cells. More specifically, each of a downlink signal and an uplink signal in the NR cell is generated using one or more predetermined parameters in the predetermined time length. In other words, the terminal apparatus 2 assumes that each of a downlink signal transmitted from the base station apparatus 1, and an uplink signal transmitted to the base station apparatus 1 is generated using one or more predetermined parameters in the predetermined time length. In addition, the base station apparatus 1 can establish settings such that each of a downlink signal transmitted to the terminal apparatus 2, and an uplink signal transmitted from the terminal apparatus 2 is generated using one or more predetermined parameters in the predetermined time length. In a case where a plurality of predetermined parameters is used, signals generated using these predetermined parameters are multiplexed by a predetermined method. Examples of the predetermined method include FDM (Frequency Division Multiplexing), TDM (Time Division Multiplexing), CDM (Code Division Multiplexing), and/or SDM (Spatial Division Multiplexing).

Figure 3:
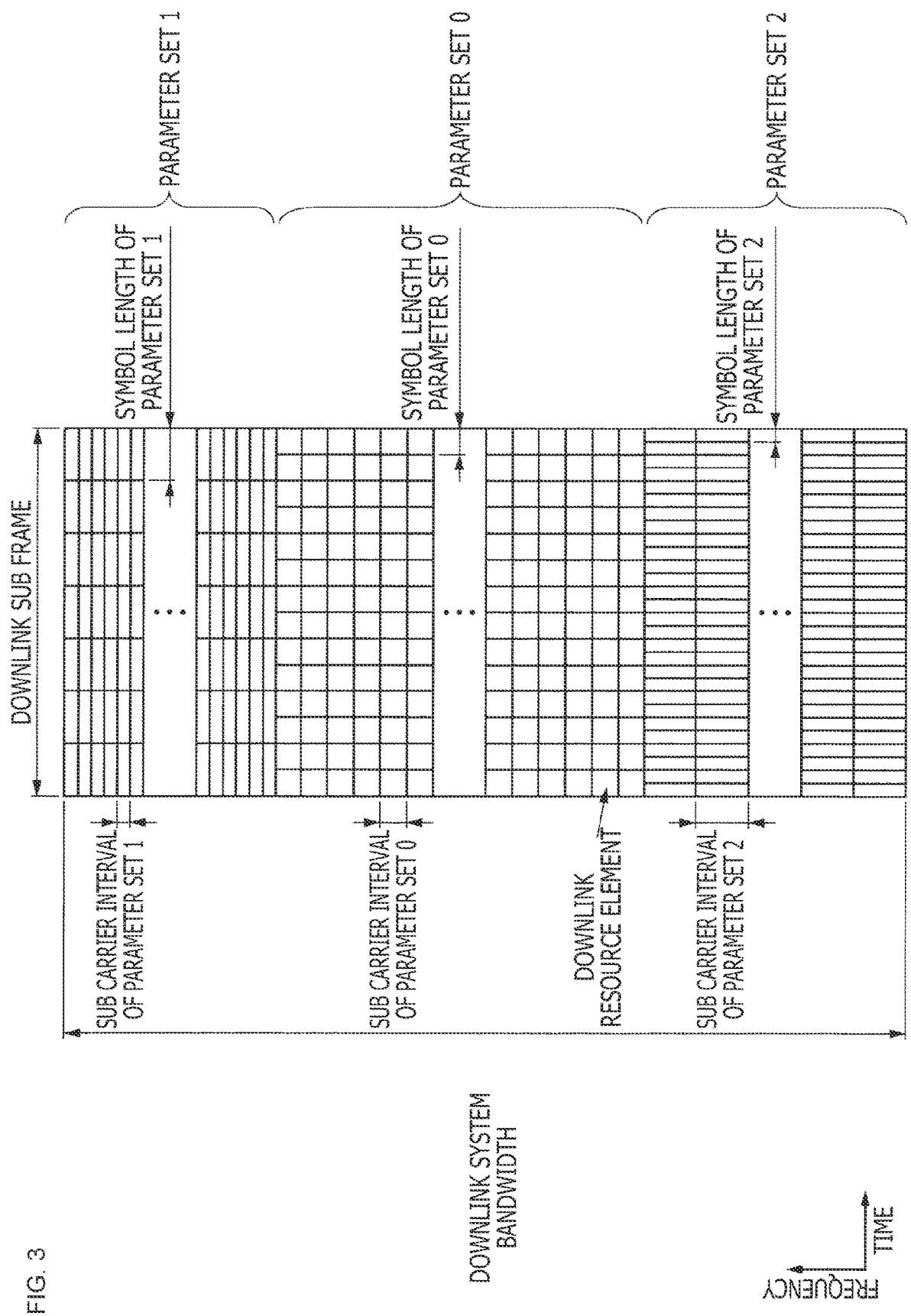
FIG. 3 is a diagram depicting an example of a downlink sub frame of NR according to the embodiment.

FIG. 3 is a diagram depicting an example of the downlink sub frame of NR in the present embodiment. In the example of FIG. 3, signals each generated using a parameter set 1, a parameter set 0, and a parameter set 2 are multiplexed by FDM in a cell (system bandwidth). The diagram depicted in FIG. 3 is also referred to as a downlink resource grid of NR.

The base station apparatus 1 is capable of transmitting a downlink physical channel of NR and/or a downlink physical signal of NR in a downlink sub frame to the terminal apparatus 2. The terminal apparatus 2 is capable of receiving a downlink physical channel of NR and/or a downlink physical signal of NR in a downlink sub frame from the base station apparatus 1.

Figure 4:
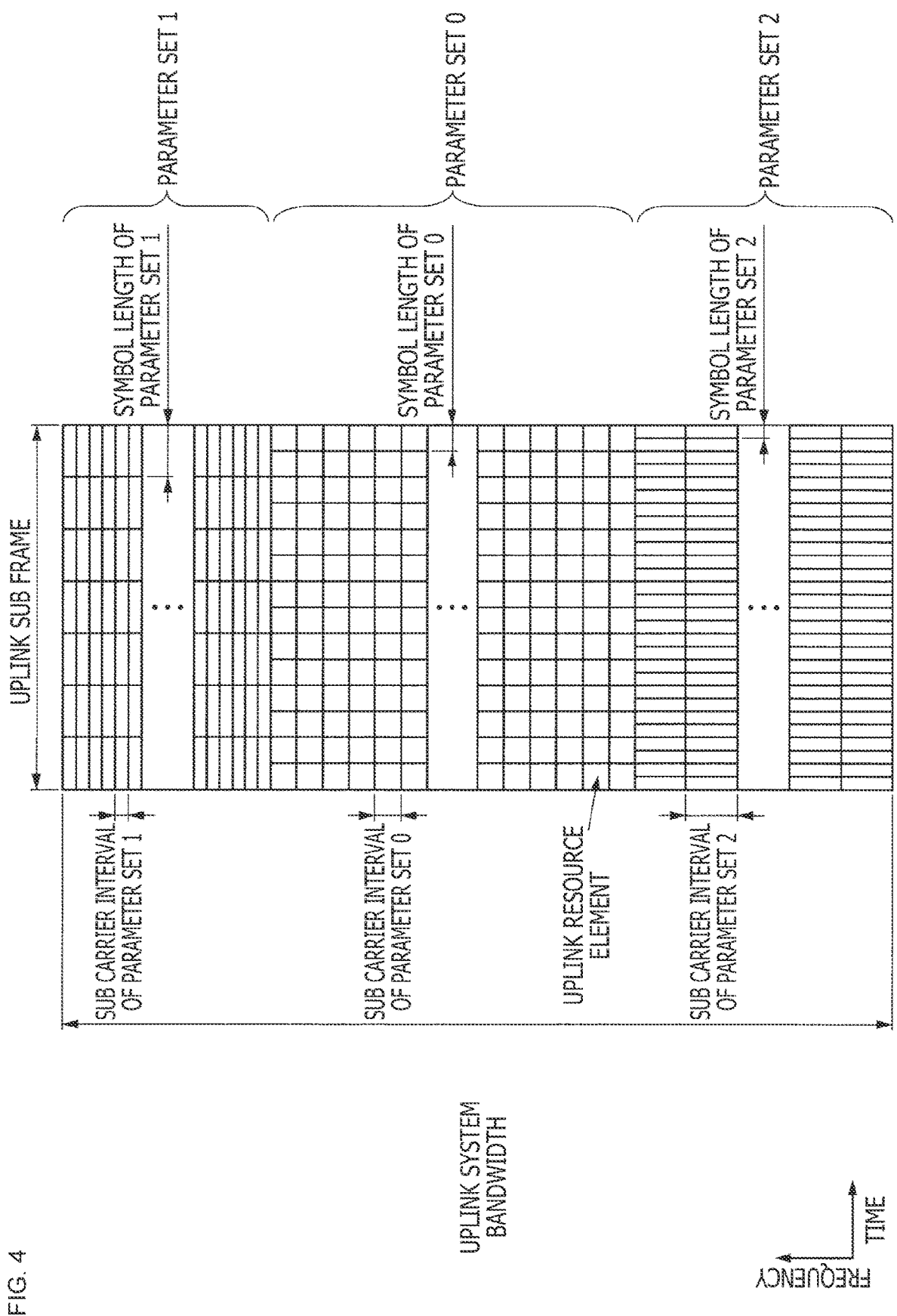
FIG. 4 is a diagram depicting an example of an uplink sub frame of NR according to the embodiment.

FIG. 4 is a diagram depicting an example of an uplink sub frame of NR in the present embodiment. In the example of FIG. 4, signals each generated using the parameter set 1, the parameter set 0, and the parameter set 2 are multiplexed by FDM in a cell (system bandwidth). The diagram depicted in FIG. 3 is also referred to as an uplink resource grid of NR. The base station apparatus 1 is capable of transmitting an uplink physical channel of NR and/or an uplink physical signal of NR in an uplink sub frame to the terminal apparatus 2. The terminal apparatus 2 is capable of receiving an uplink physical channel of NR and/or an uplink physical signal of NR in an uplink sub frame from the base station apparatus 1.

For example, a physical resource may be defined in a following manner in the present embodiment. One slot is defined by a plurality of symbols. A physical signal or a physical channel transmitted in each slot is represented by a resource grid. A resource grid in a downlink may be defined by a plurality of sub carriers in a frequency direction, and a plurality of OFDM symbols in a time direction. In addition, a resource grid in an uplink may be defined by a plurality of sub carriers in the frequency direction, and a plurality of OFDM symbols or SC-FDMA symbols in the time direction. The number of the sub carriers or resource blocks may be determined in accordance with the bandwidth of the cell. For example, the number of symbols in one slot may be determined in accordance with the type of CP (Cyclic Prefix). Examples of the types of CP include a normal CP and an extension CP. In the normal CP, the number of OFDM symbols or SC-FDMA symbols constituting one slot is 7. In the extension CP, the number of OFDM symbols or SC-FDMA symbols constituting one slot is 6. Each of elements within the resource grid is referred to as a resource element. Each of the resource elements is identified by using an index (number) of the sub carrier and an index (number) of the symbol. Note that the OFDM symbol or the SC-FDMA symbol is also simply referred to as a symbol in the description of the present embodiment.

A resource block is used for mapping a certain physical channel (e.g., PDSCH or PUSCH) to a resource element. The resource block may include a virtual resource block and a physical resource block, for example. A certain physical channel is mapped to the virtual resource block. The virtual resource block is mapped to the physical resource block. One physical resource block is defined by a predetermined number of successive symbols in a time range, for example. In addition, one physical resource block is defined by a predetermined number of successive sub carriers in a frequency range, for example. The number of symbols and the number of sub carriers in one physical resource block are determined on the basis of parameters or the like set in accordance with the type of CP, a sub carrier interval, and/or an upper layer in the corresponding cell. For example, in a case where the type of CP is a normal CP with the sub carrier interval of 15 kHz, the number of symbols and the number of sub carriers are 7 and 12, respectively, in one physical resource block. In this case, therefore, each of the physical resource blocks includes (7×12) resource elements. The physical resource blocks are given numbers starting from 0 in the frequency range. In addition, two resource blocks within one sub frame, with each of which an identical physical resource block number is associated, are defined as a physical resource block pair (PRB pair, RB pair).

<Antenna Port in Present Embodiment>

An antenna port is defined to estimate a propagation channel carrying a certain symbol from a propagation channel carrying another symbol in an identical antenna port. For example, it is assumable that different physical resources in an identical antenna port are transmitted by an identical propagation channel. In other words, a symbol in a certain antenna port can be demodulated by estimating a propagation channel on the basis of a reference signal in the corresponding antenna port. In addition, one resource grid is present for each antenna port. Each antenna port is defined by a reference signal. Furthermore, each reference signal can define a plurality of antenna ports.

Respective antenna ports are specified or identified by antenna port numbers. For example, antenna ports 0 to 3 are antenna ports through which CRS is transmitted. Accordingly, a PDSCH transmitted through the antenna ports 0 to 3 is demodulated by CRS corresponding to the antenna ports 0 to 3.

In a case where two antenna ports meet a predetermined condition, the two antenna ports are allowed to be expressed as ports exhibiting quasi co-location (QCL). The predetermined condition is a condition that wide-range characteristics of a propagation channel carrying a symbol in a certain antenna port can be estimated from a propagation channel carrying a symbol in another antenna port. The wide-range characteristics include a delay dispersion, a Doppler spread, a Doppler shift, and an average gain and/or an average delay.

In the present embodiment, a different antenna port number may be defined for each RAT, or a common antenna port number may be defined for RATs. For example, the antenna ports 0 to 3 in LTE are antenna ports in which CRS is transmitted. The antenna ports 0 to 3 in NR may be considered as antenna ports in which CRS is transmitted similarly to those in LTE. In addition, the antenna ports in which CRS is transmitted in NR similarly to those in LTE may have antenna port numbers different from the antenna ports 0 to 3. In the description of the present embodiment, the predetermined antenna port numbers are applicable to LTE and/or NR.

<Downlink Physical Channel in Present Embodiment>

A PBCH is used to give a notification of an MIB (Master Information Block) which is notification information peculiar to a serving cell of the base station apparatus 1. An SFN is a wireless frame number (system frame number). The MIB is system information. For example, the MIB includes information indicating the SFN.

Each of the PDCCH and the EPDCCH is used to transmit downlink control information (DCI). Mapping of information bits of the downlink control information is defined as a DCI format. The downlink control information includes a downlink grant and an uplink grant. The downlink grant is also referred to as downlink assignment or downlink allocation.

The PDCCH is transmitted by one or a plurality of aggregations of successive CCEs (Control Channel Elements). Each of the CCEs includes nine REGs (Resource Element Groups). Each of the REGs includes four resource elements. In a case where the PDCCH includes the n successive CCEs, the PDCCH starts from the CCE which meets a condition that a remainder obtained by dividing i as an index (number) of the CCE by n becomes 0.

The EPDCCH is transmitted by one or a plurality of aggregations of successive ECCEs (Enhanced Control Channel Elements). Each of the ECCEs includes a plurality of EREGs (Enhanced Resource Element Groups).

The downlink grant is used for scheduling of the PDSCH in a certain cell. The downlink grant is used for scheduling the PDSCH in a sub frame identical to a sub frame in which the corresponding downlink grant is transmitted. The uplink grant is used for scheduling the PUSCH in a certain cell. The uplink grant is used for scheduling of the single PUSCH within a sub frame four or more after a sub frame in which the corresponding uplink grant is transmitted.

CRC (Cyclic Redundancy Check) parity bits are added to the DCI. The CRC parity bits are scrambled by an RNTI (Radio Network Temporary Identifier). The RNTI is an identifier capable of determining specification or setting in accordance with a purpose of the DCI or the like. The RNTI is an identifier specified beforehand in specifications, an identifier set as information peculiar to a cell, an identifier set as information peculiar to the terminal apparatus 2, or an identifier set as information peculiar to a group belonging to the terminal apparatus 2. For example, the terminal apparatus 2 descrambles the CRC parity bits given to the DCI on the basis of a predetermined RNTI in monitoring the PDCCH or the EPDCCH to identify whether the CRC is correct. In a case where the CRC is correct, it is recognizable that the corresponding DCI is DCI for the terminal apparatus 2.

The PDSCH is used for transmitting downlink data (Downlink Shared Channel: DL-SCH). In addition, the PDSCH is also used for transmitting control information in an upper layer.

In a PDCCH range, a plurality of PDCCHs may be multiplexed by frequency, time, and/or space multiplexing. In an EPDCCH range, a plurality of EPDCCHs may be multiplexed by frequency, time, and/or space multiplexing. In a PDSCH range, a plurality of the PDSCHs may be multiplexed by frequency, time, and/or space multiplexing. The PDCCH, the PDSCH, and/or the EPDCCH may be multiplexed by frequency, time, and/or space multiplexing.

<Downlink Physical Signal in Present Embodiment>

A synchronization signal is used for achieving synchronization of a frequency range and/or a time range of downlinks by the terminal apparatus 2. The synchronization signal includes a PSS (Primary Synchronization Signal) and an SSS (Secondary Synchronization Signal). The synchronization signal is arranged in a predetermined sub frame within a wireless frame. For example, the synchronization signal is arranged in each of sub frames 0, 1, 5, and 6 within a wireless frame in TDD method. The synchronization signal is arranged in each of sub frames 0 and 5 within a wireless frame in FDD method.

The PSS may be used for rough frame/symbol timing synchronization (synchronization in time range), and identification of a cell identification group. The SSS may be used for more accurate frame timing synchronization and cell identification, and detection of a CP length. Accordingly, frame timing synchronization and cell identification are achievable by using the PSS and the SSS.

A downlink reference signal is used for performing estimation of a propagation path of a downlink physical channel, propagation path correction, calculation of CSI (Channel State Information) associated with a downlink, and/or measurement for positioning of the terminal apparatus 2 by the terminal apparatus 2.

URS associated with the PDSCH is transmitted in a sub frame and a band range used for transmission of the PDSCH with which the URS is associated. The URS is used for demodulation of the PDSCH with which the URS is associated. The URS associated with the PDSCH is transmitted through one or a plurality of antenna ports 5 and 7 to 14.

The PDSCH is transmitted through an antenna port used for transmission of the CRS or the URS on the basis of a transmission mode and a DCI format. A DCI format 1A is used for scheduling the PDSCH transmitted through the antenna port used for transmission of the CRS. A DCI format 2D is used for scheduling the PDSCH transmitted through the antenna port used for transmission of the URS.

DMRS associated with the EPDCCH is transmitted in a sub frame and a band range used for transmission of the EPDCCH with which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or a plurality of antenna ports 107 to 114.

CSI-RS is transmitted in a set sub frame. A resource for transmission of the CSI-RS is set by the base station apparatus 1. The CSI-RS is used for calculating channel state information associated with a downlink by the terminal apparatus 2. The terminal apparatus 2 performs signal measurement (channel measurement) using the CSI-RS. The CSI-RS supports setting of a part or all of antenna ports 1, 2, 4, 8, 12, 16, 24, and 32. The CSI-RS is transmitted through one or a plurality of antenna ports 15 to 46. Note that the antenna ports to be supported may be determined on the basis of a terminal apparatus capability, settings of RRC parameters, and/or a transmission mode to be set of the terminal apparatus 2, for example.

A resource of ZP CSI-RS is set by the upper layer. The resource of the ZP CSI-RS may be transmitted by power of zero output. In other words, transmission of no resource of the ZP CSI-RS is allowed. The PDSCH and the EPDCCH are not transmitted by the set resource of the ZP CSI-RS. For example, the resource of the ZP CSI-RS is used for transmission of the NZP CSI-RS by a neighbor cell. In addition, for example, the resource of the ZP CSI-RS is used for measuring CSI-IM. In addition, for example, the resource of the ZP CSI-RS is a resource by which predetermined channels such as the PDSCH are not transmitted. In other words, the predetermined channels are mapped by resources except for the resource of the ZP CSI-RS (rate-matched, punctured).

<Uplink Physical Channel in Present Embodiment>

The PUCCH is a physical channel used for transmitting uplink control information (UCI). The uplink control information includes channel state information (CSI) associated with a downlink, a scheduling request (SR) indicating a request for a PUSCH resource, and HARQ-ACK for downlink data (Transport block: TB, Downlink-Shared Channel: DL-SCH). The HARQ-ACK is also referred to as ACK/NACK, HARQ feedback, or response information. In addition, The HARQ-ACK for downlink data indicates ACK, NACK, or DTX.

The PUSCH is a physical channel used for transmitting uplink data (Uplink-Shared Channel: UL-SCH). In addition, the PUSCH may be used for transmitting the HARQ-ACK and/or channel state information together with uplink data. Furthermore, the PUSCH may be used for transmitting only channel state information, or only the HARQ-ACK and channel state information.

The PRACH is a physical channel used for transmitting a random access preamble. The PRACH can be used for synchronization with the base station apparatus 1 in a time range by the terminal apparatus 2. In addition, the PRACH is also used to indicate an initial connection establishment procedure (process), a handover procedure, a connection re-establishment procedure, synchronization with uplink transmission (timing adjustment), and/or a request for a PUSCH resource.

In a PUCCH range, a plurality of the PUCCHs is multiplexed by frequency, time, space, and/or code multiplexing. In a PUSCH range, a plurality of the PUSCHs may be multiplexed by frequency, time, space, and/or code multiplexing. The PUCCH and the PUSCH may be multiplexed by frequency, time, space, and/or code multiplexing. The PRACH may be arranged in a single sub frame or two sub frames. A plurality of the PRACHs may be multiplexed by code multiplexing.

<Uplink Physical Signal in Present Embodiment>

UL-DMRS is associated with transmission of the PUSCH or the PUCCH. The UL-DMRS is multiplexed with the PUSCH or the PUCCH by time multiplexing. The base station apparatus 1 may use the UL-DMRS to perform propagation path correction of the PUSCH or the PUCCH. In the description of the present embodiment, transmission of the PUSCH includes transmission with multiplexing of the PUSCH and the UL-DMRS. In the description of the present embodiment, transmission of PUCCH includes transmission with multiplexing of the PUCCH and the UL-DMRS.

SRS is not associated with transmission of the PUSCH or the PUCCH. The base station apparatus 1 may use the SRS for measuring a channel state of an uplink.

The SRS is transmitted using a final symbol within an uplink sub frame. In other words, the SRS is arranged in the final symbol within the uplink sub frame. The terminal apparatus 2 is capable of limiting synchronous transmission of the SRS, the PUCCH, the PUSCH, and/or the PRACH in a certain symbol of a certain cell. The terminal apparatus 2 is capable of transmitting the PUSCH and/or the PUCCH using symbols except for a final symbol within a certain uplink sub frame in a certain cell, and transmitting the SRS using the final symbol within the uplink sub frame. Accordingly, the terminal apparatus 2 is capable of transmitting the SRS, the PUSCH, and the PUCCH in a certain uplink sub frame of a certain cell.

In an SRS, a trigger type 0SRS and a trigger type 1SRS are defined as different trigger types of the SRS. The trigger type 0SRS is transmitted by upper layer signaling in a case where a parameter associated with the trigger type 0SRS is set. The trigger type 1SRS is transmitted by upper layer signaling in a case where a parameter associated with the trigger type 1SRS is set, with transmission requested by an SRS request included in a DCI format 0, 1A, 2B, 2C, 2D, or 4. Note that the SRS request is included in both the FDD and the TDD for the DCI format 0, 1A, or 4, and included only in the TDD for the DCI format 2B, 2C, or 2D. In a case where transmission of the trigger type 0SRS and transmission of the trigger type 1SRS occur in the same sub frame of the same serving cell, transmission of the trigger type 1SRS is given priority. The trigger type 0SRS is also referred to as periodic SRS. The trigger type 1SRS is also referred to as aperiodic SRS.

<Configuration Example of Base Station Apparatus 1 in Present Embodiment>

Figure 5:
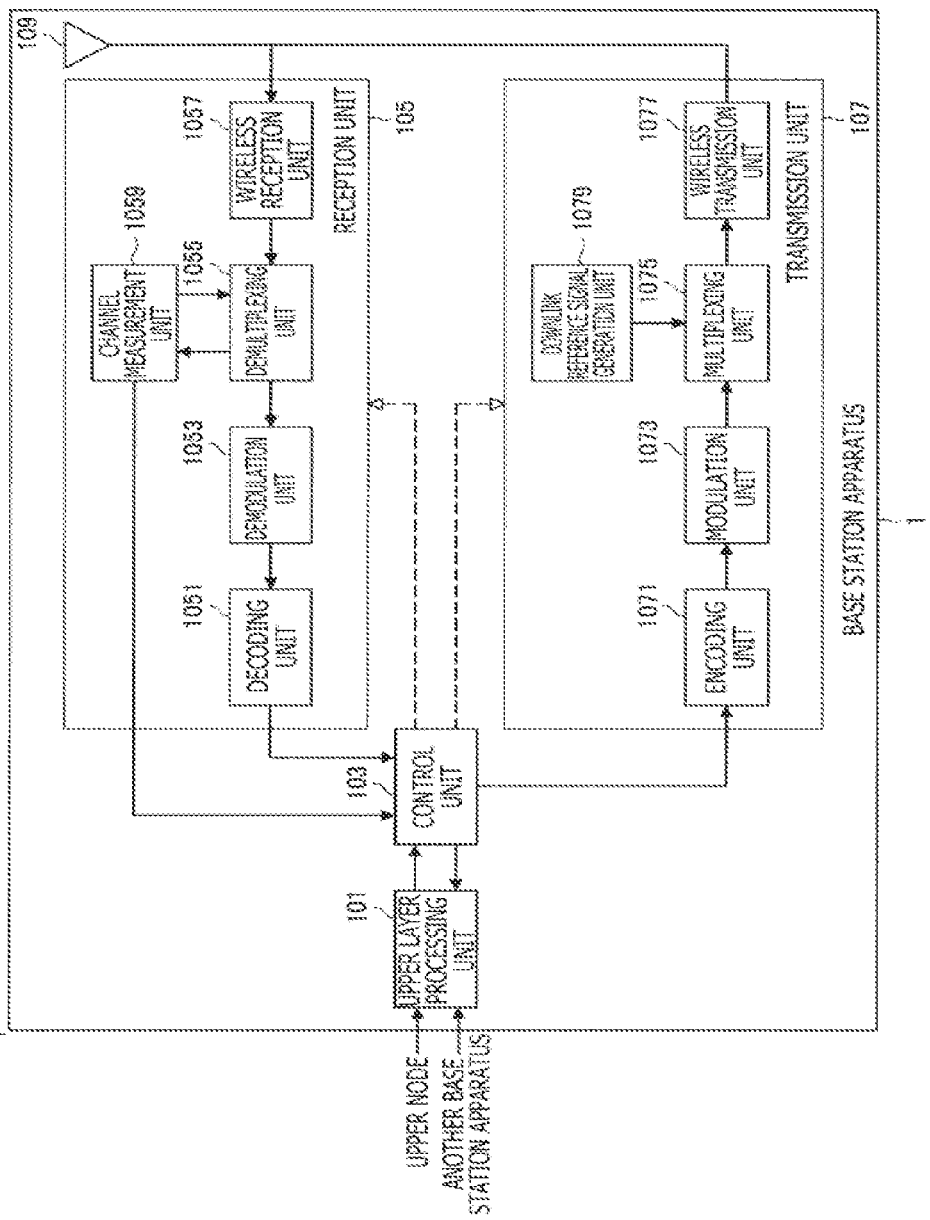
FIG. 5 is a schematic block diagram depicting a configuration of a base station apparatus of the embodiment.

FIG. 5 is a schematic block diagram depicting a configuration of the base station apparatus 1 of the present embodiment. As depicted in the figure, the base station apparatus 1 includes an upper layer processing unit 101, a control unit 103, a reception unit 105, a transmission unit 107, and a transmission and reception antenna 109. Moreover, the reception unit 105 includes a decoding unit 1051, a demodulation unit 1053, a demultiplexing unit 1055, a wireless reception unit 1057, and a channel measurement unit 1059. Furthermore, the transmission unit 107 includes an encoding unit 1071, a modulation unit 1073, a multiplexing unit 1075, a wireless transmission unit 1077, and a downlink reference signal generation unit 1079.

As already described, the base station apparatus 1 is capable of supporting the one or more RATs. A part or all of the respective units included in the base station apparatus 1 depicted in FIG. 5 may be configured individually in accordance with the RAT. For example, each of the reception unit 105 and the transmission unit 107 is individually configured using LTE and NR. In addition, in an NR cell, a part or all of the respective units included in the base station apparatus 1 depicted in FIG. 5 may be individually configured in accordance with a parameter set associated with a transmission signal. For example, in a certain NR cell, each of the wireless reception unit 1057 and the wireless transmission unit 1077 may be individually configured in accordance with a parameter set associated with a transmission signal.

The upper layer processing unit 101 performs processing for a medium access control (MAC) layer, a packet data convergence protocol (PDCP) layer, a radio link control (RLC) layer, and a radio resource control (RRC) layer. In addition, the upper layer processing unit 101 generates control information for controlling the reception unit 105 and the transmission unit 107, and outputs the control information to the control unit 103.

The control unit 103 controls the reception unit 105 and the transmission unit 107 on the basis of the control information received from the upper layer processing unit 101. The control unit 103 generates control information for the upper layer processing unit 101, and outputs the control information to the upper layer processing unit 101. The control unit 103 receives an input of a decoded signal from the decoding unit 1051, and an input of a channel estimation result from the channel measurement unit 1059. The control unit 103 outputs a signal to be encoded to the encoding unit 1071. In addition, the control unit 103 is used to control the whole or a part of the base station apparatus 1.

The upper layer processing unit 101 performs processing and management associated with RAT control, radio resource control, sub frame setting, scheduling control, and/or CSI report control. The processing and management by the upper layer processing unit 101 is performed for each terminal apparatus, or in common to terminal apparatuses connected to the base station apparatus. The processing and management by the upper layer processing unit 101 may be performed only by the upper layer processing unit 101, or may be acquired from an upper node or another base station apparatus. In addition, the processing and management by the upper layer processing unit 101 may be performed individually in accordance with the RAT. For example, the upper layer processing unit 101 individually performs processing and management in LTE, and processing and the management in NR.

Management associated with the RAT is performed in the RAT control by the upper layer processing unit 101. For example, management associated with LTE and/or management associated with the NR is performed in the RAT control. Management associated with NR includes setting and processing for a parameter set associated with a transmission signal in an NR cell.

In the radio resource control by the upper layer processing unit 101, generation and/or management for downlink data (transport block), system information, an RRC message (RRC parameter), and/or an MAC control element (CE) is performed.

In the sub frame setting by the upper layer processing unit 101, management of sub frame setting, sub frame pattern setting, uplink-downlink setting, uplink reference UL-DL setting, and/or downlink reference UL-DL setting is performed. Note that the sub frame setting by the upper layer processing unit 101 is also referred to as base station sub frame setting. Moreover, the sub frame setting by the upper layer processing unit 101 can be determined on the basis of a traffic volume of uplinks and a traffic volume of downlinks. Furthermore, the sub frame setting by the upper layer processing unit 101 can be determined on the basis of a scheduling result of scheduling control by the upper layer processing unit 101.

In the scheduling control by the upper layer processing unit 101, a frequency and a sub frame to which a physical channel is allocated, an encoding rate of a physical channel, a modulation method, transmission power, and others are determined on the basis of received channel state information, an estimation value of a propagation path and channel quality input from the channel measurement unit 1059, and the like. For example, the control unit 103 generates control information (DCI format) on the basis of a scheduling result of the scheduling control by the upper layer processing unit 101.

In the CSI report control by the upper layer processing unit 101, a CSI report of the terminal apparatus 2 is controlled. For example, setting associated with a CSI reference resource for an assumption for calculating CSI by the terminal apparatus 2 is controlled.

The reception unit 105 receives a signal transmitted from the terminal apparatus 2 via the transmission and reception antenna 109 under control by the control unit 103, and further performs a reception process such as separation, demodulation, and decoding, and outputs information subjected to the reception process to the control unit 103. Note that the reception process by the reception unit 105 is performed on the basis of setting specified in advance, or setting of a notice given from the base station apparatus 1 to the terminal apparatus 2.

The wireless reception unit 1057 performs, for an uplink signal received via the transmission and reception antenna 109, conversion to an intermediate frequency (down conversion), removal of an unnecessary frequency component, control of an amplification level in such a manner as to maintain an appropriate signal level, quadrature demodulation based on an in-phase component and a quadrature component of the received signal, conversion from an analog signal to a digital signal, removal of guard interval (GI), and/or extraction of a frequency range signal by fast Fourier transform (FFT).

The demultiplexing unit 1055 separates an uplink channel such as the PUCCH or the PUSCH and/or an uplink reference signal from a signal input from the wireless reception unit 1057. The demultiplexing unit 1055 outputs an uplink reference signal to the channel measurement unit 1059. The demultiplexing unit 1055 compensates for a propagation path for the uplink channel on the basis of a propagation path estimation value input from the channel measurement unit 1059.

The demodulation unit 1053 demodulates a reception signal for a modulation symbol of the uplink channel using a modulation method such as BPSK (Binary Phase Shift Keying), QPSK (Quadrature Phase Shift Keying), 16 QAM (Quadrature Amplitude Modulation), 64 QAM, and 256 QAM. The demodulation unit 1053 separates and demodulates a MIMO-multiplexed uplink channel.

The decoding unit 1051 performs a decoding process for encoded bits of a demodulated uplink channel. Uplink data and/or uplink control information after decoding is output to the control unit 103. The decoding unit 1051 performs the decoding process for the PUSCH for each transport block.

The channel measurement unit 1059 measures a propagation path estimation value and/or channel quality, for example, on the basis of an uplink reference signal input from the demultiplexing unit 1055, and outputs a measurement result to the demultiplexing unit 1055 and/or the control unit 103. For example, the channel measurement unit 1059 measures a propagation path estimation value used for propagation path compensation for the PUCCH or the PUSCH using the UL-DMRS, and measures channel quality of an uplink using the SRS.

The transmission unit 107 performs a transmission process such as encoding, modulation, and multiplexing for downlink control information and downlink data input from the upper layer processing unit 101 under control by the control unit 103. For example, the transmission unit 107 generates and multiplexes a PHICH, the PDCCH, the EPDCCH, the PDSCH, and a downlink reference signal to generate a transmission signal. Note that the transmission process by the transmission unit 107 is performed on the basis of setting specified in advance, a notice of setting given from the base station apparatus 1 to the terminal apparatus 2, or a notice of setting given via the PDCCH or the EPDCCH transmitted in an identical sub frame.

The encoding unit 1071 encodes an HARQ indicator (HARQ-ACK), downlink control information, and downlink data input from the control unit 103 using a predetermined encoding method such as block encoding, convolution encoding, and turbo encoding. The modulation unit 1073 modulates encoded bits input from the encoding unit 1071 using a predetermined modulation method such as BPSK, QPSK, 16 QAM, 64 QAM, and 256 QAM. The downlink reference signal generation unit 1079 generates a downlink reference signal on the basis of a physical cell identification (PCI), an RRC parameter set for the terminal apparatus 2 or the like. The multiplexing unit 1075 multiplexes modulation symbols of respective channels with the downlink reference signal, and arranges the multiplexed result in a predetermined resource element.

The wireless transmission unit 1077 performs, for a signal received from the multiplexing unit 1075, conversion into a time range signal by inverse fast Fourier transform (IFFT), addition of a guard interval, generation of a baseband digital signal, conversion into an analog signal, quadrature modulation, conversion from an intermediate frequency signal to a high frequency signal (up conversion), removal of an extra frequency component, amplification of power, and other processes to generate a transmission signal. The transmission signal output from the wireless transmission unit 1077 is transmitted from the transmission and reception antenna 109.

<Configuration Example of Terminal Apparatus 2 in Present Embodiment>

Figure 6:
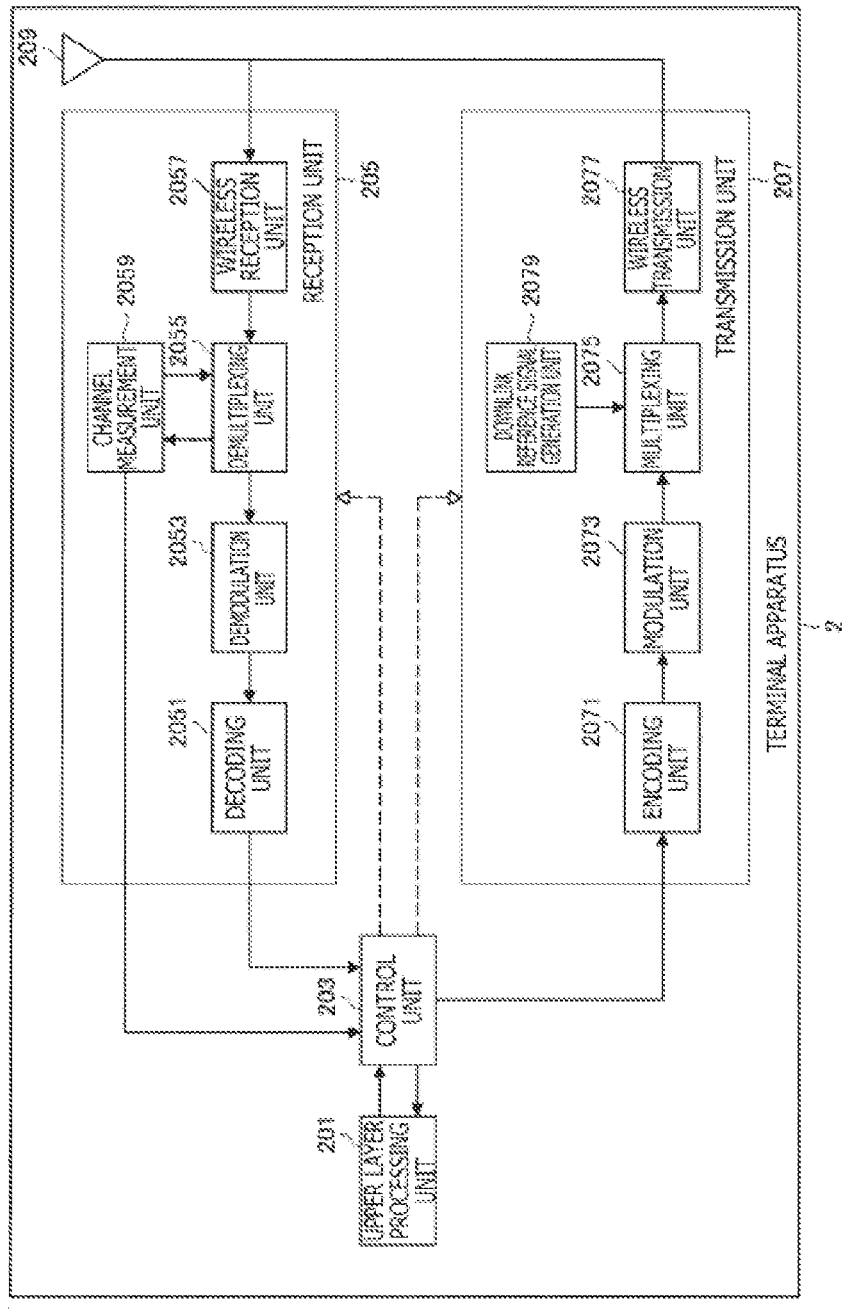
FIG. 6 is a schematic block diagram depicting a configuration of a terminal apparatus 2 of the embodiment.
Figure 7A:
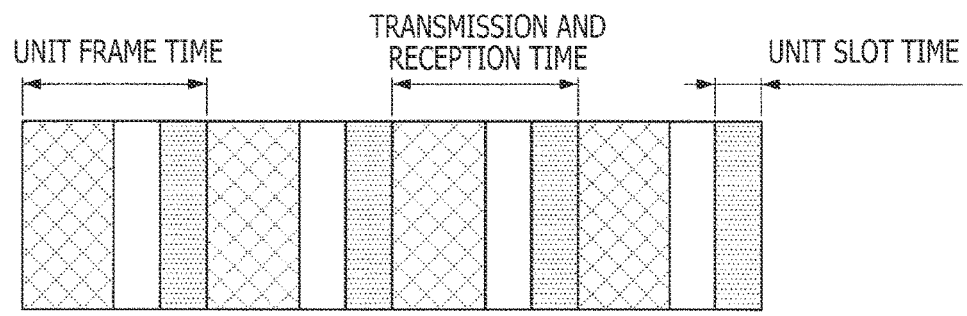
FIGS. 7A, 7B, and 7C are diagrams depicting an example of a frame configuration of self-contained transmission according to the embodiment.
Figure 7B:
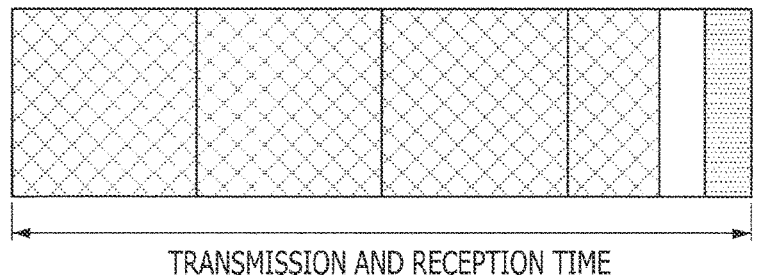
Figure 7C:
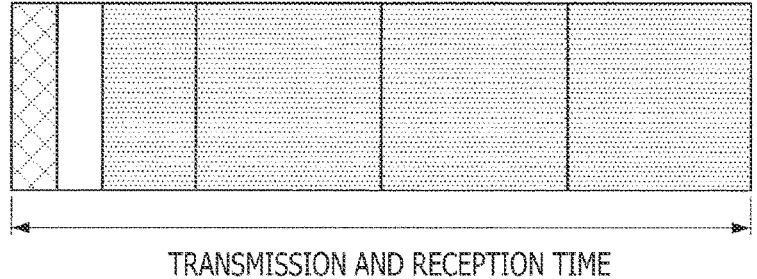
Figure 7C:
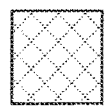
Figure 7C:
Figure 7C:

FIG. 6 is a schematic block diagram depicting a configuration of the terminal apparatus 2 of the present embodiment. As depicted in the figure, the terminal apparatus 2 includes an upper layer processing unit 201, a control unit 203, a reception unit 205, a transmission unit 207, and a transmission and reception antenna 209. Moreover, the reception unit 205 includes a decoding unit 2051, a demodulation unit 2053, a demultiplexing unit 2055, a wireless reception unit 2057, and a channel measurement unit 2059. Furthermore, the transmission unit 207 includes an encoding unit 2071, a modulation unit 2073, a multiplexing unit 2075, a wireless transmission unit 2077, and an uplink reference signal generation unit 2079.

As already described, the terminal apparatus 2 is capable of supporting one or more RATs. A part or all of the respective units included in the terminal apparatus 2 depicted in FIG. 6 may be configured individually in accordance with the RAT. For example, each of the reception unit 205 and the transmission unit 207 is individually configured using LTE and NR. In addition, in an NR cell, a part or all of the respective units included in the terminal apparatus 2 depicted in FIG. 6 may be individually configured in accordance with a parameter set associated with a transmission signal. For example, in a certain NR cell, each of the wireless reception unit 2057 and the wireless transmission unit 2077 may be individually configured in accordance with a parameter set associated with a transmission signal.

The upper layer processing unit 201 outputs uplink data (transport block) to the control unit 203. The upper layer processing unit 201 performs processing for a medium access control (MAC) layer, a packet data convergence protocol (PDCP) layer, a radio link control (RLC) layer, and a radio resource control (RRC) layer. In addition, the upper layer processing unit 201 generates control information for controlling the reception unit 205 and the transmission unit 207, and outputs the control information to the control unit 203.

The control unit 203 controls the reception unit 205 and the transmission unit 207 on the basis of the control information received from the upper layer processing unit 201. The control unit 203 generates control information for the upper layer processing unit 201, and outputs the control information to the upper layer processing unit 201. The control unit 203 receives an input of a decoded signal from the decoding unit 2051, and an input of a channel estimation result from the channel measurement unit 2059. The control unit 203 outputs a signal to be encoded to the encoding unit 2071. In addition, the control unit 203 may be used to control the whole or a part of the terminal apparatus 2.

The upper layer processing unit 201 performs processing and management associated with RAT control, radio resource control, sub frame setting, scheduling control, and/or CSI report control. The processing and management by the upper layer processing unit 201 is performed on the basis of setting specified in advance, and/or setting based on control information set or given as a notice by the base station apparatus 1. For example, the control information given from the base station apparatus 1 includes an RRC parameter, an MAC control element, or DCI. In addition, the processing and management by the upper layer processing unit 201 may be performed individually in accordance with the RAT. For example, the upper layer processing unit 201 individually performs processing and management in LTE, and processing and the management in NR.

In the RAT control by the upper layer processing unit 201, management associated with the RAT is performed. For example, management associated with LTE and/or management associated with NR is performed in the RAT control. The management associated with NR includes setting and processing for a parameter set associated with a transmission signal in an NR cell.

In the radio resource control by the upper layer processing unit 201, management of setting information associated with the own apparatus is performed. In the radio resource control by the upper layer processing unit 201, generation and/or management of uplink data (transport block), system information, an RRC message (RRC parameter), and/or an MAC control element (CE) is performed.

In the sub frame setting by the upper layer processing unit 201, sub frame setting for the base station apparatus 1 and/or a base station apparatus different from the base station apparatus 1 is managed. The sub frame setting includes setting of an uplink or a downlink for a sub frame, sub frame pattern setting, uplink-downlink setting, uplink reference UL-DL setting, and/or downlink reference UL-DL setting. Note that the sub frame setting by the upper layer processing unit 201 is also referred to as terminal sub frame setting.

In the scheduling control by the upper layer processing unit 201, control information used for performing control associated with scheduling of the reception unit 205 and the transmission unit 207 is generated on the basis of DCI (scheduling information) from the base station apparatus 1.

In the CSI report control by the upper layer processing unit 201, control associated with a CSI report for the base station apparatus 1 is performed. For example, in the CSI report control, setting associated with a CSI reference resource for an assumption for calculating CSI by the channel measurement unit 2059 is controlled. In the CSI report control, a resource (timing) used for reporting CSI is controlled on the basis of a DCI and/or an RRC parameter.

The reception unit 205 receives a signal transmitted from the base station apparatus 1 via the transmission and reception antenna 209 under control by the control unit 203, and further performs a reception process such as separation, demodulation, and decoding, and outputs information subjected to the reception process to the control unit 203. Note that the reception process by the reception unit 205 is performed on the basis of setting specified in advance, or a notice or setting given from the base station apparatus 1.

The wireless reception unit 2057 performs, for an uplink signal received via the transmission and reception antenna 209, conversion to an intermediate frequency (down conversion), removal of an unnecessary frequency component, control of an amplification level in such a manner as to maintain an appropriate signal level, quadrature demodulation based on an in-phase component and a quadrature component of the received signal, conversion from an analog signal to a digital signal, removal of guard interval (GI), and/or extraction of a signal in a frequency range by fast Fourier transform (FFT).

The demultiplexing unit 2055 separates a downlink channel such as the PHICH, the PDCCH, the EPDCCH, and the PDSCH, a downlink synchronization signal, and/or a downlink reference signal from a signal input from the wireless reception unit 2057. The demultiplexing unit 2055 outputs the downlink reference signal to the channel measurement unit 2059. The demultiplexing unit 2055 compensates for a propagation path for the downlink channel on the basis of a propagation path estimation value input from the channel measurement unit 2059.

The demodulation unit 2053 demodulates a reception signal for a modulation symbol of the downlink channel using a modulation method such as BPSK, QPSK, 16 QAM, 64 QAM, and 256 QAM. The demodulation unit 2053 separates and demodulates a MIMO-multiplexed downlink channel.

The decoding unit 2051 performs a decoding process for encoded bits of a demodulated downlink channel. Downlink data and/or downlink control information after decoding is output to the control unit 203. The decoding unit 2051 performs the decoding process for the PDSCH for each transport block.

The channel measurement unit 2059 measures a propagation path estimation value and/or channel quality, for example, on the basis of a downlink reference signal input from the demultiplexing unit 2055, and outputs the measurement result to the demultiplexing unit 2055 and/or the control unit 203. The downlink reference signal used by the channel measurement unit 2059 for measurement may be determined on the basis of at least a transmission mode and/or another RRC parameter set by the RRC parameter. For example, the DL-DMRS measures a propagation path estimation value for propagation path compensation for the PDSCH or the EPDCCH. The CRS measures a propagation path estimation value for propagation path compensation for the PDCCH or the PDSCH, and/or a channel of a downlink for reporting the CSI. The CSI-RS measures a channel of a downlink for reporting the CSI. The channel measurement unit 2059 calculates RSRP (Reference Signal Received Power) and/or RSRQ (Reference Signal Received Quality) on the basis of the CRS, the CSI-RS, or a detection signal, and outputs a calculation result to the upper layer processing unit 201.

The transmission unit 207 performs a transmission process such as encoding, modulation, and multiplexing for uplink control information and uplink data input from the upper layer processing unit 201 under control by the control unit 203. For example, the transmission unit 207 generates and multiplexes an uplink channel such as the PUSCH and the PUCCH, and/or an uplink reference signal, and generates a transmission signal. Note that the transmission process by the transmission unit 207 is performed on the basis of setting specified in advance, or setting or a notice given from the base station apparatus 1.

The encoding unit 2071 encodes an HARQ indicator (HARQ-ACK), uplink control information, and uplink data input from the control unit 203 using a predetermined encoding method such as block encoding, convolution encoding, and turbo encoding. The modulation unit 2073 modulates encoded bits input from the encoding unit 2071 using a predetermined modulation method such as BPSK, QPSK, 16 QAM, 64 QAM, and 256 QAM. The uplink reference signal generation unit 2079 generates an uplink reference signal on the basis of an RRC parameter set for the terminal apparatus 2 or the like. The multiplexing unit 2075 multiplexes modulation symbols of the respective channels with the uplink reference signal, and arranges the multiplexed result in a predetermined resource element.

The wireless transmission unit 2077 performs, for a signal received from the multiplexing unit 2075, processes such as conversion into a time range signal by inverse fast Fourier transform (IFFT), addition of a guard interval, generation of a baseband digital signal, conversion into an analog signal, quadrature modulation, conversion from an intermediate frequency signal to a high frequency signal (up conversion), removal of an extra frequency component, and amplification of power to generate a transmission signal. The transmission signal output from the wireless transmission unit 2077 is transmitted from the transmission and reception antenna 209.

<Signaling of Control Information in Present Embodiment>

Each of the base station apparatus 1 and the terminal apparatus 2 is allowed to use various methods for signaling (notice, notification, and setting) of corresponding control information. The signaling of the control information is allowed to be performed in various layers. The signaling of the control information includes physical layer signaling as signaling through a physical layer, RRC signaling as signaling through an RRC layer, and MAC signaling as signaling through an MAC layer, for example. The RRC signaling is dedicated RRC signaling for giving a notice of control information peculiar to the terminal apparatus 2, or common RRC signaling for giving a notice of control information peculiar to the base station apparatus 1. Signaling used by an upper layer as viewed from a physical layer, such as the RRC signaling and the MAC signaling, is also referred to as upper layer signaling.

The RRC signaling is implemented by signaling an RRC parameter. The MAC signaling is implemented by signaling an MAC control element. The physical layer signaling is implemented by signaling downlink control information (DCI) or uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. Each of the RRC signaling and the MAC signaling is used for signaling semi-static control information, and is also referred to as semi-static signaling. The physical layer signaling is used for signaling dynamic control information, and also referred to as dynamic signaling. The DCI is used for scheduling the PDSCH or scheduling the PUSCH. The UCI is used for a CSI report, an HARQ-ACK report, and/or a scheduling request (SR), for example.

<Details of Downlink Control Information in Present Embodiment>

A notice of the DCI is given using a DCI format having a field specified in advance. Predetermined information bits are mapped in the field specified in the DCI format. The DCI gives a notice of downlink scheduling information, uplink scheduling information, side link scheduling information, a request for an aperiodic CSI report, or an uplink transmission power command.

The DCI format monitored by the terminal apparatus 2 is determined in accordance with a transmission mode set for each serving cell. In other words, a part of the DCI format monitored by the terminal apparatus 2 is allowed to vary in accordance with the transmission mode. For example, the terminal apparatus 2 for which a downlink transmission mode 1 has been set monitors a DCI format 1A and a DCI format 1. For example, the terminal apparatus 2 for which a downlink transmission mode 4 has been set monitors the DCI format 1A and a DCI format 2. For example, the terminal apparatus 2 for which an uplink transmission mode 1 has been set monitors a DCI format 0. For example, the terminal apparatus 2 for which an uplink transmission mode 2 has been set monitors the DCI format 0 and a DCI format 4.

A notice of a control range where the PDCCH used to give a notice of the DCI for the terminal apparatus 2 is arranged is not given. The terminal apparatus 2 detects the DCI for the terminal apparatus 2 by blind decoding (blind detection). More specifically, the terminal apparatus 2 monitors a set of PDCCH candidates in the serving cell. Monitoring refers to an attempt of decoding each PDCCH in the set by using all the DCI formats to be monitored. For example, the terminal apparatus 2 attempts decoding of all aggregation levels, the PDCCH candidates, and the DCI formats likely to be transmitted to the destination of the terminal apparatus 2. The terminal apparatus 2 recognizes the DCI (PDCCH) for which decoding (detection) has succeeded as the DCI (PDCCH) for the terminal apparatus 2.

Cyclic redundancy check (CRC) is added to the DCI. The CRC is used for error detection of the DCI and blind detection of the DCI. The CRC (CRC parity bits) is scrambled in accordance with an RNTI (Radio Network Temporary Identifier). The terminal apparatus 2 detects whether the corresponding DCI is DCI for the terminal apparatus 2 on the basis of the RNTI. More specifically, the terminal apparatus 2 descrambles bits corresponding to the CRC by the predetermined RNTI, extracts the CRC, and detects whether the corresponding DCI is correct.

The RNTI is specified or set in accordance with purposes or applications of the DCI. The RNTI includes a C-RNTI (Cell-RNTI), an SPS C-RNTI (Semi Persistent Scheduling C-RNTI), an SI-RNTI (System Information-RNTI), a P-RNTI (Paging-RNTI), an RA-RNTI (Random Access-RNTI), a TPC-PUCCH-RNTI (Transmit Power Control-PUCCH-RNTI), a TPC-PUSCH-RNTI (Transmit Power Control-PUSCH-RNTI), a temporary C-RNTI, an M-RNTI (MBMS (Multimedia Broadcast Multicast Services)-RNTI), and an eIMTA-RNTI and a CC-RNTI.

Each of the C-RNTI and the SPS C-RNTI is a RNTI peculiar to the terminal apparatus 2 within the base station apparatus 1 (cell), and functions as an identifier for identifying the terminal apparatus 2. The C-RNTI is used for scheduling the PDSCH or the PUSCH in a certain sub frame. The SPS C-RNTI is used to activate or release cyclic scheduling of a resource for the PDSCH or the PUSCH. A control channel which has CRC scrambled by the SI-RNTI is used for scheduling an SIB (System Information Block). A control channel which has CRC scrambled by the P-RNTI is used for controlling paging. A control channel which has CRC scrambled by the RA-RNTI is used for scheduling a response to RACH. A control channel which has CRC scrambled by the TPC-PUCCH-RNTI is used for power control of the PUCCH. A control channel which has CRC scrambled by the TPC-PUSCH-RNTI is used for power control of the PUSCH. A control channel which has CRC scrambled by the Temporary C-RNTI is used by a mobile station apparatus for which the C-RNTI is not set or recognized. A control channel which has CRC scrambled by the M-RNTI is used for scheduling MBMS. A control channel which has CRC scrambled by the eIMTA-RNTI is used for giving a notice of information associated with TDD UL/DL setting in a TDD serving cell in dynamic TDD (eIMTA). A control channel (DCI) which has CRC scrambled by the CC-RNTI is used for giving a notice of setting of a dedicated OFDM symbol in an LAA secondary cell. Note that the DCI format may be scrambled by a new RNTI instead of the RNTIs described above.

The scheduling information (downlink scheduling information, uplink scheduling information, and side link scheduling information) includes information used for scheduling in units of a resource block or a resource block group as scheduling of a frequency range. The resource block group is a set of successive resource blocks, and indicates a resource allocated to the terminal apparatus to be scheduled. A size of the resource block group is determined in accordance with a system bandwidth.

<Details of Downlink Control Channel in Present Embodiment>

The DCI is transmitted using a control channel such as the PDCCH and the EPDCCH. The terminal apparatus 2 monitors a set of the PDCCH candidates and/or a set of the EPDCCH candidates in one or a plurality of activated serving cells set by RRC signaling. Monitoring herein is an attempt of decoding the PDCCH and/or the EPDCCH within a set corresponding to all DCI formats to be monitored.

The set of the PDCCH candidates or the set of the EPDCCH candidates are also referred to as a search space. A common search space (CSS) and a terminal specific search space (USS) are defined in the search space. The CSS may be defined only for the search space associated with the PDCCH.

The CSS (Common Search Space) is a search space set on the basis of a parameter peculiar to the base station apparatus 1 and/or a parameter specified beforehand. For example, the CSS is a search space used in common by a plurality of terminal apparatuses. Accordingly, by mapping a control channel common to a plurality of terminal apparatuses to the CSS by the base station apparatus 1, reduction of the resource used for transmitting the control channel is achievable.

An USS (UE-specific Search Space) is a search space set using at least a parameter peculiar to the terminal apparatus 2. In this case, the USS is a search space peculiar to the terminal apparatus 2, wherefore the base station apparatus 1 is allowed to individually transmit a control channel peculiar to the terminal apparatus 2 using the USS. Accordingly, the base station apparatus 1 capable of efficiently mapping control channels peculiar to a plurality of terminal apparatuses.

The USS may be so set as to be usable in common to a plurality of terminal apparatuses. For setting the USS common to the plurality of terminal apparatuses, the parameter peculiar to the terminal apparatus 2 is set to an identical parameter between a plurality of terminal apparatuses. For example, the identical parameter of the plurality of terminal apparatuses is set in units of a cell, a transmission point, a group of predetermined terminal apparatuses or the like.

The search space for each aggregation level is defined by a set of PDCCH candidates. Each PDCCH is transmitted using an aggregation of one or more CCEs (Control Channel Elements). The number of CCEs used for one PDCCH is also referred to as an aggregation level. For example, the number of the CCEs used for one PDCCH is 1, 2, 4, or 8.

The number of the PDCCHs candidates is determined on the basis of at least the search space and the aggregation level. For example, in the CSS, the numbers of the PDCCH candidates at aggregation levels 4 and 8 are 4 and 2, respectively. For example, in the USS, the numbers of the PDCCH candidates at aggregation levels 1, 2, 4, and 8 are 6, 6, 2, and 2, respectively.

<Details of Resource Allocation in Present Embodiment>

The base station apparatus 1 is allowed to use a plurality of methods of resource allocation of the PDSCH and/or the PUSCH to the terminal apparatus 2. The methods of the resource allocation include dynamic scheduling, semi-persistent scheduling, multi-sub-frame scheduling, and cross-sub-frame scheduling.

In the dynamic scheduling, one DCI performs resource allocation to one sub frame. More specifically, the PDCCH or the EPDCCH in a certain sub frame performs scheduling of the PDSCH in the corresponding sub frame. The PDCCH or the EPDCCH in a certain sub frame performs scheduling for the PUSCH in a predetermined sub frame after the corresponding sub frame.

In the multi-sub-frame scheduling, one DCI performs resource allocation to one or more sub frames. More specifically, the PDCCH or the EPDCCH in a certain sub frame performs scheduling for the PDSCH in one or more sub frames a predetermined number after the corresponding sub frame. The PDCCH or the EPDCCH in a certain sub frame performs scheduling for the PUSCH in one or more sub frames a predetermined number after the corresponding sub frame. The predetermined number may be an integer equal to or larger than zero. The predetermined number may be specified beforehand, or determined on the basis of physical layer signaling and/or RRC signaling. In the multi-sub-frame scheduling, successive sub frames may be scheduled, or a sub frame having a predetermined cycle may be scheduled. The number of sub frames to be scheduled may be specified beforehand, or determined on the basis of physical layer signaling and/or RRC signaling.

In the cross-sub-frame scheduling, one DCI performs resource allocation to one sub frame. More specifically, the PDCCH or the EPDCCH in a certain sub frame schedules the PDSCH in one sub frame a predetermined number after the corresponding sub frame. The PDCCH or the EPDCCH in a certain sub frame schedules the PUSCH in one sub frame a predetermined number after the corresponding sub frame. The predetermined number may be an integer equal to or larger than zero. The predetermined number may be specified beforehand, or determined on the basis of physical layer signaling and/or RRC signaling. In the cross-sub-frame scheduling, successive sub frames may be scheduled, or a sub frame having a predetermined cycle may be scheduled.

In the semi-persistent scheduling (SPS), one DCI performs resource allocation to one or more sub frames. Information associated with SPS is set by RRC signaling for the terminal apparatus 2. In a case where the PDCCH or the EPDCCH for enabling the SPS is detected, the terminal apparatus 2 enables processing associated with SPS, and receives the predetermined PDSCH and/or PUSCH on the basis of setting associated with the SPS. In a case where the PDCCH or the EPDCCH for releasing the SPS is detected in the enabled state of the SPS, the terminal apparatus 2 releases (disables) the SPS, and stops reception of the predetermined PDSCH and/or PUSCH. The SPS may be released on the basis of a case where a predetermined condition has been met. For example, the SPS is released in a case where a predetermined number of pieces of blank-transmission data are received. The blank-transmission of data for releasing the SPS corresponds to an MAC PDU (Protocol Data Unit) including a zero MAC SDU (Service Data Unit).

The information associated with SPS set by the RRC signaling includes information associated with a scheduled cycle (interval) of the SPS C-RNTI as a RNTI of SPS, and the PDSCH, a scheduled cycle (interval) of the PUSCH, information associated with setting for releasing SPS, and/or an HARQ process number in SPS. SPS is supported only by a primary cell and/or a primary secondary cell.

<Self-Contained Transmission>

Figure 15:
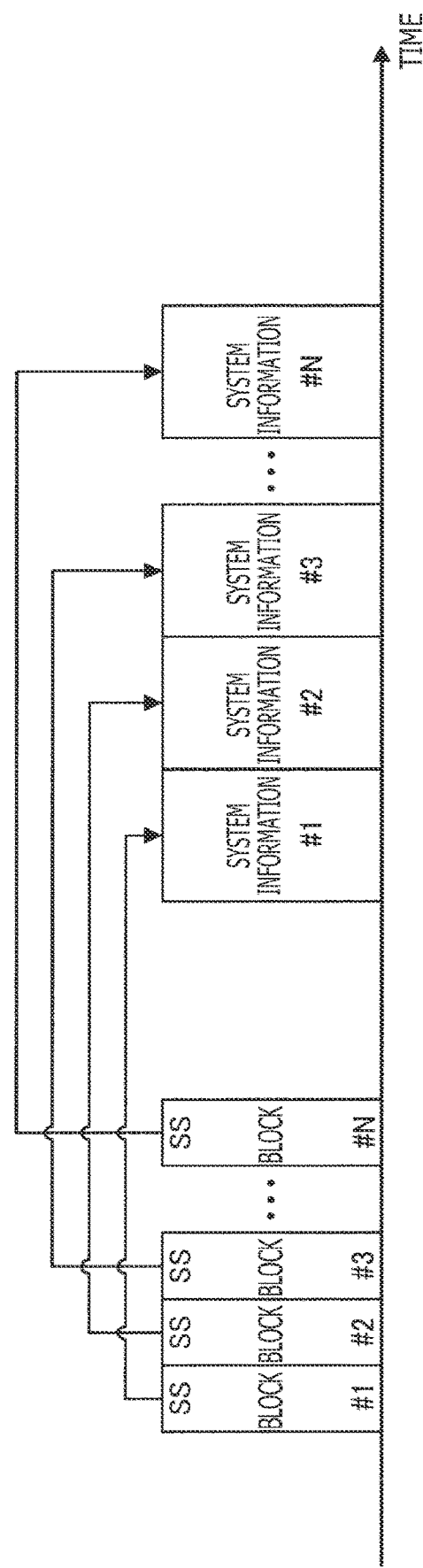
FIG. 15 is a diagram depicting an example of system information corresponding to synchronization signal blocks.

In NR, transmission of a physical channel and/or a physical signal may be transmitted by self-contained transmission. FIG. 15 depicts an example of a frame configuration of self-contained transmission of the present embodiment. In the self-contained transmission, one transmission and reception includes downlink transmission successive from a head, GP, and successive downlink transmission performed in this order. The successive downlink transmission includes at least one downlink control information and the DMRS. The downlink control information instructs reception of a downlink physical channel included in the successive downlink transmission, or transmission of an uplink physical channel included in the successive uplink transmission. In a case where the downlink control information instructs reception of a downlink physical channel, the terminal apparatus 2 attempts reception of the corresponding downlink physical channel on the basis of the downlink control information. Thereafter, the terminal apparatus 2 transmits success or failure of reception of the downlink physical channel (success or failure of decoding) through an uplink control channel included in uplink transmission allocated after GP. On the other hand, in a case where the downlink control information instructs transmission of an uplink physical channel, the terminal apparatus 2 performs transmission while inserting an uplink physical channel transmitted on the basis of the downlink control information into the uplink transmission. In this manner, a quick response to an increase or decrease in a traffic ratio of the uplink and the downlink is achievable by flexible switching between uplink data transmission and downlink data transmission in accordance with the downlink control information. In addition, low-delay communication of the downlink is achievable by giving a notice of success or failure of reception of the downlink by uplink transmission immediately after the reception of the downlink.

The unit slot time is a minimum time unit defining downlink transmission, GP, or uplink transmission. The unit slot time is reserved for any one of downlink transmission, GP, and uplink transmission. The unit slot time does not include both the downlink transmission and the uplink transmission at a time. The unit slot time may be a minimum transmission time of a channel associated with DMRS included in the unit slot time. For example, the one unit slot time is defined by a sampling interval (Ts) of NR, or an integral multiple of the symbol length.

The unit frame time may be a minimum time designated by scheduling. The unit frame time may be a minimum unit in which a transport block is transmitted. The unit slot time may be a maximum transmission time of a channel associated with DMRS included in the unit slot time. The unit frame time may be a unit time determining uplink transmission power of the terminal apparatus 2. The unit frame time may be referred to as a sub frame. There are three types of transmission in view of the unit frame time, i.e., a unit frame time for only downlink transmission, a unit frame time for only uplink transmission, and a unit frame time for a combination of the uplink transmission and the downlink transmission. For example, the one unit frame time is defined as an integral multiple of the sampling interval of NR (Ts), the symbol length, or the unit slot time.

The transmission and reception time is a time of one process of transmission and reception. A time between one process of transmission and reception and another process of transmission and reception is occupied by a time (gap) when none of physical channels and physical signals is transmitted. The terminal apparatus 2 need not average CSI measurement between different processes of transmission and reception. The transmission and reception time may be referred to as TTI. For example, the one transmission and reception time is defined as an integral multiple of the sampling interval of NR (Ts), the symbol length, the unit slot time, or the unit frame time.

<Uplink RS of NR in Present Embodiment>

Examples of uplink RS in NR include NR-SRS. An example of NR-SRS will be hereinafter described. Note that characteristics not specified in the following description are considered similar to those of SRS in LTE.

The NR-SRS is not required to be transmitted by a final symbol within a sub frame or within a slot. For example, the NR-SRS may be transmitted by an initial symbol or an intermediate symbol within a sub frame or within a slot.

In addition, the NR-SRS may be successively transmitted by a plurality of symbols. For example, the NR-SRS may be transmitted by final several symbols within a sub frame or within a slot.

<Antenna Configuration of NR in Present Embodiment>

It is assumed that an antenna of NR has a digital antenna configuration, an analog antenna configuration, and a hybrid antenna configuration combining the digital antenna configuration and the analog antenna configuration.

The digital antenna configuration is a configuration which controls an antenna weight for each antennal element using a digital circuit (baseband range).

Figure 8:
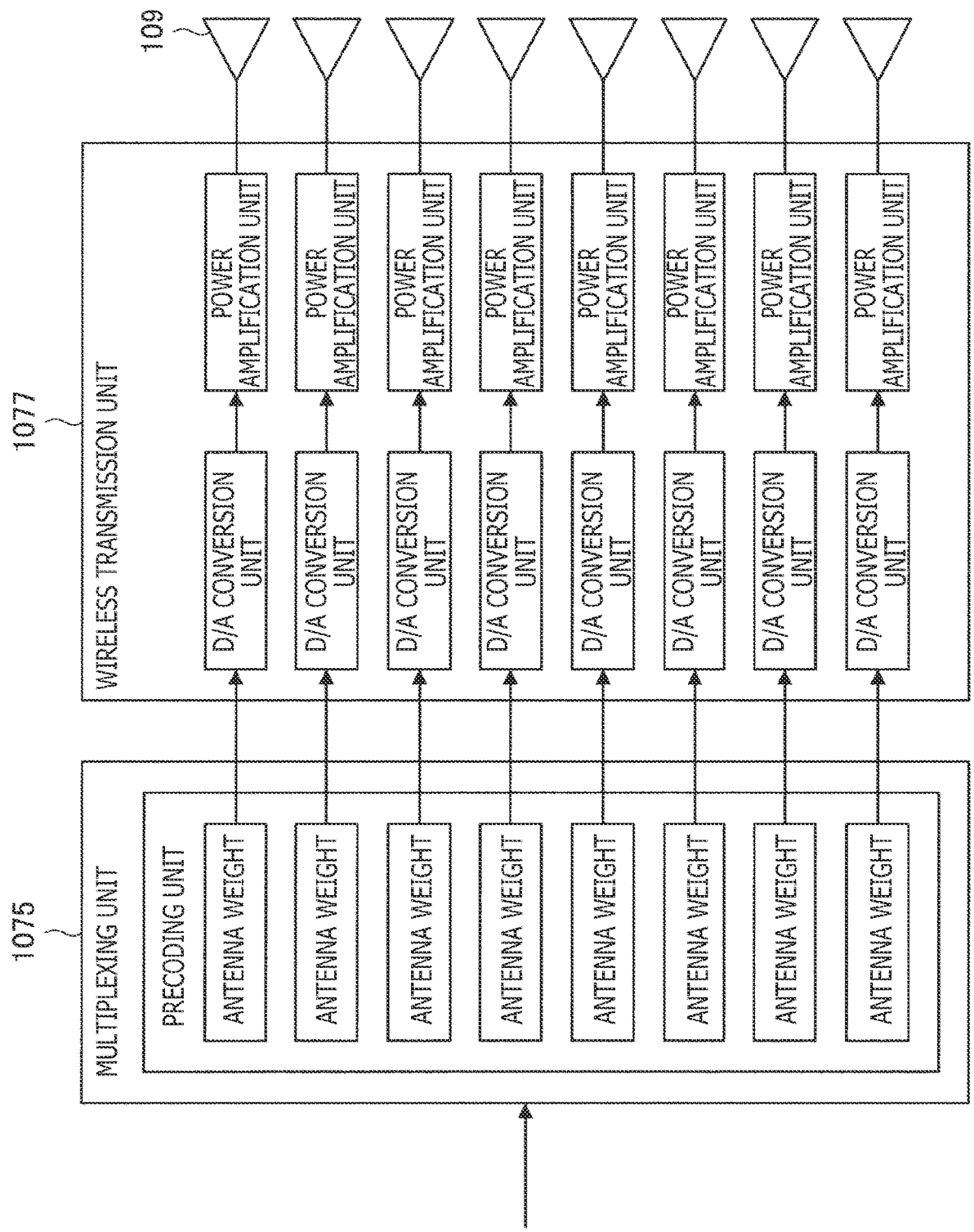
FIG. 8 is a schematic block diagram depicting an example of a digital antenna configuration according to the present embodiment.

FIG. 8 is a schematic block diagram depicting an example of the digital antenna configuration in the present embodiment. FIG. 8 depicts the configuration of the base station apparatus 1 in FIG. 5, focusing on the configurations of the multiplexing unit 1075, the wireless transmission unit 1077, and the antenna unit 109. In addition, FIG. 8 does not depict configurations unnecessary for description of the basic configuration. However, it is assumed that the respective units include the configurations described with reference to FIG. 5.

In the digital antenna configuration, the multiplexing unit 1075 includes a precoding unit. More specifically, in the digital antenna configuration, a beam is formed by multiplying a transmission signal corresponding to each antenna element by an antenna weight in the precoding unit.

In the digital antenna configuration, flexible phase control is achievable for each antenna element, wherefore different beams can be generated in the frequency range. Meanwhile, the digital antenna configuration tends to become complicated.

Figure 9:
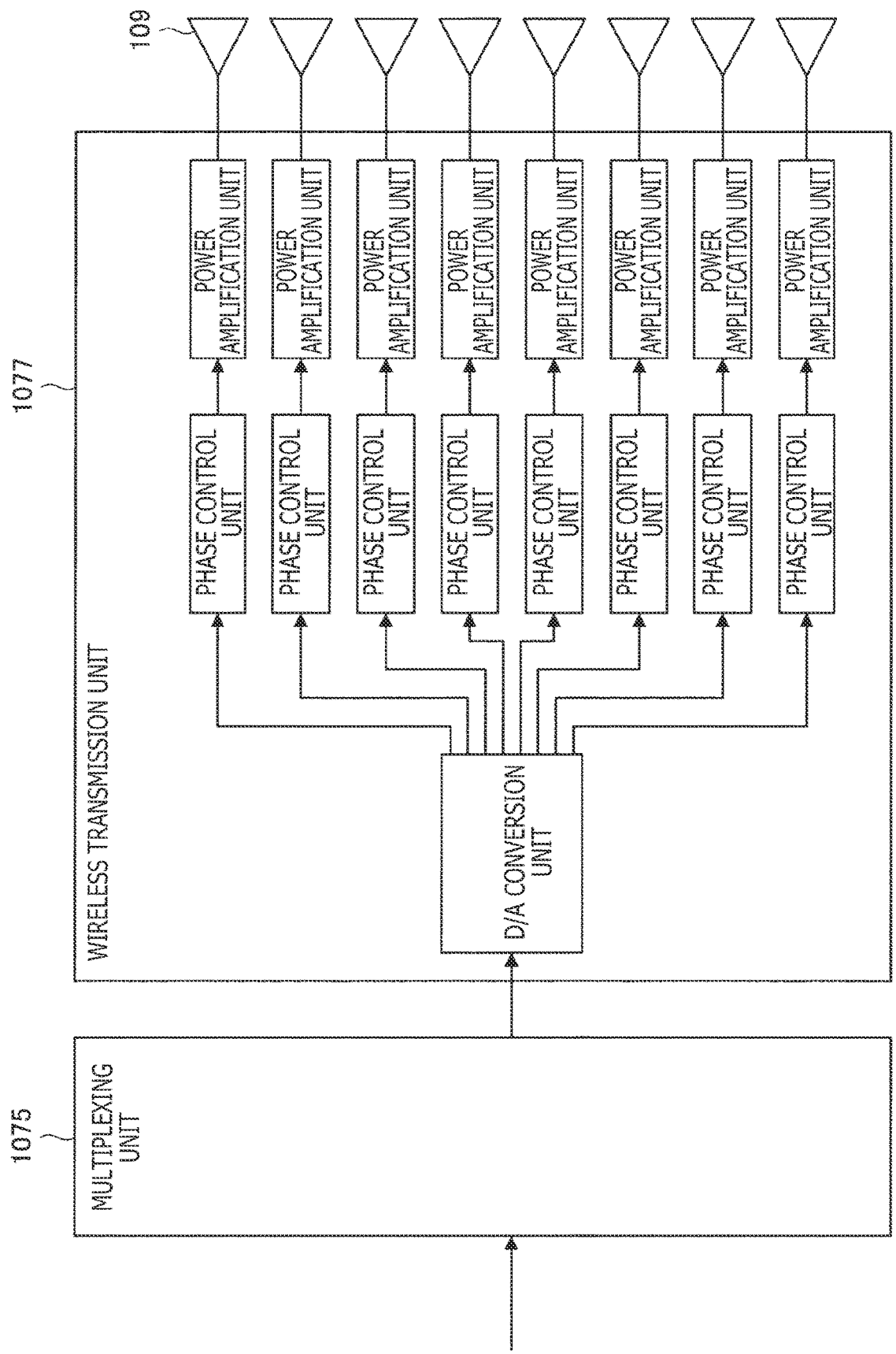
FIG. 9 is a schematic block diagram depicting another example of the digital antenna configuration according to the present embodiment.

FIG. 9 is a schematic block diagram depicting an example of the analog antenna configuration in the present embodiment. Similarly to FIG. 8, FIG. 9 depicts the configuration of the base station apparatus 1 in FIG. 5, focusing on the configurations of the multiplexing unit 1075, the wireless transmission unit 1077, and the antenna unit 109. In addition, FIG. 9 does not depict configurations unnecessary for description of the basic configuration. However, it is assumed that the respective units include the configurations described with reference to FIG. 5.

In the analog antenna configuration, the wireless transmission unit 1077 includes a phase control unit. A beam is formed by rotating a phase of a transmission signal in the analog range (RF range) using the phase control unit.

In the case of the phase control in the analog range, flexible beam control requires complicated processing. However, the configuration tends to become simple. In an example, an antenna switching configuration is a part of the analog antenna configuration.

The hybrid antenna configuration is a configuration combining the digital antennal configuration and the analog antenna configuration, and therefore has both phase control elements in the analog range, and phase control elements in the digital range. The hybrid antenna configuration has intermediate characteristics between the digital antenna configuration and the analog antenna configuration in view of performance and configuration complexity of beam forming.

<Beam Operation Method of NR in Present Embodiment>

Two types of methods, i.e., a single beam operation and a plural beam operation are assumed for NR.

Figure 10:
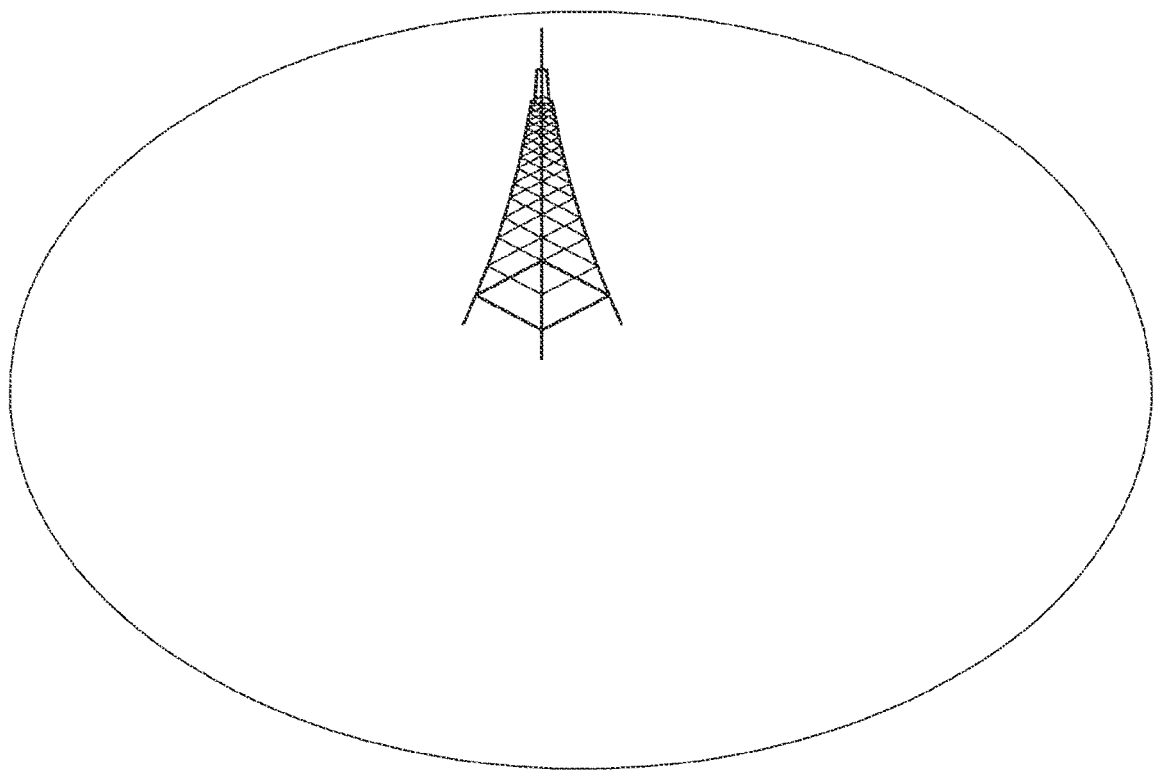
FIG. 10 is an explanatory diagram for explaining an outline of an example of a single beam operation.

For example, FIG. 10 is an explanatory diagram for explaining an outline of an example of the single beam operation. The single beam operation is a method which covers a predetermined cell coverage by one beam (i.e., method operated by one beam). More specifically, a physical channel or a physical signal peculiar to a cell is transmitted by one beam within a predetermined cell coverage. For example, LTE is also considered as the single beam operation.

Figure 11:
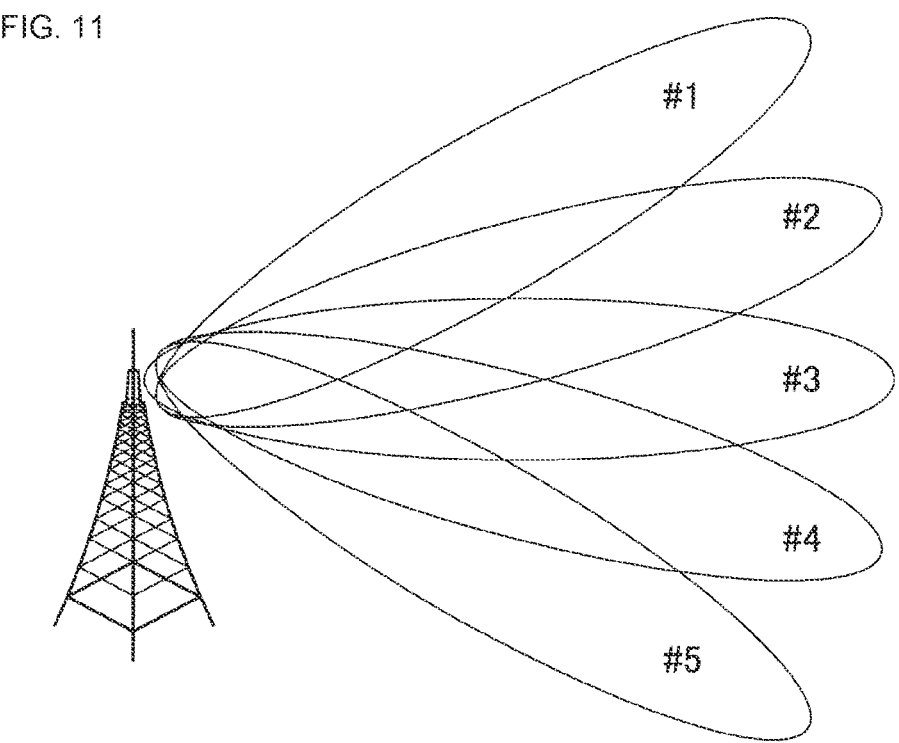
FIG. 11 is an explanatory diagram for explaining an outline of an example of a plural beam operation.

In addition, FIG. 11 is an explanatory diagram for explaining an outline of an example of the plural beam operation. The plural beam operation is a method which covers a predetermined cell coverage by one or more beams (i.e., method operated by one or more beams). More specifically, a physical channel or a physical signal peculiar to a cell is transmitted by a plurality of beams. For example, in cases of analog beam forming and hybrid beam forming, a beam in a predetermined direction is transmitted in a predetermined time instance, and transmission of beams other than the beam in the predetermined direction becomes difficult. Accordingly, switching between beams in a plurality of directions, and covering a wide range are achievable by switching the time instance, for example. More specifically, a predetermined beam for transmitting a physical channel or a physical signal peculiar to a cell is transmitted in one time instance (time resource). In addition, a different beam is transmitted in a different time instance. In this manner, a plurality of beams is switched and operated in a plurality of time instances in the plural beam operation. The switching between the plurality of beams in the plurality of time instances is referred to as beam sweep.

Note that the plural beam operation may be performed in the digital antenna configuration.

In addition, a beam is allowed to be converted into terms such as a channel, a path, an antenna, and an antenna port. Accordingly, transmission using different beams can be expressed as transmission using different channels, different paths, different antennas, or different antenna ports. Furthermore, a beam is assumable as a virtual cell. The terminal apparatus is capable of recognizing different beams transmitted from the same cell as different virtual cells or virtual carriers. Note that information associated with the channel, the path, the antenna, the antenna port described above and allowed to be expressed as a beam, information associated with control of the beam (e.g., information associated with setting of antenna) and others are also collectively referred to as "antenna information" in the present disclosure. In this case, a signal transmitted by a predetermined beam can be considered as a signal associated with antenna information corresponding to the beam.

<Appropriate Beam Selection of NR in Present Embodiment>

In NR, the system preferably selects an appropriate beam for each of a downlink and an uplink. More specifically, an appropriate beam is preferably selected for each of a downlink transmission beam of the base station apparatus and a downlink reception beam of the terminal apparatus. In addition, an appropriate beam is preferably selected for each of an uplink transmission beam of the terminal apparatus and an uplink reception beam of the base station apparatus.

The base station apparatus is capable of recognizing an appropriate downlink transmission beam on the basis of a report or feedback information from the terminal apparatus which receives a signal transmitted from the base station apparatus. An example of a process performed by the base station apparatus for recognizing an appropriate downlink transmission beam will be hereinafter described. For example, the base station apparatus transmits a predetermined known signal a plurality of times using downlink transmission beams different from each other. The terminal apparatus determines the appropriate downlink beam on the basis of reception intensity or reception quality, for example, from the known signals transmitted the plurality of times by the downlink transmission beams different from each other, and reports or feeds back information corresponding to the appropriate downlink transmission beam to the base station apparatus. In this manner, the base station apparatus is capable of recognizing the appropriate downlink transmission beam. Note that examples of the known signal include various types of reference signals such as an NR-SS, an MRS, a BRS, an NR-CSI-RS, and an NR-DM-RS.

In addition, the base station apparatus in another example is capable of recognizing an appropriate downlink transmission beam on the basis of an appropriate uplink reception beam of the base station apparatus.

The terminal apparatus is capable of recognizing an appropriate uplink transmission beam on the basis of a report or feedback information from the base station apparatus which receives a signal transmitted from the terminal apparatus. An example of a process performed by the terminal apparatus for recognizing an appropriate uplink transmission beam will be hereinafter described. For example, the terminal apparatus transmits a predetermined known signal a plurality of times using uplink transmission beams different from each other. The base station apparatus determines the appropriate uplink beam on the basis of reception intensity or reception quality, for example, from the known signals transmitted the plurality of times by the uplink transmission beams different from each other, and reports or gives a notice of information corresponding to the appropriate uplink transmission beam to the terminal apparatus. In this manner, the terminal apparatus is capable of recognizing the appropriate uplink transmission beam. Note that examples of the known signal include various reference signals such as an NR-PRACH, an NR-SRS, and an NR-DM-RS.

In addition, the terminal apparatus in another example is capable of recognizing an appropriate uplink transmission beam on the basis of an appropriate downlink reception beam of the terminal apparatus.

<Synchronization Signal of NR in Present Embodiment>

In NR, a synchronization signal is used for synchronization of a frequency range and/or a time range of downlinks by the terminal apparatus. The synchronization signal used in NR is referred to as an NR-SS (NR-Synchronization Signal).

The NR-SS includes at least an NR-PSS (NR-Primary Synchronization Signal) and an NR-SSS (NR-Secondary Synchronization Signal). Note that the NR-SS may include an NR-TSS (NR-Third Synchronization Signal). The NR-SS is preferably kept constant for a predetermined frequency range (frequency band) regardless of the system bandwidth.

The NR-PSS is used at least for initial synchronization of a symbol boundary for an NR cell. Note that the NR-PSS may be used for detection of a part of an NR cell identifier, or may be used for demodulation of an NR-SSS. A sequence of the NR-PSS is constituted by an M-sequence or a Zadoff-Chu-sequence, for example.

The terminal apparatus does not detect the NR-PSS using other reference signals. In addition, the terminal apparatus need not assume that the NR-PSS is transmitted via a TRP (Transmission and Reception Point) and an antenna port identical to those of any other downlink reference signal.

The NR-SSS is used at least for detection of an NR cell identifier or a part of an NR cell identifier. The NR-SSS is detected while positioned with a fixed time and frequency resource relationship with a resource position of the NR-PSS. This resource relationship is fixed without dependency on a duplex method or a beam operation method. The NR-SSS of the type having the M-sequence is preferably adopted, but of the type having the Zadoff-Chu-sequence, gold-sequence or the like may be adopted. In addition, a plurality of the types of the sequence described above may be combined and used, or a plurality of sequences of the same type and of different forming methods may be combined and used.

The terminal apparatus may detect the NR-SSS using channel state information and/or information associated with an NR cell obtained by detection of the NR-PSS. The terminal apparatus may assume that the NR-SSS is transmitted through the same antenna port as that of the NR-PSS.

The NR-TSS may be used for giving a notice of an index of a synchronization signal block. The NR-TSS may be used for giving a notice of an index of a beam. The NR-TSS may be used for giving a notice of a repeating number of a synchronization signal block. The NR-TSS may be used for giving a notice of whether or not a part or all of a synchronization signal block including the NR-TSS, and other synchronization signals and/or the NR-PBCH within a synchronization signal burst are identical. The NR-TSS may be used for demodulation of the NR-PBCH. In other words, the NR-TSS may be transmitted through the same antenna port as that of the NR-PBCH. The terminal apparatus assumes that the NR-PBCH and the NR-TSS exhibit QCL. Note that the NR-TSS may be transmitted while included in an OFDM symbol for transmission of the NR-PBCH. An M-sequence or a gold-sequence is preferably adopted as a sequence of the NR-TSS.

The NR-SS may be used for measuring quality of an NR cell in which the NR-SS is transmitted. Examples of the quality of the NR cell include a PSRP, a RSRQ, an RSSI (Received Signal Strength Indicator), an SNS (Signal to Noise Ratio), and/or an SINR (signal to Interference plus Noise Ratio).

The NR-SS is transmitted at predetermined sub carrier intervals. The predetermined sub carrier intervals are uniquely defined for a frequency band (operating band).

<Notification Channel of NR in Present Embodiment>

In NR, at least one notification channel is defined. The notification channel is referred to as an NR-PBCH.

The NR-PBCH is used to give a notification of a part of system information. The NR-PBCH is not scheduled by other control information. Information carried by the NR-PBCH has a fixed payload size. The NR-PBCH is cyclically transmitted. The information carried by the NR-PBCH is referred to as first NR system information or NR-MIB.

The NR-MIB included in the NR-PBCH is encoded by polar codes. Note that the NR-MIB may be encoded by LDPC (Low-Density Parity Check) codes. Alternatively, the NR-MIB may be encoded by convolutional codes.

The NR-PBCH may be scrambled using an NR cell identifier. The terminal apparatus descrambles the NR-PBCH using an NR cell identifier. Note that the NR-PBCH may be scrambled using other identifiers obtained by an NR-SS. Examples of other identifiers include a beam index and a time index.

Resource mapping of the NR-PBCH is sequentially allocated in a frequency direction in advance. In a specific example, symbols after modulation are sequentially allocated to a sub carrier of a head symbol in resource elements reserved for the NR-PBCH. Then, after allocation to all sub carriers of the head symbol, the symbols after modulation are sequentially allocated to a sub carrier of a subsequent symbol. By repeating these steps, the symbols after modulation are allocated to all the resource elements reserved for the NR-PBCH.

A sub carrier interval of the NR-PBCH is preferably identical to a sub carrier interval of the NR-SS.

The NR-PBCH may be transmitted while multiplexed with an RS for demodulating the NR-PBCH. The NR-PBCH may be demodulated using this RS. Note that the NR-PBCH may be demodulated using the NR-SS. In addition, the NR-PBCH may be demodulated using a MRS.

For example, the NR-PBCH is transmitted by a primary cell. In addition, the NR-PBCH is transmitted by a stand-alone cell. Note that transmission of the NR-PBCH by a secondary cell is not required. In addition, transmission of the NR-PBCH by a non-stand-alone cell is not required.

<Details of Control Sub Band in Present Embodiment>

A control sub band (control resource set) is a physical resource where the PDCCH and the NR-PDCCH are arranged. Examples of the control sub band include a control sub band (common control sub band) set in common to the terminal apparatuses connected to the corresponding base station, and a control sub band (terminal specific sub band) individually set for the corresponding terminal apparatus.

The common control sub band is used for the PDCCH which controls the PDSCH transmitted in common to terminals of cells or in common to a group of the terminal apparatuses. The common control sub band is set by the NR-MIB.

Examples of the NR-PDCCH transmitted by the common control sub band include the NR-PDCCH which schedules the NR-PDSCH carrying second or following system information, paging, a random access response, a message 4 and the like.

The terminal apparatus specific sub band is used for the NR-PDCCH which controls the NR-PDSCH transmitted in common to a group of the terminal apparatuses or individually to the terminal apparatus using the NR-PDCCH. The terminal apparatus specific sub band is set by dedicated RRC signaling for the terminal apparatus.

<Initial Connection Procedure in Present Embodiment>

Initial connection is a step which shifts from a state of no connection between the terminal apparatus and any cell (idle state) to a state of establishment of connection between the terminal apparatus and any cell (connection state). Note that a step which shifts to the connection state from a state where the terminal apparatus is not active even after completion of RRC setting with connection to a cell (inactive state) may be considered as the initial connection.

Figure 12:
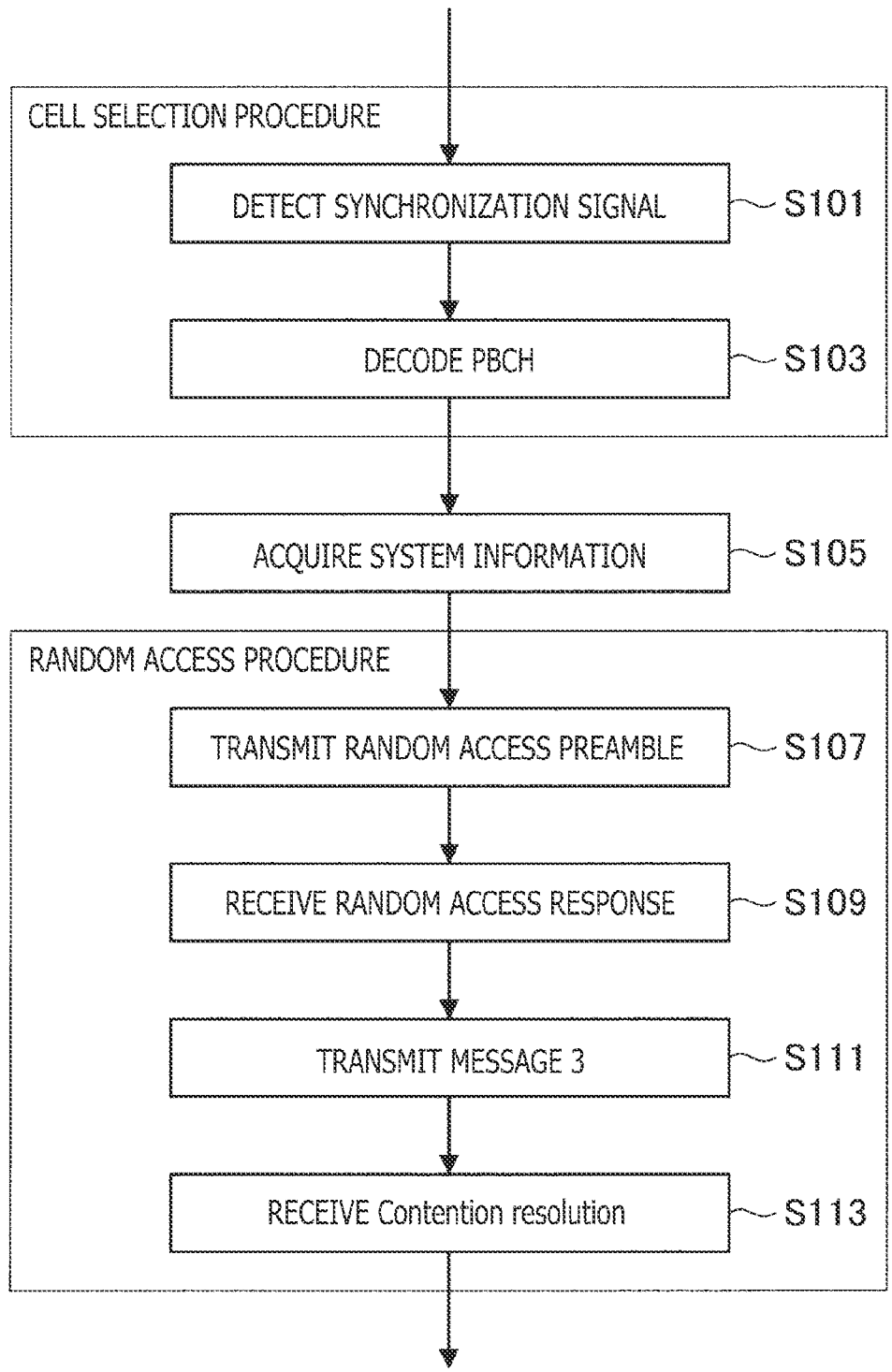
FIG. 12 is a diagram depicting an example of an initial connection procedure of the terminal apparatus.

FIG. 12 depicts an example of an initial connection procedure of the terminal apparatus. The terminal apparatus in the idle state initially performs a cell selection procedure (S101 to S103). The cell selection procedure includes steps of synchronization signal detection and PBCH decoding. The terminal apparatus achieves synchronization of a downlink with the cell on the basis of detection of a synchronization signal (S101). Subsequently, after establishment of synchronization of the downlink, the terminal apparatus attempts decoding of the PBCH to acquire first system information (S103).

Then, the terminal apparatus acquires second system information on the basis of the first system information included in the PBCH (S105).

Thereafter, the terminal apparatus performs a random access procedure on the basis of the first system information and/or the second system information (S107 to S113). The random access procedure includes steps of transmission of a random access preamble, reception of a random access response, transmission of a message 3, and reception of contention resolution. The terminal apparatus initially selects a predetermined PRACH preamble, and transmits the selected PRACH preamble to the base station apparatus (S107). Subsequently, the terminal apparatus receives a PDSCH including a random access response corresponding to the PRACH preamble from the base station apparatus (S109). Thereafter, the terminal apparatus transmits, to the base station apparatus, a PUSCH including the message 3 using a resource scheduled by a random access response grant and included in the random access response (S111). Finally, the terminal apparatus receives a PDSCH including the contention resolution corresponding to the PUSCH from the base station apparatus (S113).

The message 3 described above includes an RRC message indicating an RRC connection request. The contention resolution includes an RRC message of an RRC connection setup. In a case of reception of the RRC message indicating the RRC connection setup, the terminal apparatus performs an RRC connection operation and shifts from an RRC idle state to an RRC connection state. After the shift to the RRC connection state, the terminal apparatus transmits an RRC message indicating RRC connection setup completion to the base station apparatus. The terminal apparatus is allowed to connect with the base station apparatus by this series of operations.

Note that the messages of the random access preamble, the random access response, the contention resolution, and the RRC connection setup completion are also referred to as a message 1, a message 2, the message 4, and a message 5, respectively. After completion of all the steps of the random access procedure, the terminal apparatus is allowed to shift to a state of connection to the cell (connection state).

Note that the random access procedure may be performed not only at the initial connection, but also at handover, uplink synchronization, a request for an uplink resource, a return from wireless link failure, a return from beam link failure, and other occasions.

Note that the random access procedure depicted in FIG. 12 is also referred to as a 4-step RACH procedure. Meanwhile, in a random access procedure referred to as a 2-step RACH procedure, the terminal apparatus transmits the message 3 along with transmission of the random access preamble, and the base station apparatus transmits the random access response and the contention resolution in response to the received message 3 and random access preamble.

The random access preamble is transmitted in association with the PRACH. The random access response is transmitted by the PDSCH. The PDSCH including the random access response is scheduled by the PDCCH. The message 3 is transmitted by the PUSCH. The PUSCH including the message 3 is scheduled by an uplink grant included in the random access response (random access response grant).

<Details of Synchronization Signal Block of NR in Present Embodiment>

In NR, a predetermined block to which one NR-PSS, one NR-SSS, and/or an NR-PBCH is transmitted (hereinafter referred to as "synchronization signal block") is defined. The terminal apparatus assumes one beam for transmitting the NR-SS and/or the NR-PBCH in a time instance of a predetermined synchronization signal block. The one NR-PSS, the one NR-SSS, and/or the one NR-PBCH is multiplexed within the synchronization signal block by time-division, frequency-division, space-division, and/or code-division.

Note that an MRS (mobility RS or mobility reference signal) may be included in the synchronization signal block. The MRS is used at least for RRM measurement. The terminal apparatus measures RSRP and/or RSRQ using the MRS. The MRS may have a configuration of CSI-RS. A sequence of the MRS may be scrambled by a time index.

Figure 13:
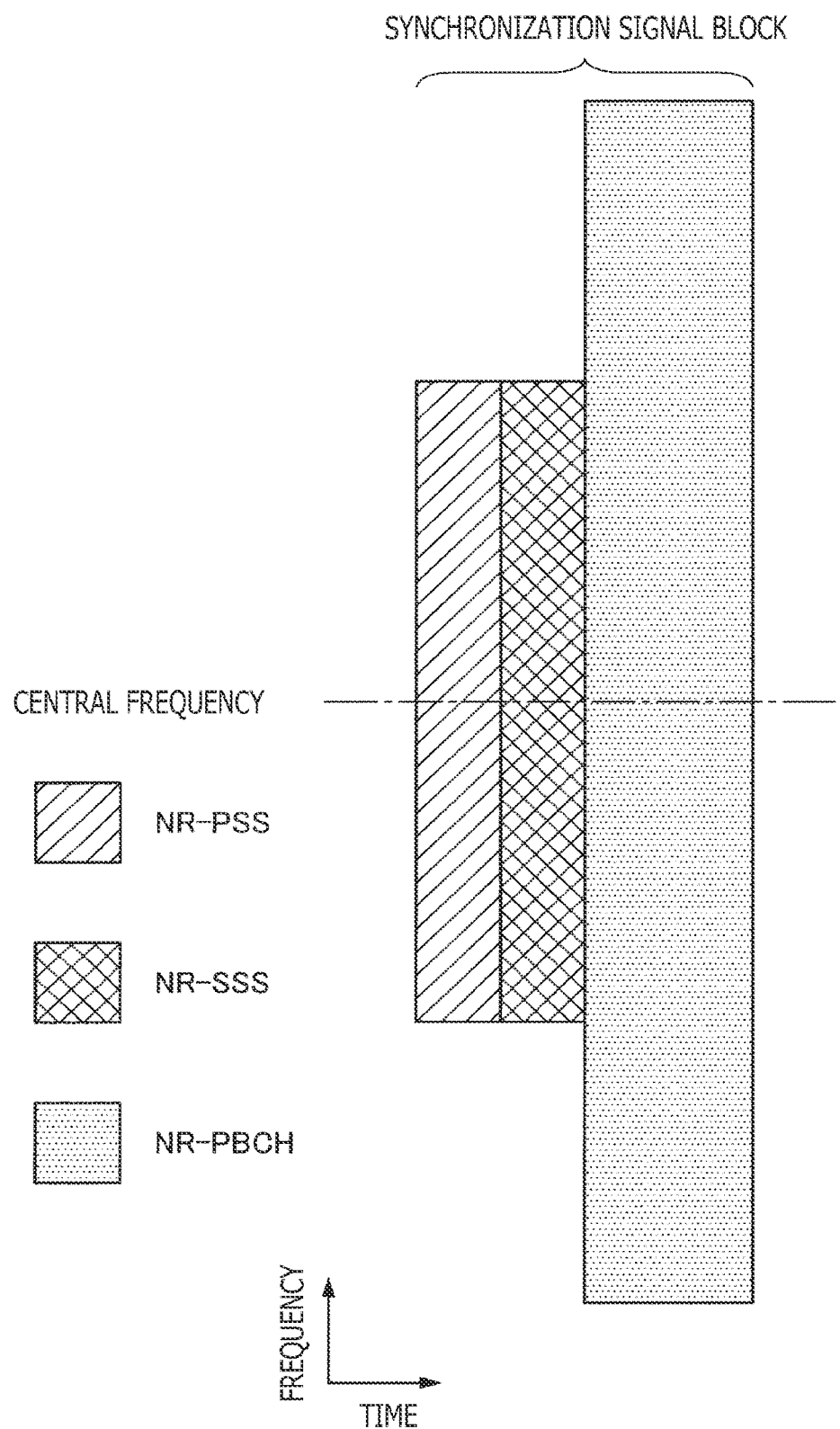
FIG. 13 is a diagram depicting an example of a configuration of a synchronization signal block.

FIG. 13 depicts an example of a configuration of the synchronization signal block. In FIG. 13, the NR-PSS, the NR-SSS, and the NR-PBCH are multiplexed by time-division within the one synchronization signal block. The terminal apparatus detects the NR-SS and receives the NR-PBCH on an assumption that the NR-SS and the NR-PBCH are transmitted at a predetermined central frequency and in a predetermined bandwidth.

Figure 14:
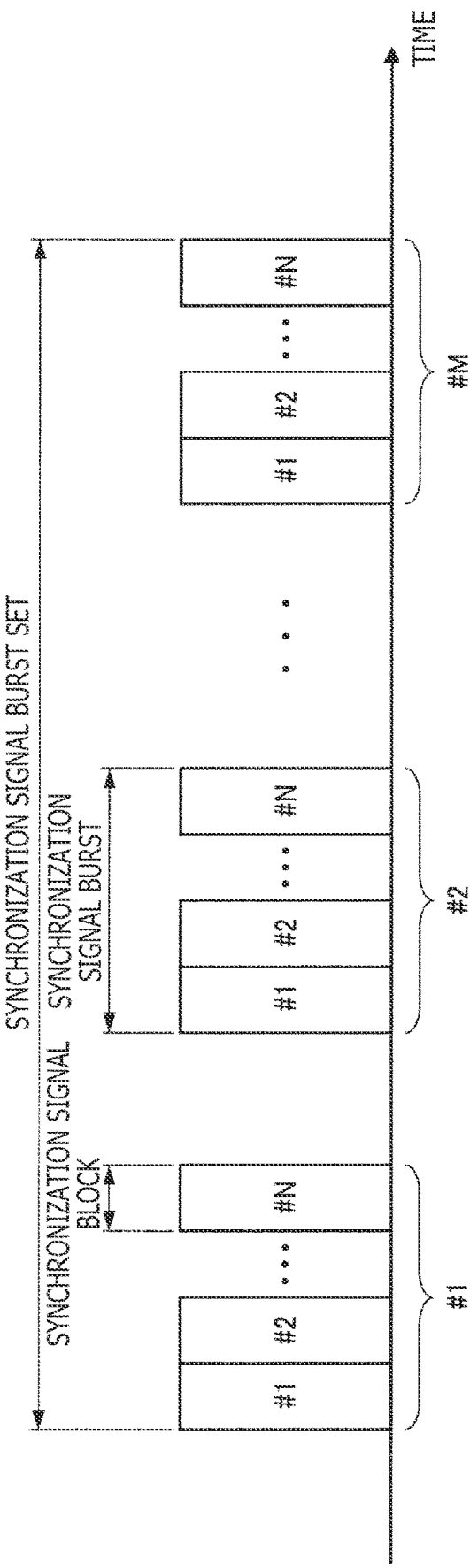
FIG. 14 is a diagram depicting an example of configurations a synchronization signal burst and a synchronization signal burst set.

In addition, a synchronization signal burst is defined in NR. FIG. 14 depicts an example of configurations of a synchronization signal burst and a synchronization signal burst set. The synchronization signal burst includes one or a plurality of synchronization signal blocks. The example depicted in FIG. 14 defines N synchronization signal blocks as a synchronization signal burst. The respective synchronization signal blocks included in the synchronization signal burst may be successive blocks.

The synchronization signal set is further defined in NR. The synchronization signal burst set includes one or a plurality of synchronization signal bursts. The example depicted in FIG. 14 defines M synchronization signal bursts as a synchronization signal burst set.

The terminal apparatus achieves synchronization with an NR cell assuming that the synchronization signal set is cyclically transmitted. In addition, the terminal apparatus performs various processes assuming that the synchronization signal burst set is cyclically transmitted. Meanwhile, the base station apparatus is not required to transmit the synchronization signal burst set in a predetermined time instance. The terminal apparatus assumes an initial cycle at the time of initial connection, and attempts detection of the synchronization signal burst set. In addition, the cycle of the synchronization signal burst set may be set by the upper layer. In a case where the cycle of the synchronization signal burst set is set by the upper layer, the terminal apparatus may overwrite a value of the cycle set by the upper layer on the value of the cycle set beforehand.

Note that synchronization signal burst sets transmitted in different time instances are not required to be transmitted through identical antenna port and TRP.

In addition, it is preferable that one of sub frames in each of which the synchronization signal burst set is arranged is a sub frame #0. In other words, it is preferable the synchronization signal burst set is disposed in the sub frame #0. The terminal apparatus is capable of recognizing the sub frame number in each of times by recognizing a head of the synchronization signal burst set.

An index on a time axis (time index) is allocated to each of the synchronization signal blocks. The time index of each of the synchronization signal blocks is included in the corresponding synchronization signal block and given to the terminal apparatus as a notice. The terminal apparatus is capable of recognizing a downlink transmission beam of the base station apparatus in the synchronization signal block, a wireless frame, and/or a sub frame boundary on the basis of the time index of the synchronization signal block. In addition, the terminal apparatus is capable of identifying the index of the synchronization signal block on the basis of the time index.

The time index of the synchronization signal block is an offset value from a boundary of a sub frame or a slot. The time index of the synchronization signal block in an example is indicated by an index of an OFDM symbol. Alternatively, in another example, the time index of the synchronization signal block may be indicated by an index of the synchronization signal block transmitted within the synchronization signal burst set. In addition, in a further example, the time index may be indicated by an index of a beam.

Examples of the notice of the time index of the synchronization signal block include a notice by a sequence of an NR-SS.

Examples of the notice of the time index of the synchronization signal block include a notice by a sequence of an NR-PBCH-DMRS.

Examples of the notice of the time index of the synchronization signal block include a notice by information included in an NR-MIB.

Examples of the notice of the time index of the synchronization signal block include a notice by a mapping position of bits of an NR-PBCH. In a specific example, the terminal apparatus is capable of recognizing the time index on the basis of a mapping start position of bits after encoding of the NR-PBCH included in the synchronization signal block.

Examples of the notice of the time index of the synchronization signal block include a notice by a mask of CRC of the NR-PBCH. In a specific example, the NR-PBCH is transmitted after CRC bits of the NR-PBCH is multiplied by a predetermined CRC mask corresponding to the time index. The terminal apparatus performs blind detection of the CRC mask which is likely to be multiplied by the CRC bits using CRC check. The terminal apparatus is capable of recognizing a time index by a value corresponding to the CRC mask for which decoding of the NR-PBCH has succeeded as a result of the CRC check.

Examples of the notice of the time index of the synchronization signal block include a notice by a sequence of the MRS.

Note that a notice of the time index of the synchronization signal block is not required to be given to the terminal apparatus in a case of the single beam operation.

Note that a notice of the time index of the synchronization signal block is not required to be given to the terminal apparatus by using the above method in a case where synchronization signal block timing and synchronization signal block identification are achievable. In a case where a notice of a time index of a synchronization signal block of another cell (e.g., serving cell such as a primary cell) is given from the other cell as a notice in an example, the time index is not required to be given to the terminal apparatus using the method described above. In another example where the terminal apparatus recognizes transmission of only one type of the synchronization signal block in the corresponding cell, a notice of the time index is not required to be given to the terminal apparatus using the method described above.

<System Information in Present Embodiment>

System information is information which gives a notification of settings in a cell transmitting the system information. Examples of the system information include information associated with an access to the cell, information associated with cell selection, and information associated with another RAT and another system.

The system information is classifiable into MIB and SIB. The MIB is information given by a PBCH as a notification, and having a fixed payload size. The MIB includes information for acquiring SIB. The SIB is system information other than the MIB. The SIB is a notification given by a PDSCH.

In addition, the system information is classifiable into first system information, second system information, and third system information. Each of the first system information and the second system information includes information associated with an access to a corresponding cell, information associated with acquisition of other system information, information associated with cell selection, and others. In LTE, information included in the MIB is considered as the first system information, and information included in SIB1 and SIB2 is considered as the second system information. In a case where all the first system information and the second system information are not acquired from a corresponding cell, the terminal apparatus assumes that an access to the cell is prohibited.

The MIB is information associated with a physical layer necessary for receiving the system information. For example, the MIB includes a system bandwidth of a downlink, a part of a system frame number, scheduling information associated with the SIB, and others.

The SIB1 corresponds to information associated with cell access regulation information, and scheduling information associated with system information other than the SIB1. For example, the SIB1 includes cell access information, cell selection information, maximum uplink transmission power information, TDD setting information, a cycle of system information, mapping information associated with system information, a length of an SI window, and others.

For example, the SIB2 includes connection prohibition information, common radio resource setting information (radioResourceConfigCommon), uplink carrier information, and others. The radio resource setting information common to cells include setting information associated with the PRACH and the RACH common to cells. At the time of an initial access, the terminal apparatus performs a random access procedure on the basis of setting information associated with the PRACH and the RACH.

<System Information in NR in Present Embodiment>

In NR, system information is similarly given as a notification from an NR cell. A physical channel carrying the system information may be transmitted through a slot or a mini-slot. The mini-slot is defined by a smaller number of symbols than the number of symbols of the slot. By transmitting the physical channel carrying the system information through the minim-slot, a time necessary for beam sweeping can be reduced. Accordingly, reduction of overhead is achievable.

The first system information is transmitted by an NR-PBCH, while the second system information is transmitted by a physical channel different from the NR-PBCH.

In NR, the first system information is preferably information peculiar to a terminal apparatus group. For example, the terminal apparatus group is constituted by a plurality of terminal apparatuses grouped by predetermined beams. Each of the terminal apparatuses recognizes an identifier associated with the corresponding predetermined beam. In addition, for example, the terminal apparatus group is constituted by a plurality of terminal apparatuses grouped by predetermined TRPs. Each of the terminal apparatuses recognizes an identifier associated with the corresponding predetermined TRP. Furthermore, for example, the terminal apparatus group is constituted by a plurality of terminal apparatuses grouped by predetermined cells. Each of the terminal apparatuses recognizes an identifier associated with the corresponding predetermined cell.

The first system information includes information necessary for acquiring at least the second system information.

The first system information in an example includes scheduling information associated with a physical channel which carries the second system information. For example, the scheduling information includes a cycle and a time offset, a central frequency, a bandwidth, and others.

In addition, the first system information in an example includes information associated with a transmission method of a physical channel which carries the second system information. For example, information used for decoding of the physical channel include the number of antenna ports of the physical channel, an antenna port number, information associated with a transmission scheme such as SFBC (Space Frequency Block Coding), FSTD (Frequency-Switched Transmit Diversity), and CDD (Cyclic Delay Diversity), and information associated with CRC.

The first system information in an example includes a system frame number. Note that the first system information may include a hyper system frame number.

The first system information in an example includes information associated with a sub carrier interval and used for transmission of a physical channel which carries at least the second system information.

The first system information in an example includes setting information associated with a common control sub band. For example, the setting information associated with the common control sub band includes information such as information associated with a frequency resource, and/or information associated with a time resource. For example, a notice of the frequency resource is given by an index which indicates a resource block index (RB) or a resource block group (RGB) representing a plurality of resource blocks. The RBG preferably has a size equal to or smaller than a size of an RBG used for setting information associated with a terminal individual sub band. For example, a notice of the time resource is given by the number of OFDM symbols, a frequency and an offset of a slot, a sub frame, or a wireless frame, or others.

The first system information in an example includes information associated with timing within a wireless frame. The information associated with timing includes a time index, and/or information indicating a first half or a second half within the wireless frame.

The first system information in an example includes information associated with a bandwidth or a part of a bandwidth. This information is information associated with a downlink bandwidth used during an initial access. In addition, this information is used for reception of at least the second system information.

The first system information in an example includes information indicating whether or not the first system information and the second system information are associated with each other. In a case where this information indicates that the first system information and the second system information are associated with each other, the terminal apparatus is allowed to perform a reception process for receiving the second system information. On the other hand, in a case where the information indicates that the first system information and the second system information are not associated with each other, the terminal apparatus is not required to perform the reception process for receiving the second system information.

The first system information in an example includes information indicating whether or not the terminal apparatus is connectable to a corresponding cell. In a case where this information indicates that the terminal apparatus is connectable to the cell, the terminal apparatus is allowed to receive at least the second system information. On the other hand, in a case where the corresponding information indicates that the terminal apparatus is not connectable to the cell, the terminal apparatus is not required to perform the connection process, but may perform re-selection of a cell, or connect to the cell as a secondary cell or a primary secondary cell.

The first system information in an example includes information associated with a cycle of a synchronization signal burst set. As the cycle of the synchronization signal burst set, any one of 5 milliseconds, 10 milliseconds, 20 milliseconds, 40 milliseconds, and 80 milliseconds is set in accordance with the information.

The first system information in an example includes information associated with a synchronization signal block actually transmitted in a corresponding cell in resources which are likely to be transmitted in a synchronization signal burst set. For example, this information is allowed to be used for determining whether or not to perform, using the corresponding resource, RRM measurement, and/or perform monitoring of an NR-PDCCH, cyclic transmission of an uplink signal/channel to which the resource is allocated, and others.

The first system information in an example includes information associated with an area ID. The area ID is an identifier associated with an area. For example, this information may be used for a distinction between respective pieces of system information associated with areas. On the basis of this information, the terminal apparatus is capable of recognizing whether or not system information associated with a cell previously connected and system information associated with a cell newly connected are identical to each other. In addition, the terminal apparatus determines whether or not to update system information on the basis of the information. Furthermore, in a case where the system information is to be updated, the terminal apparatus also updates system information other than the first system information. In a case where the system information is not to be updated, the terminal apparatus updates only the first system information.

The first system information in an example includes information associated with a value tag. This information is used to indicate whether or not contents of the system information have been updated in a cell in which the corresponding information is transmitted. The terminal apparatus determines whether or not to update the system information on the basis of this information.

The first system information in an example includes information corresponding to extension information associated with a cell ID (cell identifier). This information is information associated with identification of a cell and extended from a cell ID transmitted by an NR-SS.

The first system information in an example includes information associated with a reference signal for tracking. For example, the reference signal for tracking is a CSI-RS. Specifically, information associated with the reference signal for tracking is information associated with RE mapping or an antenna port.

In addition, the first system information includes reservation bits used at the time of future function extension.

The first system information and/or second system information includes at least information associated with a random access procedure. Specifically, the information associated with the random access procedure is setting information associated with an NR-PRACH and an NR-RACH.

Examples of the setting information associated with the NR-PRACH and the NR-RACH include information associated with a sequence of the NR-PRACH, information associated with a resource of the NR-PRACH, and information associated with repetitive transmission of the NR-PRACH.

The second system information in an example includes information associated with cell selection. Examples of the information associated with the cell selection include setting information associated with an evaluation of cell selection, setting information associated with an access right of a neighbor cell, and setting information associated with a resource of an NR-SS of the neighbor cell.

Examples of the setting information associated with the evaluation of the cell selection include a threshold of the evaluation of the cell selection, and an offset for cell range extension.

Examples of the setting information associated with the access right of the neighbor cell include a list of access denied cells (black list).

Examples of the setting information associated with the resource of the NR-SS of the neighbor cell include information associated with a frequency position of the NR-SS, and information associated with a cycle of an NR-SS burst set.

Examples of the physical channel carrying the second system information include an NR-SPBCH (NR-Secondary Physical Broadcast Channel). The NR-SPBCH is a channel not scheduled by the NR-PDCCH. Information carried by the NR-SPBCH has a fixed payload size. The NR-SPBCH is cyclically transmitted. The NR-SPBCH and the NR-PBCH are different from each other in view of the payload size, the resource mapping, and the cycle.

Examples of the physical channel carrying the second system information include the NR-PDSCH. The NR-PDSCH is scheduled by the NR-PDCCH to which CRC scrambled by an SI-RNTI is added. Note that the information carried by the NR-PDSCH is encoded by LDPC codes.

The physical channel carrying the second system information is preferably transmitted by QPSK, but may be transmitted by other modulation methods such as 16 QAM and 64 QAM.

In NR, the second system information is preferably information peculiar to a terminal apparatus group. For example, the terminal apparatus group is constituted by a plurality of terminal apparatuses grouped by predetermined beams. Each of the terminal apparatuses recognizes an identifier associated with the corresponding predetermined beam. For example, the terminal apparatus group is constituted by a plurality of terminal apparatuses grouped by predetermined TRPs. Each of the terminal apparatuses recognizes an identifier associated with the corresponding predetermined TRP.

In NR, the physical channel carrying the second system information and the physical channel carrying the first system information are associated with each other. The terminal apparatus decodes the second system information on the basis of the physical channel carrying the first system information.

FIG. 15 depicts an example of system information corresponding to a synchronization signal block. In FIG. 15, a synchronization signal block #1 to a synchronization signal block #N are transmitted, and system information #1 to system information #N are transmitted. The respective synchronization signal blocks are associated with the respective pieces of system information such that the synchronization signal block #1 is associated with the system information #1, and that the synchronization signal block #2 is associated with the system information #2. In a case of reception of a predetermined synchronization signal block, the terminal apparatus decodes corresponding system information on the basis of the predetermined synchronization signal block.

In this case, the terminal apparatus acquires the system information associated with the received synchronization signal block. At the same time, the system information associated with the synchronization signal block not received is difficult to acquire by the terminal apparatus. In other words, the terminal apparatus acquires system information suited for the terminal apparatus, but need not acquire system information not suited for the terminal apparatus.

Figures 16, 17:
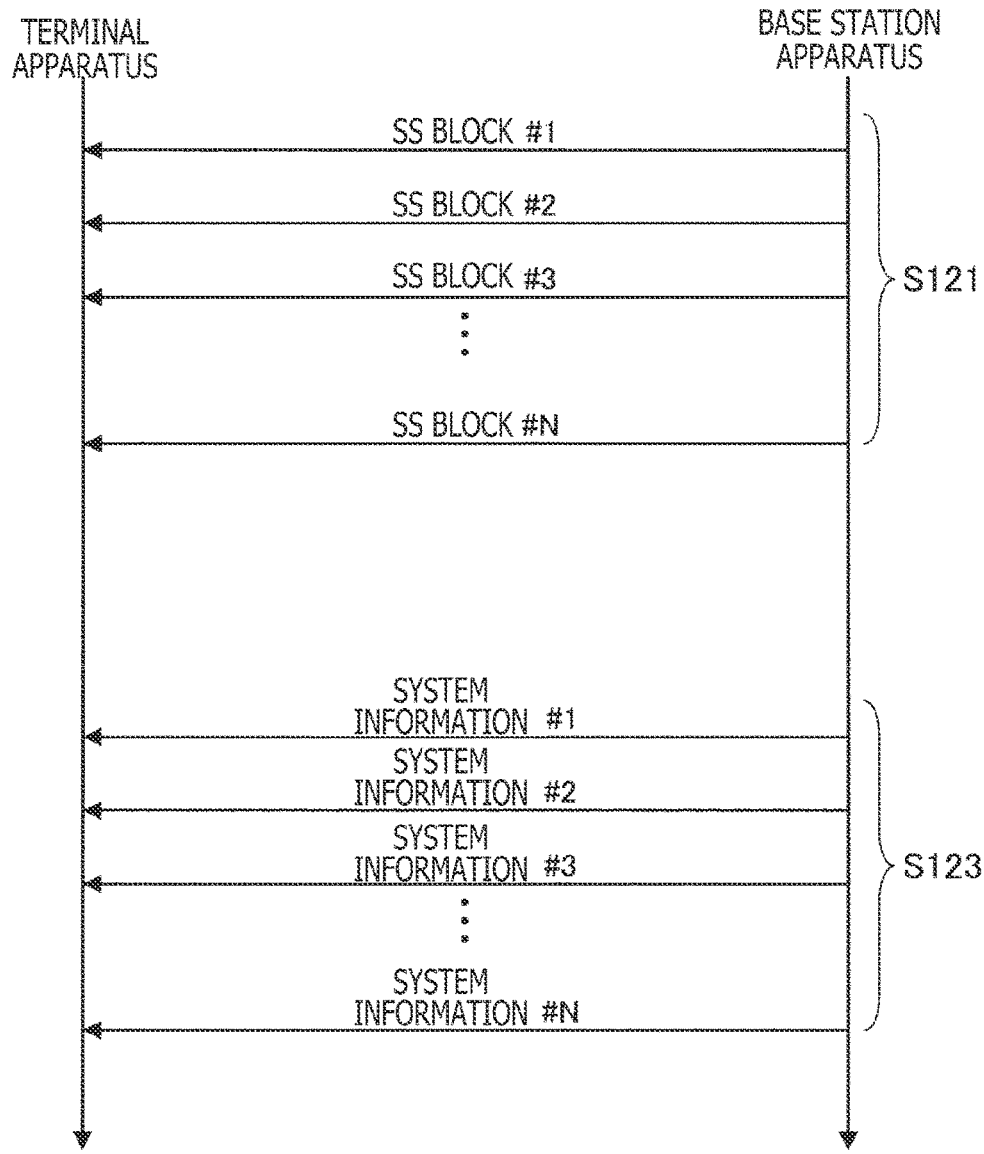
FIG. 16 is a diagram depicting an example of a sequence of system information corresponding to synchronization signal blocks.
FIG. 17 is a diagram depicting an example of a correspondence table indicating correspondence between a time index and a CRC mask.

FIG. 16 depicts an example of a sequence of system information corresponding to a synchronization signal block. Initially, the base station apparatus transmits SS (synchronization signal) blocks from #1 to #N. The terminal apparatus selects the SS block suited for the terminal apparatus on the basis of reception quality of the NR-SS included in the SS block and a decoding result of the NR-PBCH. In addition, the base station apparatus transmits physical channels including the system information #1 to #N, respectively. The terminal apparatus receives one of the system information #1 to #N in accordance with the information acquired from the suited SS block.

In an example of the foregoing association, a resource of a physical channel carrying the second system information is determined on the basis of the physical channel carrying the first system information.

The resource of the physical channel carrying the second system information in an example is instructed by NR-MIB included in the NR-PBCH. For example, the information associated with the resource indicates a part or all of a cycle and a time offset, a bandwidth, a central frequency or a resource block, and the repeating number of times.

The resource of the physical channel carrying the second system information in an example is determined on the basis of a condition for decoding of the NR-PBCH. For example, the condition includes a time index. More specifically, correspondence between a time and/or a frequency resource and the time index is determined, and an associated resource is determined on the basis of a value of the time index. The terminal apparatus attempts decoding of the physical channel several sub frames after on the basis of the time index for which the NR-PBCH has been detected.

The resource of the physical channel carrying the second system information in an example is fixed to a predetermined resource. For example, the resource is always arranged in a head sub frame.

The resource of the physical channel carrying the second system information in an example is scheduled by DCI of an NR-PDCCH arranged in a CSS. In this case, a common control sub band for which the CSS is set is set on the basis of the NR-MIB included in the NR-PBCH and the system information, or information acquired from the NR-SS. The common control sub band is a control sub band set in common to the terminal apparatuses, or set in common to the terminal apparatus group. The control sub band (control range or time/frequency resource used for control) is a predetermined band range where the NR-PDCCH is arranged. Examples of setting information associated with the common control band include setting information associated with a predetermined band range, a sub carrier interval of a control sub band, a CP length of a symbol, and setting information associated with a predetermined time section. Examples of the information associated with the predetermined band range include a bandwidth and a central frequency of the control sub band, or mapping information associated with the resource block (bitmap information associated with indexes of a start and an end of the resource block, and the resource block to be used). Examples of the setting information associated with the predetermined time section include a start symbol and/or an end symbol, and the number of symbols from the start or the end. Note that the band range of the common control sub band is preferably narrower than a minimum terminal apparatus reception bandwidth (e.g., 5 MHz) in a plurality of specified terminal apparatus reception bandwidths in view of power consumption.

A part or all of the setting information associated with the common control sub band may differ for each synchronization signal block. In other words, setting of the common control sub band may be independent of the synchronization signal block. The physical resource of the common control sub band to be set in a specific example may differ for each time index.

In addition, setting information associated with the common control sub band in another example is equalized in the synchronization signal block, but the CSS of the common control sub band may be determined on the basis of information associated with the synchronization signal block. In other words, the position of the CSS may be determined on the basis of the index of the corresponding synchronization signal block. In a specific example, the CSS corresponding to the synchronization signal block #0 may be started from NR-CCE #0, while the CSS corresponding to the synchronization signal block #1 may be started from NR-CCE #8.

In addition, in an example of the association, the physical channel carrying the second system information is decoded on the basis of information associated with the physical channel carrying the first system information. Identification information associated with the synchronization signal block is used as the physical channel carrying the second system information. Examples of the identification information associated with the synchronization signal block include a time index of the synchronization signal block.

The information associated with the physical channel carrying the first system information in an example is used for scrambling the physical channel carrying the second system information. The identification information associated with the synchronization signal block in a specific example is used for calculation of an initial value cinit of a scramble sequence c. Note that the scrambling is performed by following (Equation 1).

[Math. 1]

$$b(i) = (a(i) + c(i)) \mod 2 \quad \text{(Equation 1)}$$

In the above (Equation 1) herein, a(i) indicates an ith bit in a bit string before the scrambling, b(i) indicates an ith bit in a bit string after scrambling, and c(i) indicates an ith bit in a scramble sequence.

The information associated with the physical channel carrying the first system information in an example is used for determination of a CRC mask of the physical channel carrying the second system information. The CRC is scrambled by the CRC mask.

The identification information associated with the synchronization signal block in an example is used for determining one CRC mask included in a plurality of the CRC masks. For example, a correspondence table indicating correspondence between the identification information associated with the synchronization signal block and the CRC mask is defined. The bit string of the CRC mask is uniquely determined for the predetermined identification information on the basis of the correspondence table. FIG. 17 is a diagram depicting an example of the correspondence table indicating correspondence between the time index and the CRC mask. In the example depicted in FIG. 17, bit strings of the CRC mask are associated with time indexes #0 to #N.

The terminal apparatus acquires bit strings of the CRC mask on the basis of values of the acquired time index, and the correspondence table indicating correspondence between the value of the time index and the CRC mask.

Note that the CRC mask may be applied to a control channel which schedules the physical channel carrying the second system information.

In addition, bit strings each having a long distance between codes are preferably adopted as candidates of the CRC mask.

The identification information associated with the synchronization signal block in an example is used for calculation of a value of the SI-RNTI. In a specific example, the SI-RNTI is calculated by a calculation formula of "SI-RNTI=A·time index+C." In this formula, each of A and C is a predetermined constant. The terminal apparatus descrambles the CRC by the CRC mask after conversion of the SI-RNTI into bit strings.

<Details of PRACH of NR in Present Embodiment>

An NR-PRACH includes a Zadoff-Chu sequence or an M-sequence. In the NR-PRACH, a plurality of preamble formats is specified. Each of the preamble formats is specified by a combination of parameters such as a sub carrier interval of the PRACH, a transmission bandwidth, a sequence length, the number of symbols used for transmission, the transmission repeating number, a CP length, and a guard period length. Note that the type of the sequence used for transmission of the NR-PRACH (Zaddoff-Chu-sequence or M-sequence) may be specified in accordance with the preamble format.

Settings associated with the NR-PRACH for the terminal apparatus in an idle mode are determined on the basis of the system information. Furthermore, settings associated with the NR-PRACH for the terminal apparatus in a connection mode are determined by dedicated RRC signaling.

The NR-PRACH is transmitted by a physical resource by which the NR-PRACH is transmittable (NR-PRACH occasion). The physical resource is instructed in accordance with the settings associated with the NR-PRACH. The terminal apparatus selects any one of the physical resources, and transmits the NR-PRACH by the selected physical resource. Furthermore, the terminal apparatus in the connection mode transmits the NR-PRACH using an NR-PRACH resource. The NR-PRACH resource is a combination of an NR-PRACH preamble and the corresponding physical resource. The base station apparatus is capable of issuing an instruction of the NR-PRACH resource to the terminal apparatus.

The types of the sequences of the preambles of the NR-PRACH are numbered. Each of the numbers of the types of the sequences of the preambles is referred to as a preamble index.

The NR-PRACH is retransmitted at the time of a failure of the random access procedure. The terminal apparatus waits for transmission of the NR-PRACH in a standby period calculated from a value of backoff (backoff indicator, BI) at the time of retransmission of NR-PRACH. Note that the value of backoff may differ for each terminal category of the terminal apparatus or priority of caused traffic. In this case, a notice of a plurality of the values of backoff is given, and the terminal apparatus selects the value of backoff to be used in accordance with priority. In addition, at the time of retransmission of the NR-PRACH, transmission power of the NR-PRACH is raised higher than that of initial transmission (this procedure is referred to as power ramping).

<Details of Random Access Response in Present Embodiment>

A random access response of NR is transmitted by an NR-PDSCH.

The NR-PDSCH including a random access response is scheduled by an NR-PDCCH which has CRC scrambled by an RA-RNTI. The NR-PDCCH is transmitted by a common control sub band. The NR-PDCCH is arranged in a CSS (common search space). Note that the value of the RA-RNTI is determined on the basis of a transmission resource (time resource (slot or sub frame), and frequency resource (resource block)) of the NR-PRACH corresponding to the random access response. In addition, the NR-PDCCH may be arranged in a search space corresponding to the NR-PRACH associated with the random access response. More specifically, the search space where the NR-PDCCH is arranged is set in association with the preamble of the NR-PRACH and/or the physical resource by which the NR-PRACH is transmitted. The search space where the NR-PDCCH is arranged is set in association with the preamble index and/or the index of the physical resource.

The NR-PDCCH corresponds to an NR-SS and QCL.

The random access response of NR corresponds to information associated with MAC. The random access response of NR includes at least an uplink grant for transmitting the message 3 of NR, a value of a timing advance used for adjusting frame synchronization of an uplink, and a value of a temporary C-RNTI. In addition, the random access response of NR includes a PRACH index used for NR-PRACH transmission corresponding to the random access response. Furthermore, the random access response of NR includes information associated with backoff used for standby of transmission of the PRACH. The base station apparatus performs transmission including these information by using the NR-PDSCH. The terminal apparatus determines whether or not the transmission of the random access preamble has succeeded on the basis of these information. In a case where it is determined that the transmission of the random access preamble has succeeded on the basis of the information, the terminal apparatus performs a transmission process for transmitting the message 3 of NR in accordance with the information included in the random access response. On the other hand, in a case where it is determined that the transmission of the random access preamble has failed, the terminal apparatus considers that the random access procedure has failed, and performs a retransmission process for retransmitting the NR-PRACH.

Note that the random access response of NR may include a plurality of uplink grants for transmitting the message 3 of NR. The terminal apparatus may select one resource for transmitting the message 3 from the plurality of uplink grants. In this manner, contention of transmission of the message 3 of NR can be reduced in a case where the different terminal apparatuses receive the same random access response of NR. Accordingly, more stable random access procedure can be provided.

<Details of Message 3 of NR in Present Embodiment>

The message 3 of NR is transmitted by the NR-PUSCH. The NR-PUSCH is transmitted using a resource instructed by a random access response.

The message 3 of NR includes an RRC connection request message.

Waveform of the NR-PUSCH including the message 3 of NR and transmitted is instructed by a parameter included in the system information. More specifically, an OFDM or a DFT-s-OFDM is determined by the instruction of the parameter.

In a case the message 3 of NR is normally received, the base station apparatus shifts to a transmission process for transmitting contention resolution. On the other hand, in a case where the message 3 of NR is not normally received, the base station apparatus is capable of again attempting reception of the message 3 of NR at least for a predetermined period.

In a specific example of a process performed after the message 3 of NR is not normally received, the base station apparatus instructs retransmission of the message 3 to the terminal apparatus. The base station apparatus transmits an instruction of retransmission of the message 3 by using a downlink resource a predetermined number of slots (or sub frames, wireless frames) after the resource for which transmission of the message 3 has been instructed.

Examples of the retransmission of the message 3 and the instruction of the transmission resource include an instruction of retransmission of a random access response.

The NR-PDSCH including the retransmitted random access response described above is scheduled by an NR-PDCCH which has CRC scrambled by an RA-RNTI. The value of the RA-RNTI is identical to a value of an RA-RNTI used for initial transmission. More specifically, the value of the RA-RNTI is determined on the basis of the transmission resource of the NR-PRACH corresponding to the random access response. Alternatively, the value of the RA-RNTI may be determined on the basis of information for identifying initial transmission or retransmission as well as the transmission resource of the NR-PRACH. The NR-PDCCH is arranged in the CSS (common search space).

In addition, the NR-PDSCH including the retransmitted random access response described above is scheduled by a temporary C-RNTI included in the random access response transmitted by initial transmission, or an NR-PDCCH which has CRC scrambled by a C-RNTI.

Another example of the instruction of the retransmission of the message 3 and the transmission resource is an instruction by the NR-PDCCH used for the instruction of retransmission of the message 3. The NR-PDCCH is an uplink grant. A resource of retransmission of the message 3 is instructed by DCI of the NR-PDCCH. The terminal apparatus performs retransmission of the message 3 on the basis of the instruction of the uplink grant.

In a specific example of the process performed after the message 3 of NR is not normally received, the base station apparatus attempts reception of the message 3 by a retransmission resource instructed beforehand.

In a case where a contention resolution is not transmitted from the base station apparatus after transmission of the message 3 within a predetermined period, the terminal apparatus transmits the NR-PUSCH including the message 3 using the retransmission resource instructed beforehand.

In addition, in a case where NACK for the message 3 is received, the terminal apparatus may transmit the NR-PUSCH including the message 3 using the retransmission resource instructed beforehand and corresponding to the NACK.

For example, the retransmission resource instructed beforehand is included in the system information or the random access response.

Note that in a case where the number of times of retransmission of the message 3 of NR exceeds a predetermined number, or in a case where reception of the contention resolution of NR does not succeed within a predetermined period, the terminal apparatus considers that the random access procedure has failed, and performs a retransmission process for retransmitting the NR-PRACH.

In addition, a transmission beam of the terminal apparatus used for retransmission of the message 3 of NR may be different from a transmission beam of the terminal apparatus used for initial transmission of the message 3.

In addition, in a case where neither the contention resolution of NR nor the instruction of retransmission of the message 3 is received within the predetermined period, the terminal apparatus considers that the random access procedure has failed, and performs the retransmission process of the NR-PRACH. For example, the predetermined period is set in accordance with the system information.

<Details of Contention Resolution of NR in Present Embodiment>

A contention resolution of NR is transmitted by an NR-PDSCH. The NR-PDSCH including the contention resolution is scheduled by an NR-PDCCH which has CRC scrambled by a temporary C-RNTI or a C-RNTI. The NR-PDCCH is transmitted in a common control sub band. The NR-PDCCH is arranged in a USS (terminal specific search space). Note that the NR-PDCCH may be arranged in a CSS.

In a case where the NR-PDSCH including the contention resolution is normally received, the terminal apparatus issues a response of ACK to the base station apparatus. Thereafter, the random access procedure is considered to have succeeded, and the terminal apparatus comes into the connection state. On the other hand, in a case where NACK corresponding to the NR-PDSCH including the contention resolution is received from the terminal apparatus, or in a case of no response, the base station apparatus retransmits the NR-PDSCH including the contention resolution. Furthermore, in a case where the contention resolution of NR is not received within a predetermined period, the terminal apparatus considers that the random access procedure has failed, and performs a retransmission process for retransmitting an NR-PRACH.

<Initial Beam Selection of NR in Present Embodiment>

The terminal apparatus selects a beam provided from the base station apparatus also in initial connection of NR.

The base station apparatus is capable of transmitting a beam different for each synchronization signal block.

Figure 18:
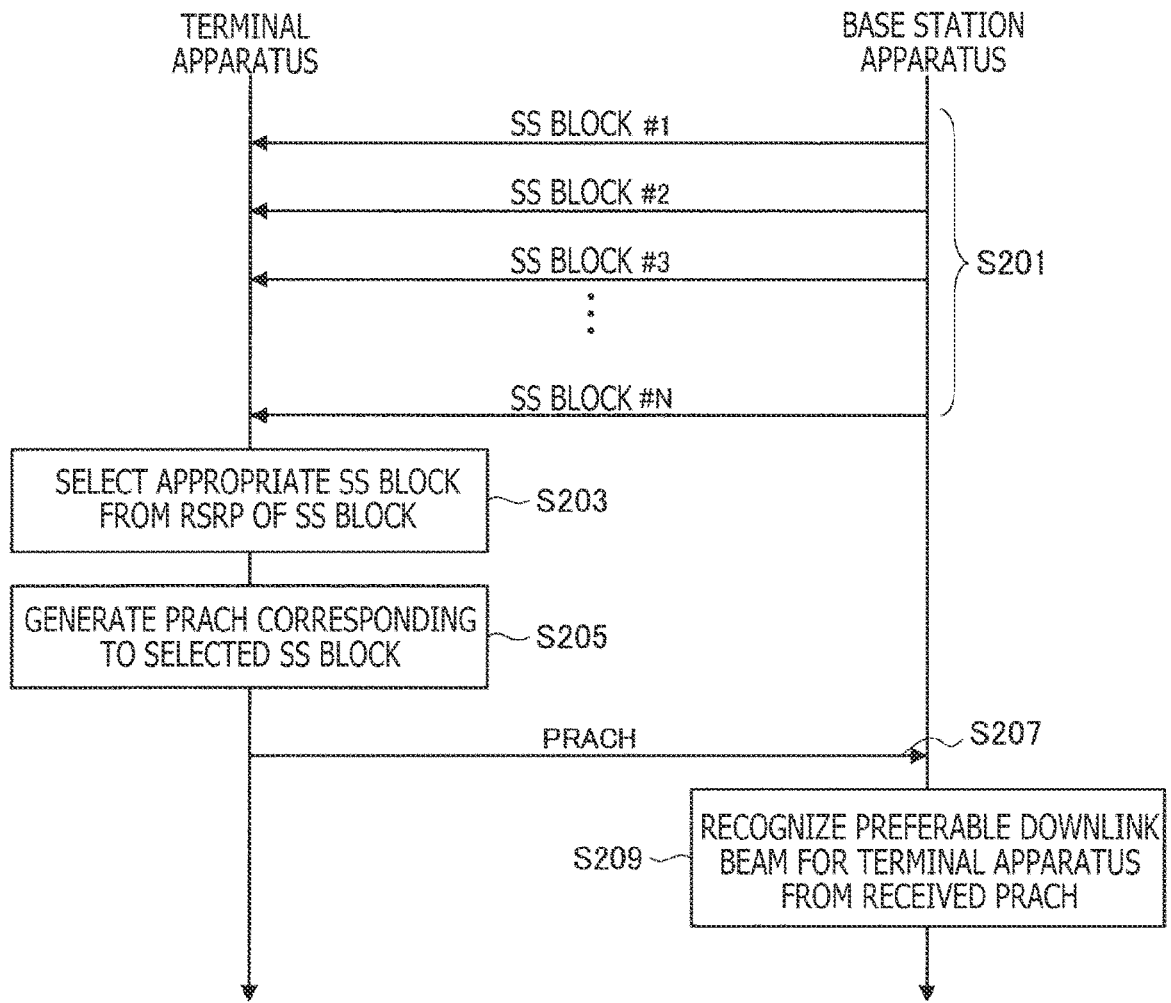
FIG. 18 is a diagram depicting an example of a communication sequence of initial beam selection in NR.

FIG. 18 is a diagram depicting an example of a communication sequence for initial beam selection in NR. As depicted in FIG. 18, the base station apparatus initially transmits N synchronization signal blocks (S201). The terminal apparatus measures N pieces of reception power (RSRP) and/or a signal to interference ratio (e.g., RSRQ or SINR) using an NR-SS transmitted by the corresponding synchronization signal block, and selects one synchronization signal block suited for connection (S203). Subsequently, the terminal apparatus determines a PRACH index and a PRACH resource corresponding to the selected synchronization signal block on the basis of RACH setting included in the system information (S205), and transmits the PRACH to the base station apparatus (S207). The base station apparatus is capable of acquiring the synchronization signal block number more suitable for the terminal apparatus in accordance with the received PRACH on the basis of a relationship between the index of the PRACH corresponding to the selected synchronization signal block and the PRACH resource. In other words, the base station apparatus is capable of recognizing a downlink beam more suitable for the terminal apparatus on the basis of the communication sequence depicted in FIG. 18, and is capable of applying the downlink beam to following downlink communication (S209).

<Beam Management Method for Initial Access of NR in Present Embodiment>

Described next will be an example of a method for beam management according to the present disclosure, focusing on beam management at an initial access of NR.

In the wireless communication system according to the present embodiment, the terminal apparatus again measures quality of beams, and feeds back information associated with a beam having preferable link quality (e.g., preferable beam other than initial beam) to the base station apparatus in addition to selection of the initial beam described with reference to FIG. 18. More specifically, the terminal apparatus adds information associated with a downlink beam (i.e., information associated with the foregoing beam having preferable link quality) to an uplink channel, for example, to feed back the information to the base station apparatus.

In a specific example, during an initial access, the terminal apparatus is only required to insert information associated with the downlink beam into a message (e.g., message 3) transmitted to the base station apparatus after reception of a random access response in the random access procedure, and feed back the message to the base station apparatus. More specifically, the terminal apparatus may use the message 1 for feedback of information associated with the best beam, and may use the message 3 for feedback of information associated with the best beam, or the second best beam next to the best beam.

Note that the terminal apparatus is allowed to feed back information associated with only one beam at the time of feedback of information associated with a preferable beam using the PRACH, such as the time of selection of the initial beam described with reference to FIG. 18. On the other hand, in the case of feedback using the message 3 during the random access procedure, the terminal apparatus is allowed to feed back information associated with a plurality of beams as well as one beam.

In addition, the base station apparatus at this time may provide a sharper beam than the beam provided during selection of the initial beam (i.e., signal so controlled as to have higher directivity). The wireless communication system of the present embodiment performing such control is capable of providing a higher quality link between the base station apparatus and the terminal apparatus.

Figure 19:
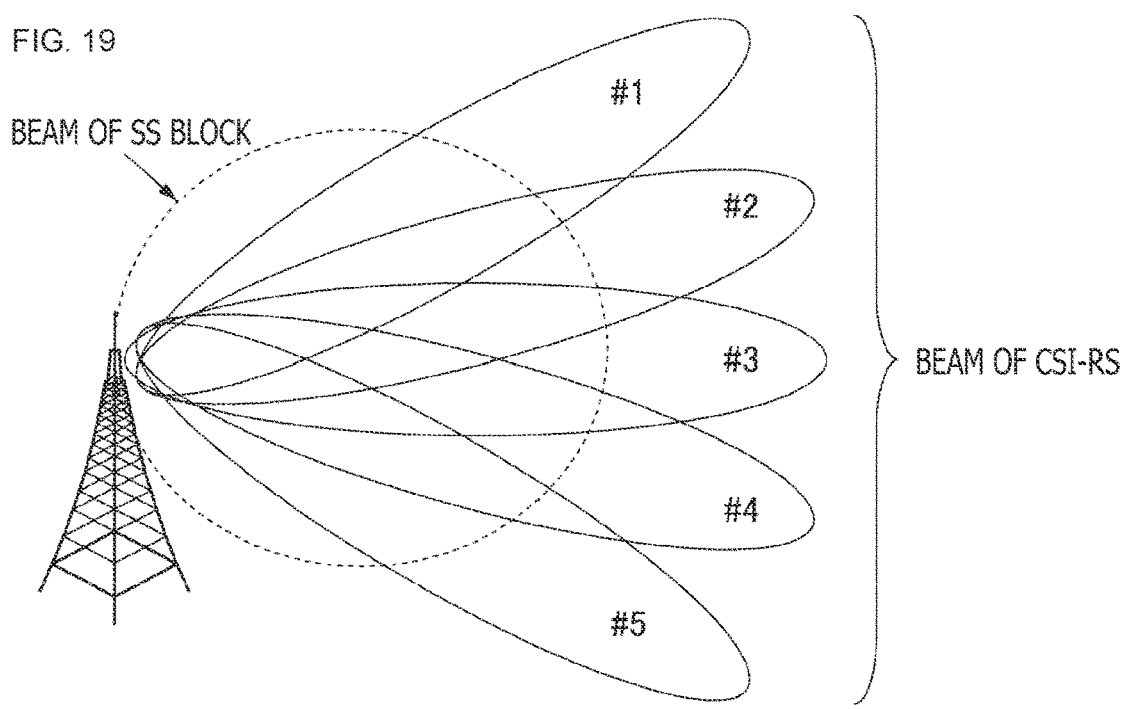
FIG. 19 is a diagram depicting an example of types of beam in beam refinement.

For example, FIG. 19 is a diagram depicting an example of types of beam during beam refinement. In the example depicted in FIG. 19, respective robes of beams of a synchronization signal block (beams indicated by a broken line in the figure), and beams of CSI-RS (beams indicated by solid lines in the figure). More specifically, in the example depicted in FIG. 19, the terminal apparatus selects a looser beam (i.e., beam having lower directivity) for the purpose of reduction of the connection time during the initial connection. Subsequently, the terminal apparatus selects a sharper beam (i.e., beam having higher directivity) on the basis of the looser beam after selection of the looser beam and establishment of an access to the base station apparatus. The procedure for accessing with a sharper beam on the basis of a looser beam in this manner is also referred to as "beam refinement."

By performing the control described above, the base station apparatus is capable of acquiring information associated with a plurality of beams from the terminal apparatus. In addition, by performing the control described above, the base station apparatus is capable of using a plurality of beams for downlink transmission of the message 4 and the following messages in the random access procedure. Accordingly, the wireless communication system of the present embodiment is capable of securing robustness for propagation losses produced by shielding wireless signals or the like in comparison with a case of use of only one beam. More specifically, the base station apparatus is capable of continuing communication with the terminal apparatus by using the second best beam even under an environment where losses are produced by shielding of the best beam by any shield.

In addition, a plurality of beams is allowed to be used in the message 4 and the following messages in the random access procedure. Accordingly, the procedure of the initial access can be completed more stably and rapidly in comparison with the case of use of only one beam. Particularly at the procedure of the initial access, a probability of failure of the procedure of the initial access increases in a case where a stable beam is difficult to provide. In addition, in a case of failure of the procedure of the initial access, the corresponding procedure may be required to be repeated from the beginning. Particularly, when the number of the terminal apparatuses attempting execution of the procedure increases, a contention probability of respective signals and channels in the RACH procedure increases. Accordingly, completion of the procedure may become more difficult to achieve. Even in this case, the wireless communication system of the present embodiment is capable of more stably and more rapidly completing the procedure of the initial access.

(Beam Management Method 1: Method Using Synchronization Signal Block)

Next, a method using a synchronization signal block as an example of the method of beam management will be hereinafter described.

The base station apparatus is capable of giving a notice of information associated with a synchronization signal block to the terminal apparatus in accordance with the system information. Examples of the information associated with the synchronization signal block include information associated with a synchronization signal block actually transmitted, and information associated with a beam used for transmission of the synchronization signal block. Note that transmission of no synchronization signal block is allowed. Information indicating this state may be inserted into the information associated with the synchronization signal block. In other words, for example, the information associated with the synchronization signal block may include information indicating the synchronization signal block actually transmitted by the base station apparatus in synchronization signal blocks allowed to be transmitted, for example.

Examples of the information fed back to the base station apparatus from the terminal apparatus include an index identifying the synchronization signal block, and information associated with the time of transmission of the synchronization signal block (e.g., information indicating a sub frame, a slot, and a symbol). For example, indexes corresponding to all synchronization signal blocks likely to be transmitted may be fed back from the terminal apparatus to the base station apparatus as indexes for identifying the synchronization signal blocks. In addition, in another example, an index corresponding to the synchronization signal block actually transmitted may be fed back from the terminal apparatus to the base station apparatus.

Furthermore, the terminal apparatus may feed back additional information as well as the information for identifying the synchronization signal block (e.g., index) to the base station apparatus. Examples of the additional information include a measurement result of reception power (RSRP) of the signal block for which the information is fed back. In addition, the terminal apparatus may feed back to the base station apparatus, as the additional information, a comparison result of predetermined information between the initial beam and the beam corresponding to the synchronization signal block for which information is fed back. In a specific example, the terminal apparatus may feed back to the base station apparatus, as the additional information, information indicating whether or not channel quality of the beam corresponding to the target synchronization signal block is higher than channel quality of the initial beam. In addition, in another example, the terminal apparatus may feed back to the base station apparatus, as the additional information, information associated with a difference in the reception power between the beam corresponding to the target synchronization signal block and the initial beam. Note that a reference signal corresponding to a measurement target at the time of determination of the initial beam (e.g., NR-SS included in the synchronization signal block) corresponds to an example of a "first reference signal." In addition, a reference signal corresponding to a target of measurement at the time of feedback of the information, i.e., the reference signal corresponding to a measurement target after a random access response corresponds to an example of a "second reference signal."

Furthermore, the terminal apparatus may also feed back information associated with a synchronization signal block transmitted from a neighbor cell to the base station apparatus. In this case, note that the terminal apparatus may give a notice of information for identifying the neighbor cell (e.g., cell ID) to the base station apparatus.

Figure 20:
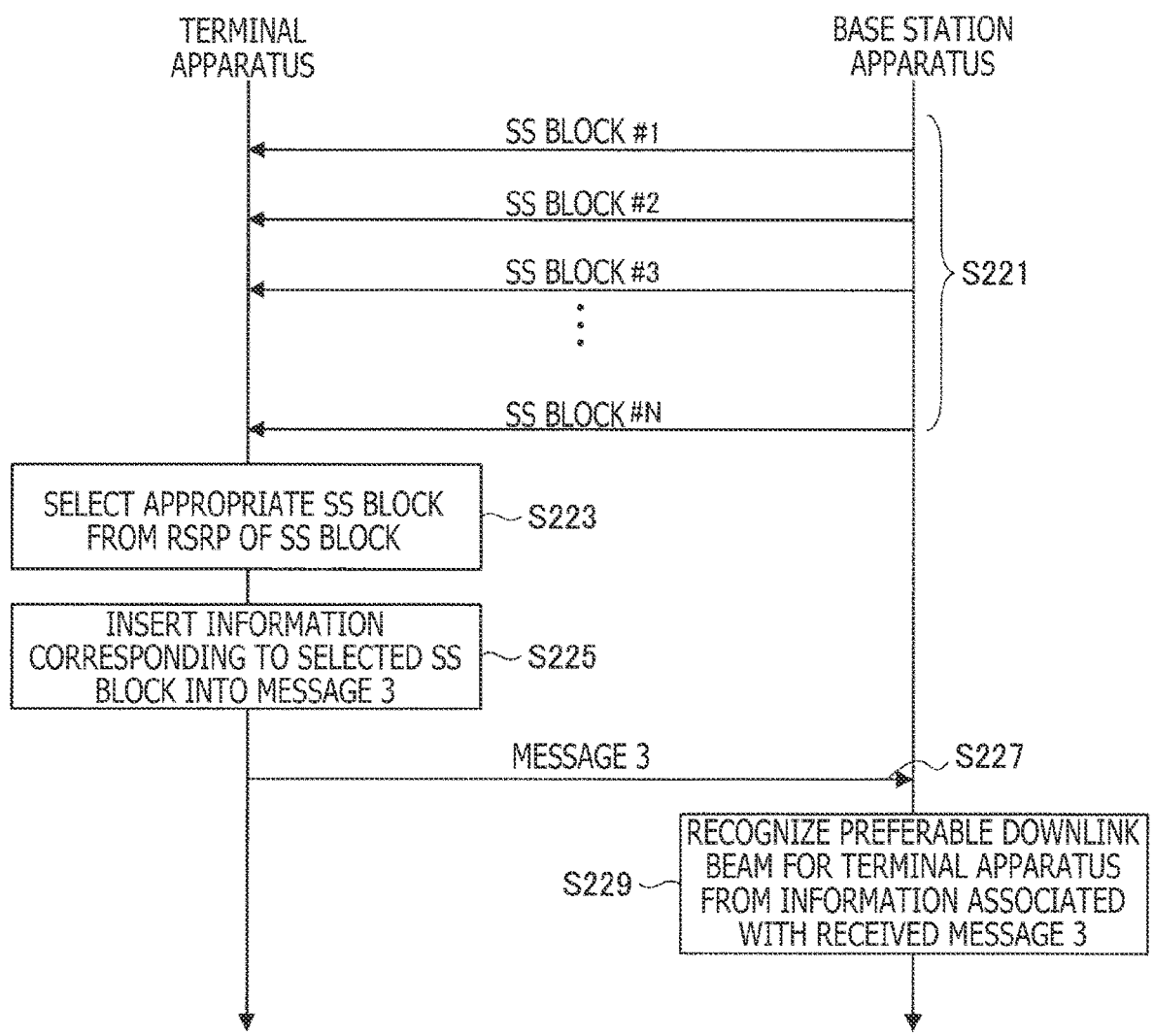
FIG. 20 is a diagram depicting an example of a communication sequence in beam management according to the embodiment.

An example of a communication sequence in beam management using a synchronization signal block will be herein described with reference to FIG. 20. FIG. 20 is a diagram depicting an example of a communication sequence in the beam management according to the present embodiment, presenting an example of a method using a synchronization signal block. As depicted in FIG. 20, the base station apparatus initially transmits N synchronization signal blocks (S221). The terminal apparatus measures N pieces of reception power (RSRP) and/or a signal to interference ratio (e.g., RSRQ or SINR) using an NR-SS transmitted by the corresponding synchronization signal block, and selects one or more synchronization signal blocks suited for connection (S223). At this time, the terminal apparatus may select a plurality of synchronization signal blocks. Note that a configuration of a part selecting the synchronization signal block in the terminal apparatus corresponds to an example of a "selection unit," and may correspond to the control unit 203 depicted in FIG. 6, for example. Subsequently, the terminal apparatus inserts information corresponding to the one or more selected synchronization signal blocks into the message 3 in the random access procedure (S225), and transmits the message 3 to the base station apparatus (S227). The base station apparatus is capable of acquiring one or more synchronization signal block numbers more suited for the terminal apparatus (and antenna information associated with transmission of the synchronization signal block) from the received message 3 on the basis of the information corresponding to the selected synchronization signal block. In other words, by the communication sequence depicted in FIG. 20, the base station apparatus is capable of recognizing one or more downlink beams more suited for the terminal apparatus, and is capable of applying the one or more downlink beams to following downlink communication (S229). Note that a configuration of a part included in the terminal apparatus and transmitting the message 3 to the base station apparatus corresponds to an example of a "notice unit," and may correspond to the transmission unit 207 depicted in FIG. 6, for example. In addition, a configuration of a part included in the base station apparatus and receiving the message 3 from the terminal apparatus (in other words, configuration acquiring the synchronization signal block number from the message 3) corresponds to an example of an "acquisition unit," and may correspond to the reception unit 105 depicted in FIG. 5, for example.

(Beam Management Method 2: Method Using Aperiodic CSI-RS)

Next, a method using an aperiodic CSI-RS will be hereinafter described as an example of the beam management method.

Aperiodic CSI-RS transmission will be initially described. The aperiodic CSI-RS transmission represents transmission of a CSI-RS once or a plurality of times by any trigger. Note that the aperiodic CSI-RS transmission requires CSI-RS setting and a trigger of the CSI-RS transmission.

A setting method of the aperiodic CSI-RS will be described. The base station apparatus gives a notice of setting of the aperiodic CSI-RS to the terminal apparatus in accordance with the system information. At this time, the setting of the aperiodic CSI-RS is transmitted in the second system information. In addition, examples of the setting of the aperiodic CSI-RS include information associated with timing, a cell ID, a QCL parameter, information associated with a sequence of the CSI-RS, information associated with the number of antenna ports and RE mapping, and numerology of the CSI-RS (sub carrier interval). For example, the timing is represented by a cycle and an offset. For example, the information associated with the QCL parameter may include information indicating a synchronization signal block establishing QCL (Quasi-Co-Location). In addition, for example, the information associated with the QCL parameter may include information indicating a PDCCH-DMRS establishing QCL. The information associated with the sequence of the CSI-RS may include information associated with a sequence type. In addition, the information associated with the sequence of the CSI-RS may include information associated with an initial value of the sequence. Furthermore, for example, mapping candidates may be determined beforehand, and indexes associated with the candidates may be given as a notice of information associated with the RE mapping.

In addition, all the terminal apparatuses within a cell each recognize a location where the CSI-RS is mapped in accordance with setting of the aperiodic CSI-RS regardless of whether or not the aperiodic CSI-RS is actually transmitted. Furthermore, the terminal apparatus performs demodulation and decoding assuming that a PDSCH is not arranged in RE where the CSI-RS is arranged.

Next described will be an operation associated with transmission of the aperiodic CSI-RS (particularly a relationship between a trigger and transmission). For example, the aperiodic CSI-RS is transmitted in association with a random access response in the random access procedure.

In a specific example, the CSI-RS may be transmitted at the same transmission timing as that of the random access response. In this case, the CSI-RS is transmitted in a slot identical to the slot for transmission of the random access response. In addition, in a case where schedule information associated with the random access response is acquired, the terminal apparatus receives the CSI-RS in a slot for which a random access response is scheduled.

Furthermore, in another example, the CSI-RS may be transmitted at timing after the random access response. In this case, the terminal apparatus recognizes the transmission timing of the CSI-RS on the basis of information included in the random access response. Examples of the information included in the random access response include a slot index. In this case, the CSI-RS is transmitted in a slot corresponding to the slot index. In addition, in a further example, the information included in the random access response may be information indicating a relative time between a slot for transmission of the random access response and a slot for transmission of the CSI-RS. In this case, the CSI-RS is transmitted in a slot transmitted after an elapse of a period indicated by the relative time from transmission of the random access response.

In addition, for example, the information associated with the CSI-RS setting such as the transmission timing described above may be transmitted while inserted into DCI scheduling a PDSCH including the random access response. Furthermore, in a further example, the information associated with the CSI-RS setting may be transmitted while inserted into the random access response.

Moreover, in a further example, the terminal apparatus may recognize the transmission timing of the CSI-RS on the basis of information included in setting of the aperiodic CSI-RS, and the random access response. In a specific example, the setting of the aperiodic CSI-RS may include information associated with the time at which the CSI-RS is likely to be transmitted (e.g., cycle and offset). In this case, for example, in a case where the random access response is received, the CSI-RS may be transmitted in a slot which is located after the slot of the received random access response, and is likely to be used for transmission of the latest CSI-RS.

Figure 21:
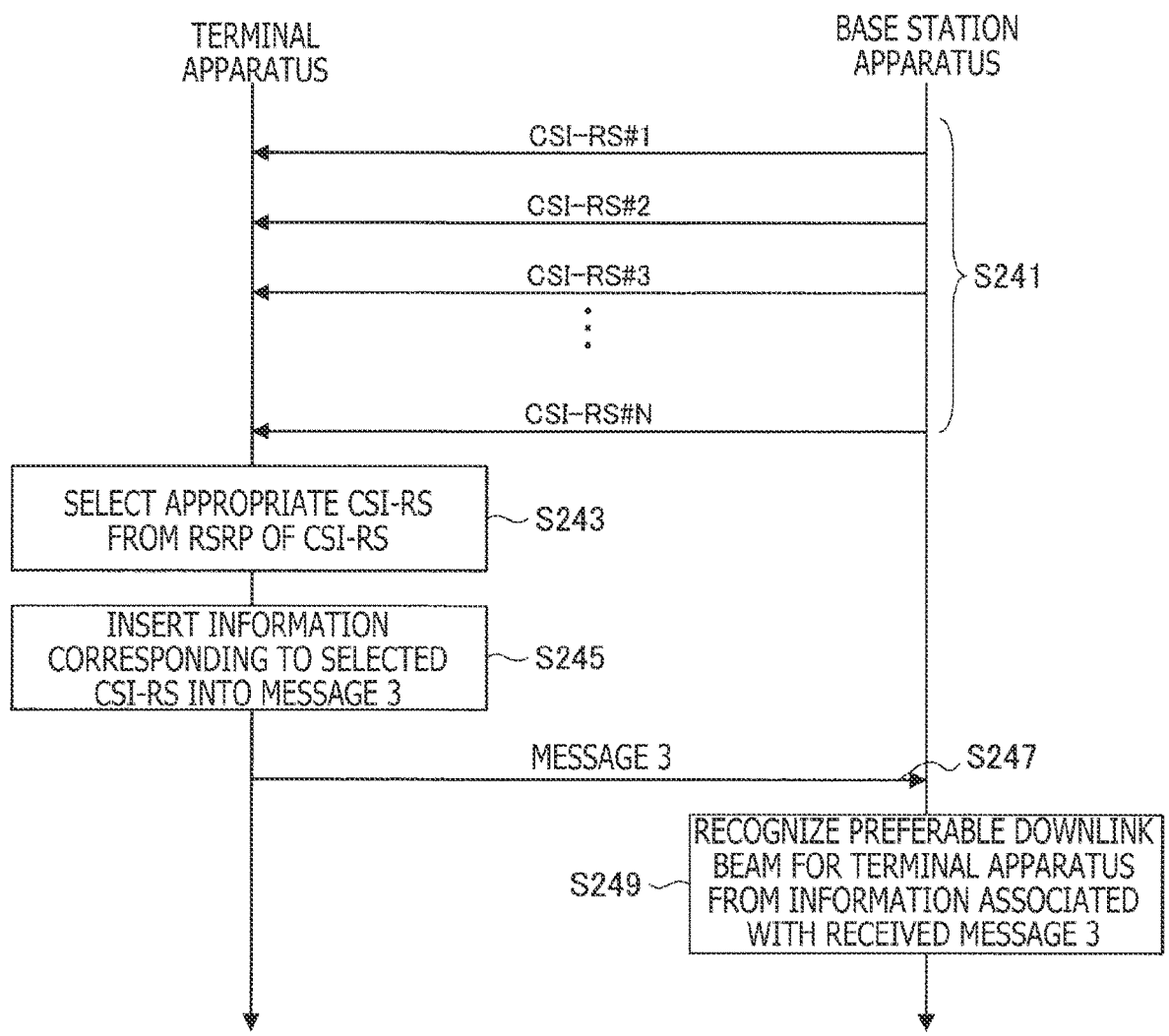
FIG. 21 is a diagram depicting an example of a communication sequence in beam management according to the embodiment.

Described herein with reference to FIG. 21 will be an example of a communication sequence of beam management using the CSI-RS. FIG. 21 is a diagram depicting an example of the communication sequence of the beam management according to the present embodiment, presenting an example of a method using the CSI-RS. As depicted in FIG. 21, the base station apparatus initially transmits N pieces of the CSI-RS (S241). The terminal apparatus measures reception power (RSRP) and/or a signal to interference ratio (e.g., RSRQ or SINR) of each of the N pieces of the SCI-RS, and selects one or more pieces of the CSI-RS suited for connection (S243). At this time, the terminal apparatus may select a plurality of pieces of the CSI-RS. Subsequently, the terminal apparatus inserts information corresponding to the selected one or more pieces of CSI-RS into the message 3 in the random access procedure (S245), and transmits the message 3 to the base station apparatus (S247). The base station apparatus is capable of acquiring one or more CSI-RS numbers more suited for the terminal apparatus (and antenna information associated with transmission of the CSI-RS) on the basis of the information included in the received message 3 (i.e., information corresponding to the selected CSI-RS). In other words, on the basis of the communication sequence depicted in FIG. 21, the base station apparatus is capable of recognizing one or more downlink beams more suited for the terminal apparatus, and is capable of applying the one or more downlink beams to following downlink communication (S249).

Note that both the beam management method 1 and the beam management method 2 described above may be executed. In this case, for example, the terminal apparatus may feed back information associated with a plurality of rough beams to the base station apparatus by using the beam management method 1, and feed back information associated with a fine beam by using the beam management method 2.

(Operation after Feedback of Information Associated with Beam Management)

Subsequently, an example of operations of the terminal apparatus and the base station apparatus after feedback of information associated with beam management from the terminal apparatus to the base station apparatus will be hereinafter described. Note that the beam corresponding to the information fed back from the terminal apparatus to the base station apparatus by the PRACH in the present explanation is also referred to as a "first beam" for convenience as described with reference to FIG. 18. More specifically, the first beam corresponds to one beam determined in accordance with information fed back from the terminal apparatus before a random access response in the random access procedure. In addition, at least in either the beam management method 1 or the beam management method 2 described with reference to FIGS. 20 and 21, the beam corresponding to the information fed back from the terminal apparatus to the base station apparatus by the message to be transmitted after the random access response such as the message 3 is also referred to as a "second beam" for convenience. More specifically, the second beam corresponds to one or more beams determined in accordance with information fed back from the terminal apparatus after the random access response. Note that a reference signal associated with the second beam is the NR-SS included in the synchronization signal block in the case of the beam management method 1, and is the CSI-RS in the case of the beam management method 2 as described above. In addition, antenna information corresponding to the first beam corresponds to "first antenna information," while antenna information corresponding to the second beam corresponds to "second antenna information."

In the wireless communication system according to the present embodiment, the terminal apparatus monitors a corresponding NR-PDCCH assuming QCL conditions of the first beam and the second beam described above, and performs reception and demodulation of the NR-PDCCH. In addition, the base station apparatus transmits a DMRS of the NR-PDCCH, and a reference signal associated with the first beam information from the same transmission point.

An example of an operation for switching QCL will be hereinafter described.

For example, as in the beam management method 1 and the beam management method 2 described above, QCL may be switched after beam management performed after reception of the random access response (in other words, feedback from the terminal apparatus to the base station apparatus using the message 3). In this case, for example, the DMRS of the NR-PDCCH and the reference signal associated with the first beam information may establish QCL before execution of the beam management. In addition, the DMRS of the NR-PDCCH and the reference signal associated with the second beam information may establish QCL after execution of the beam management. In other words, communication is controlled on the basis of the first antenna information corresponding to the first beam before execution of the beam management, and communication is controlled on the basis of the second antenna information corresponding to the second beam after execution of the beam management.

In addition, in another example, QCL may be switched between initial transmission and retransmission in a case where retransmission is performed in the communication between the base station apparatus and the terminal apparatus. In a specific example where transmission of the PDSCH including the message 4 is initial transmission, the DMRS of the NR-PDCCH and the reference signal associated with the first beam information may establish QCL. In addition, in a case where transmission of the PDSCH including the message 4 is retransmission, the DMRS of the NR-PDCCH and the reference signal associated with the second beam information may establish QCL. In other words, in the transmission of the PDSCH including the message 4, communication is controlled on the basis of the first antenna information corresponding to the first beam in the case of first transmission, while communication is controlled on the basis of the second antenna information corresponding to the second beam in the case of retransmission.

In addition, in a further example, QCL may be switched in accordance with a search space where the DMRS of the NR-PDCCH is arranged. For example, in a first search space and a second search space different from each other, the DMRS of the NR-PDCCH arranged in the first search space and the reference signal associated with the first beam information may establish QCL. In addition, the DMRS of the NR-PDCCH arranged in the second search space and the reference signal associated with the second beam information may establish QCL. In a more specific example, the DMRS of the NR-PDCCH arranged in a CSS and the reference signal associated with the first beam information may establish QCL. In addition, the DMRS of NR-PDCCH arranged in an USS and the reference signal associated with the second beam information may establish QCL. In other words, in a case where transmission data is transmitted via a physical channel belonging to the first search space, communication may be controlled on the basis of the first antenna information corresponding to the first beam. In addition, in a case where transmission data is transmitted via a physical channel belonging to the second search space, communication may be controlled on the basis of the second antenna information corresponding to the second beam.

In addition, in a further example, QCL may be switched in accordance with a symbol for transmission of the DMRS of the NR-PDCCH. For example, concerning a first OFDM symbol and a second OFDM symbol different from each other, the DMRS of the NR-PDCCH transmitted by the first OFDM symbol and the reference signal associated with the first beam information may establish QCL. In addition, the DMRS of the NR-PDCCH transmitted by the second OFDM symbol and the reference signal associated with the second beam information may establish QCL. In other words, in a case where a signal is transmitted by the first OFDM symbol, communication may be controlled on the basis of the first antenna information corresponding to the first beam. In addition, in a case where a signal is transmitted by the second OFDM symbol, communication may be controlled on the basis of the second antenna information corresponding to the second beam. Note that the first OFDM symbol corresponds to an example of a "first symbol," while the second OFDM symbol corresponds to an example of a "second symbol."

In addition, in a further example, QCL may be switched in accordance with information included in the NR-PDCCH referred to as a common PDCCH. For example, in a case of a notice indicating QCL with the reference signal associated with the first beam information on the basis of the information included in the NR-PDCCH, a DMRS of another NR-PDCCH and the reference signal associated with the first beam information may establish QCL. In addition, in a case of a notice indicating QCL with the reference signal associated with the second beam information on the basis of the information included in the NR-PDCCH, a DMRS of another NR-PDCCH and the reference signal associated with the second beam information may establish QCL.

The example of the operation associated with switching of QCL has been described above as an operation performed after feedback of information associated with beam management. Note that, while transmission of the DMRS of the NR-PDCCH has been focused on in the above description, a behavior similar to the behavior described above may be applied to a DMRS of an NR-PDSCH.

2. Application Examples

The technology according to the present disclosure is applicable to various products. For example, the base station apparatus 1 may be implemented as an eNB (evolved Node B) of any type, such as a macro eNB or a small eNB. The small eNB may be an eNB covering a smaller cell than a macro cell, such as a pico-eNB, a micro-eNB, and a home (femto)-eNB. Alternatively, the base station apparatus 1 may be implemented as a base station of other types, such as an NodeB and a BTS (Base Transceiver Station). The base station apparatus 1 may include a main body for controlling wireless communication (also referred to as base station apparatus), and one or more RRHs (Remote Radio Heads) disposed at a place different from the place of the main body. In addition, a terminal of various types described below may temporarily or semi-permanently execute a base station function to operate as the base station apparatus 1. Furthermore, at least a part of components of the base station apparatus 1 may be implemented in a base station apparatus or a module for a base station apparatus.

In addition, for example, the terminal apparatus 2 may be implemented as a smartphone, a tablet PC (Personal Computer), a note PC, a portable game terminal, a portable/dongle mobile router or a mobile terminal such as a digital camera, and an in-vehicle terminal such as a car navigation apparatus. Moreover, the terminal apparatus 2 may be implemented as a terminal performing M2M (Machine To Machine) communication (also referred to as MTC (Machine Type Communication)). Furthermore, at least a part of components of the terminal apparatus 2 may be implemented in a module mounted on these terminals (e.g., an integrated circuit module constituted by one die).

2.1. Application Example of Base Station

First Application Example

Figure 22:
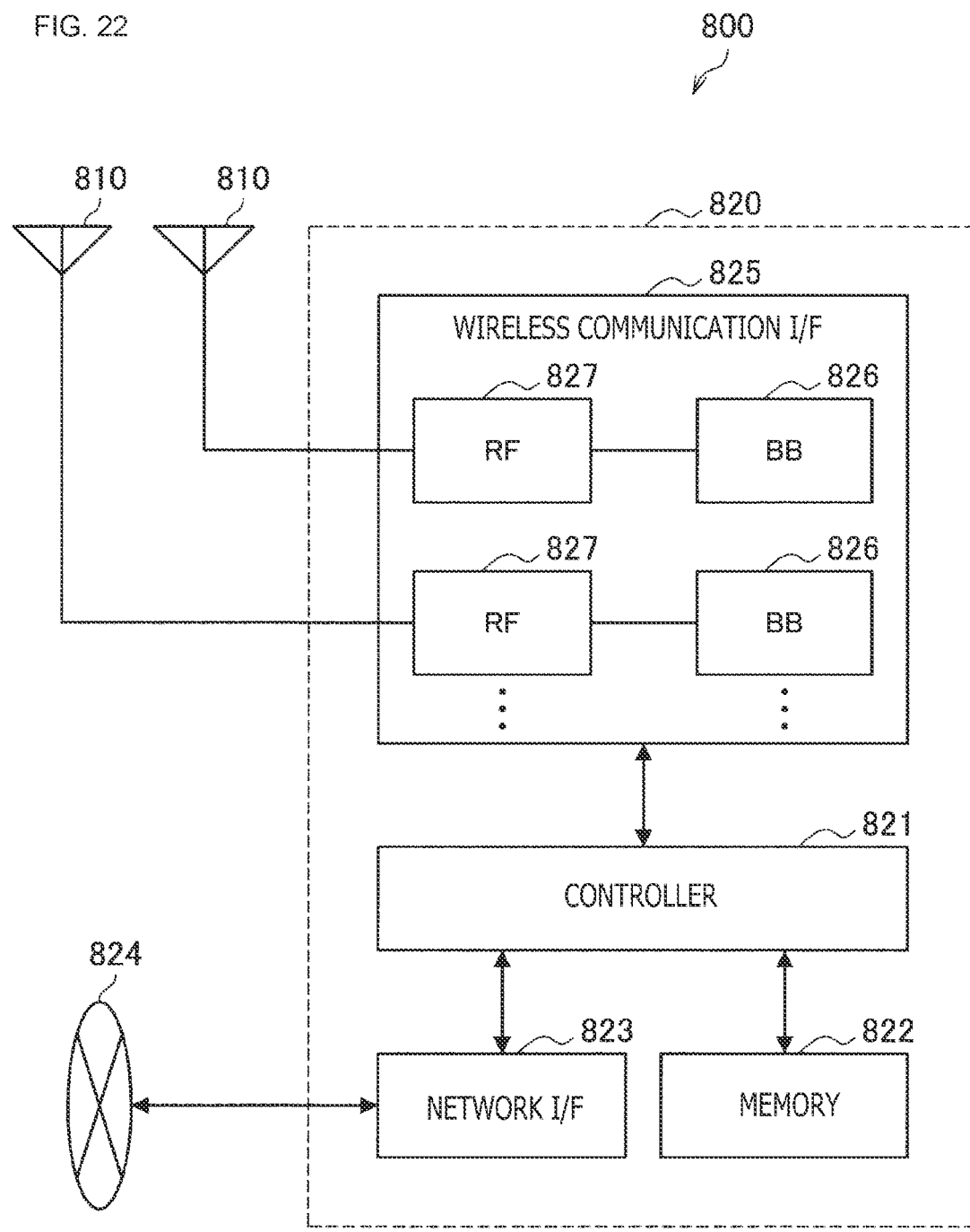
FIG. 22 is a block diagram depicting a first example of a schematic configuration of eNB.

FIG. 22 is a block diagram depicting a first example of a schematic configuration of an eNB to which the technology of the present disclosure is applicable. An eNB 800 includes one or more antennas 810, and a base station apparatus 820. The respective antennas 810 and the base station apparatus 820 may be connected to each other via an RF cable.

Each of the antennas 810 includes a single or a plurality of antenna elements (e.g., a plurality of antenna elements constituting a MIMO antenna), and is used for transmission and reception of wireless signals generated by the base station apparatus 820. The eNB 800 may include the plurality of antennas 810 as depicted in FIG. 22, and the plurality of antennas 810 may correspond to a plurality of frequency bands used by the eNB 800, for example. Note that, while FIG. 22 depicts an example of the eNB 800 which includes the plurality of antennas 810, the eNB 800 may have the single antenna 810.

The base station apparatus 820 includes a controller 821, a memory 822, a network interface 823, and a wireless communication interface 825.

The controller 821 may be a CPU or a DSP, for example, and allows operations of various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data received from a plurality of baseband processors, and transfer the generated bundled packet. In addition, the controller 821 may have a logical function for executing controls such as radio resource control, radio bearer control, mobility management, admission control, and scheduling. In addition, these controls may be executed in cooperation with a peripheral eNB or a core network node. The memory 822 includes a RAM or a ROM, and stores programs executed by the controller 821, and various types of control data (e.g., terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 and the core network node or the other eNB may be connected to each other via a logical interface (e.g., S1 interface or X2 interface). The network interface 823 may be a wired communication interface, or a wireless communication interface for wireless backhaul. In a case where the network interface 823 is a wireless communication interface, the network interface 823 may use, for wireless communication, a frequency band higher than the frequency band used by the wireless communication interface 825.

The wireless communication interface 825 supports any cellular communication method such as LTE (Long Term Evolution) and LTE-Advanced, and provides wireless connection for a terminal positioned in a cell of the eNB 800 via the antenna 810. The wireless communication interface 825 may typically include a baseband (BB) processor 826, an RF circuit 827 and the like. For example, the BB processor 826 may perform encoding/decoding, modulation/demodulation, multiplexing/demultiplexing and the like, and executes various signal processes for respective layers (e.g., L1, MAC (Medium Access Control), RLC (Radio Link Control), and PDCP (Packet Data Convergence Protocol)). The BB processor 826 may have a part of all of the logical functions described above in place of the controller 821. The BB processor 826 may be a module including a memory storing a communication control program, a processor for executing the program, and an associated circuit. The function of the BB processor 826 may be changed by update of the program. In addition, the module may be a card or a blade inserted into a slot of the base station apparatus 820, or may be a chip mounted on the card or the blade. On the other hand, the RF circuit 827 may include a mixer, a filter, an amplifier and the like, and transmits and receives wireless signals via the antenna 810.

As depicted in FIG. 22, the wireless communication interface 825 may include a plurality of the BB processors 826, and the plurality of BB processors 826 may correspond to a plurality of frequency band ranges used by the eNB 800, for example. In addition, as depicted in FIG. 22, the wireless communication interface 825 may include a plurality of the RF circuits 827, and the plurality of RF circuits 827 may correspond to a plurality of antenna elements, for example. Note that, while FIG. 22 depicts the example of the wireless communication interface 825 which includes the plurality of BB processors 826 and the plurality of RF circuits 827, the wireless communication interface 825 may include the single BB processor 826 and the single RF circuit 827.

In the eNB 800 depicted in FIG. 22, one or more components of the upper layer processing unit 101 and the control unit 103 described with reference to FIG. 5 may be mounted on the wireless communication interface 825. Alternatively, at least a part of these components may be mounted on the controller 821. In an example, a part (e.g., BB processor 826) or all of the wireless communication interface 825, and/or modules including the controller 821 may be mounted on the eNB 800, and the one or more components described above may be mounted on the module. In this case, the module may store a program under which the processor functions as the one or more components described above (i.e., program under which the processor executes operations of the one or more components described above), and execute the program. In another example, a program under which the processor functions as the one or more components described above may be installed in the eNB 800, and the wireless communication interface 825 (e.g., BB processor 826) and/or the controller 821 may execute the program. In this manner, the eNB 800, the base station apparatus 820, or the module may be provided as an apparatus including the one or more components described above, or the program under which the processor functions as the one or more components described above may be provided. In addition, a readable recording medium in which the program is recorded may be provided.

In addition, in the eNB 800 depicted in FIG. 22, the reception unit 105 and the transmission unit 107 described with reference to FIG. 5 may be mounted on the wireless communication interface 825 (e.g., RF circuit 827). Moreover, the transmission and reception antenna 109 may be mounted on the antenna 810. Furthermore, the network communication unit 130 may be mounted on the controller 821 and/or the network interface 823.

Second Application Example

Figure 23:
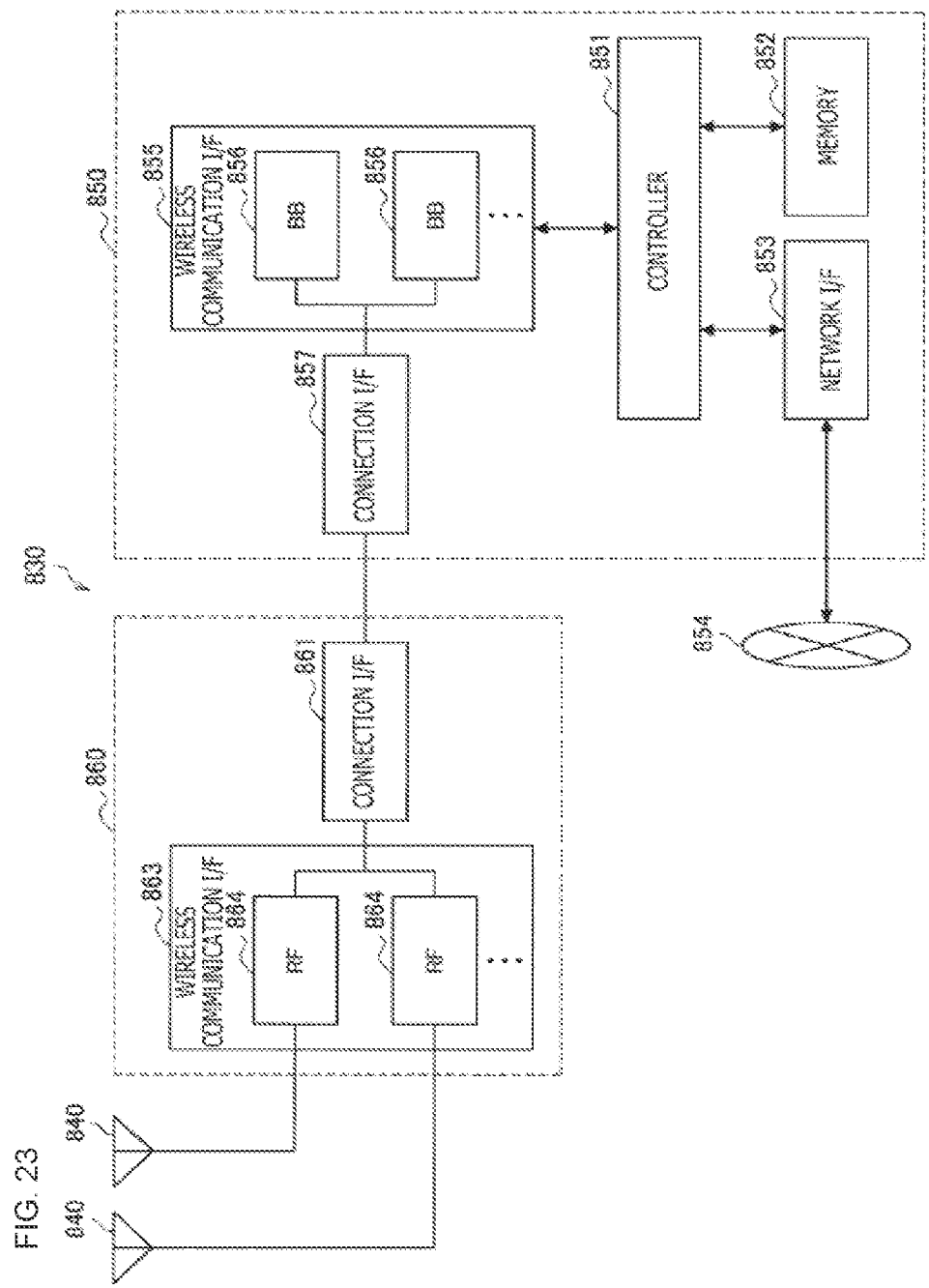
FIG. 23 is a block diagram depicting a second example of the schematic configuration of eNB.

FIG. 23 is a block diagram depicting a second example of the schematic configuration of the eNB to which the technology of the present disclosure is applicable. An eNB 830 includes one or more antennas 840, a base station apparatus 850, and an RRH 860. The respective antennas 840 and the RRH 860 may be connected to each other via an RF cable. In addition, the base station apparatus 850 and the RRH 860 may be connected to each other via a high-speed line such as an optical fiber cable. Each of the antennas 840 includes a single or a plurality of antenna elements (e.g., a plurality of antenna elements constituting a MIMO antenna), and is used for transmission and reception of wireless signals generated by the RRH 860. The eNB 830 may include the plurality of antennas 840 as depicted in FIG. 23, and the plurality of antennas 840 may correspond to a plurality of frequency bands used by the eNB 830, for example. Note that, while FIG. 23 depicts an example of the eNB 830 which includes the plurality of antennas 840, the eNB 830 may have the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports any cellular communication method such as LTE and LTE-Advanced, and provides wireless connection for a terminal positioned in a sector corresponding to the RRH 860 via the RRH 860 and the antenna 840. The wireless communication interface 855 may typically include a BB processor 856 and the like. The BB processor 856 is similar to the BB processor 826 described with reference to FIG. 22 except that the BB processor 856 is connected to the RF circuit 864 of the RRH 860 via the connection interface 857. As depicted in FIG. 22, the wireless communication interface 855 may include a plurality of the BB processors 856, and the plurality of BB processors 856 may correspond to a plurality of frequency band ranges used by the eNB 830, for example. Note that, while FIG. 23 depicts the example of the wireless communication interface 855 which includes the plurality of BB processors 856, the wireless communication interface 855 may include the single BB processor 856.

The connection interface 857 is an interface for connecting the base station apparatus 850 (wireless communication interface 855) to the RRH 860. The connection interface 857 may be a communication module which connects the base station apparatus 850 (wireless communication interface 855) and the RRH 860 for communication via the high-speed circuit described above.

In addition, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication by the high-speed circuit described above.

The wireless communication interface 863 transmits and receives wireless signals via the antennas 840. The wireless communication interface 863 may typically include an RF circuit 864 and the like. The RF circuit 864 may include a mixer, a filter, an amplifier and the like, and transmits and receives wireless signals via the antenna 840. As depicted in FIG. 23, the wireless communication interface 863 may include a plurality of the RF circuits 864, and the plurality of RF circuits 864 may correspond to a plurality of antenna elements, for example. Note that, while FIG. 23 depicts the example of the wireless communication interface 863 which includes the plurality of RF circuits 864, the wireless communication interface 863 may include the single RF circuit 864.

In the eNB 830 depicted in FIG. 23, one or more components of the upper layer processing unit 101 and the control unit 103 described with reference to FIG. 5 may be mounted on the wireless communication interface 855 and/or the wireless communication interface 863. Alternatively, at least a part of these components may be mounted on the controller 851. In an example, a module including a part (e.g., BB processor 856) or all of the wireless communication interface 855, and/or the controller 851 may be mounted on the eNB 830. The one or more components described above may be mounted on the module. In this case, the module may store a program under which the processor functions as the one or more components described above (i.e., program under which the processor executes operations of the one or more components described above), and execute the program. In another example, a program under which the processor functions as the one or more components described above may be installed in the eNB 830, and the wireless communication interface 855 (e.g., BB processor 856) and/or the controller 851 may execute the program. In this manner, the eNB 830, the base station apparatus 850, or the module may be provided as an apparatus including the one or more components described above, or the program under which the processor functions as the one or more components described above may be provided. In addition, a readable recording medium in which the program is recorded may be provided.

In addition, in the eNB 830 depicted in FIG. 23, the reception unit 105 and the transmission unit 107 described with reference to FIG. 5 may be mounted on the wireless communication interface 863 (e.g., RF circuit 864), for example. Moreover, the transmission and reception antenna 109 may be mounted on the antenna 840. Furthermore, the network communication unit 130 may be mounted on the controller 851 and/or the network interface 853.

2.2. Application Example of Terminal Apparatus

First Application Example

Figure 24:
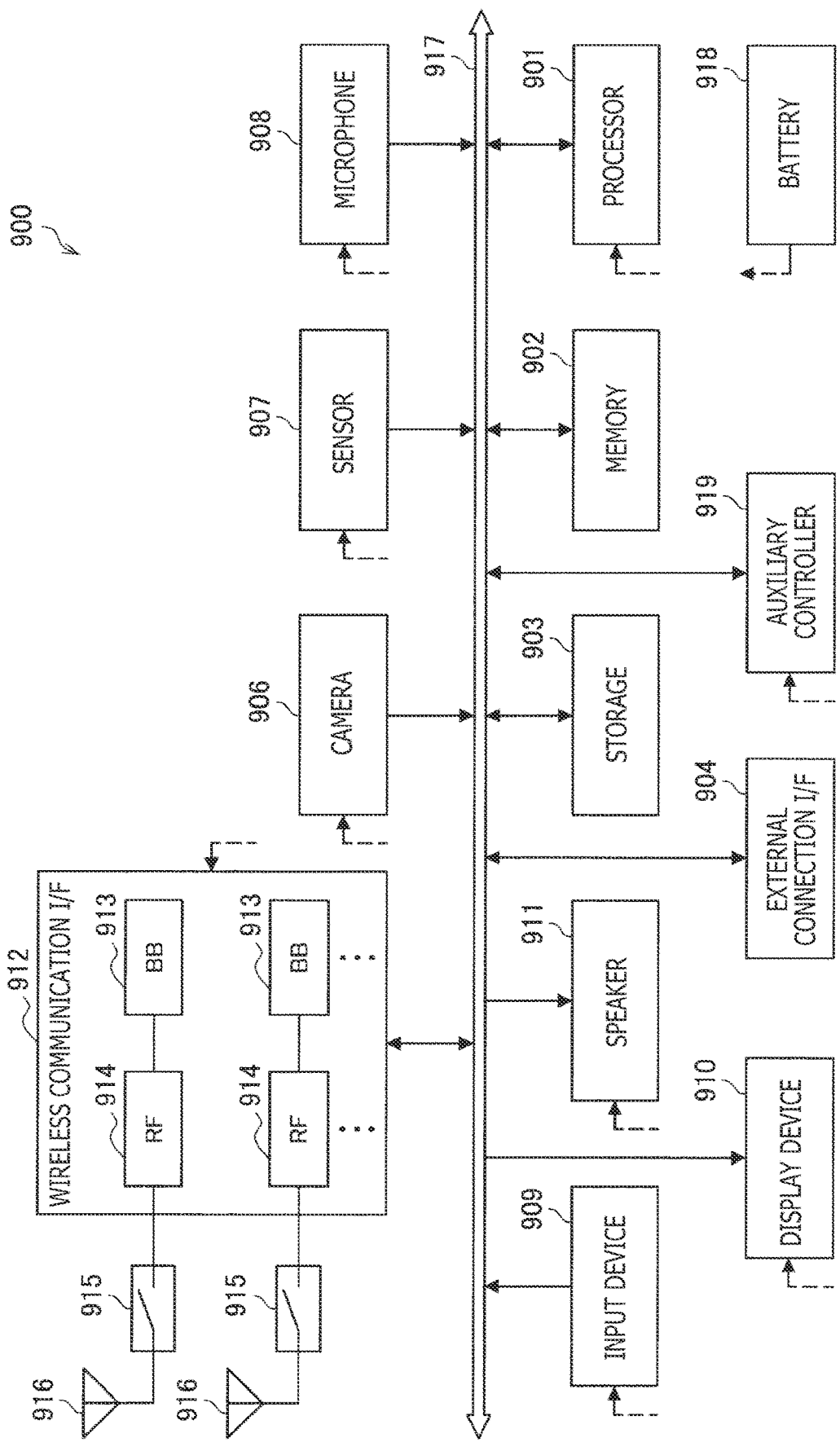
FIG. 24 is a block diagram depicting an example of a schematic configuration of a smartphone.

FIG. 24 is a block diagram depicting an example of a schematic configuration of a smartphone 900 to which the technology of the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and auxiliary controller 919.

The processor 901 may be a CPU or a SoC (System on Chip), for example, and controls functions of an application layer and other layers of the smartphone 900. The memory 902 includes a RAM and a ROM, and stores programs executed by the processor 901 and data. The storage 903 may include a storage medium such as a semiconductor memory and a hard disk. The external connection interface 904 is an interface for connecting an external device such as a memory card and a USB (Universal Serial Bus) device to the smartphone 900.

For example, the camera 906 includes an imaging device such as a CCD (Charge Coupled Device) and a CMOS (Complementary Metal Oxide Semiconductor), and generates a captured image. For example, the sensor 907 may include sensors such as a positioning sensor, a gyro sensor, a geomagnetic sensor, and an acceleration sensor. The microphone 908 converts voices input to the smartphone 900 into audio signals. For example, the input device 909 includes a touch sensor for detecting a touch on a screen of the display device 910, a keypad, a keyboard, buttons or switches, and others, and receives an operation or an information input from a user. The display device 910 has a screen such as a liquid crystal display (LCD) and an organic light emitting diode (OLED) display, and displays an output image of the smartphone 900. The speaker 911 converts audio signals output from the smartphone 900 into voices.

The wireless communication interface 912 supports any cellular communication method such as LTE and LTE-Advanced, and executes wireless communication. The wireless communication interface 912 may typically include a BB processor 913, an RF circuit 914 and the like. For example, the BB processor 913 may perform encoding/decoding, modulation/demodulation, multiplexing/demultiplexing and the like, and executes various signal processes for wireless communication. On the other hand, the RF circuit 914 may include a mixer, a filter, an amplifier and the like, and transmits and receives wireless signals via the antenna 916. The wireless communication interface 912 may be a one-chip module which integrates the BB processor 913 and the RF circuit 914. As depicted in FIG. 24, the wireless communication interface 912 may include a plurality of the BB processors 913 and a plurality of the RF circuits 914. Note that, while FIG. 24 depicts the example of the wireless communication interface 912 which includes the plurality of BB processors 913 and the plurality of RF circuits 914, the wireless communication interface 912 may include the single BB processor 913 and the single RF circuit 914.

In addition, the wireless communication interface 912 may support other types of wireless communication method such as a near field communication method, a proximity wireless communication method, and a wireless LAN (Local Area Network) method as well as the cellular communication method. In this case, the wireless communication interface 912 may include the BB processor 913 and the RF circuit 914 for each of the wireless communication methods.

Each of the antenna switches 915 switches a connection destination of the antenna 916 between a plurality of circuits included in the wireless communication interface 912 (e.g., circuits for different wireless communication methods).

Each of the antennas 916 includes a single or a plurality of antenna elements (e.g., a plurality of antenna elements constituting a MIMO antenna), and is used for transmission and reception of wireless signals through the wireless communication interface 912. As depicted in FIG. 24, the smartphone 900 may include a plurality of the antennas 916. Note that, while FIG. 24 depicts an example of the smartphone 900 which includes the plurality of antennas 916, the smartphone 900 may have the single antenna 916.

In addition, the smartphone 900 may include the antenna 916 for each of the wireless communication methods. In this case, the antenna switch 915 may be eliminated from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 with each other. The battery 918 supplies power to the respective blocks of the smartphone 900 depicted in FIG. 24 via a power supply line partially indicated by a broken line in the figure. For example, the auxiliary controller 919 allows operations of minimum necessary functions of the smartphone 900 in a sleep mode.

In the smartphone 900 depicted in FIG. 24, one or more components of the upper layer processing unit 201 and the control unit 203 described with reference to FIG. 6 described with reference to FIG. 6 may be mounted on the wireless communication interface 912. Alternatively, at least a part of these components may be mounted on the processor 901 or the auxiliary controller 919. In an example, a module of a part (e.g., BB processor 913) or all of the wireless communication interface 912, the processor 901, and/or the auxiliary controller 919 may be mounted on the smartphone 900. The one or more components described above may be mounted on the module. In this case, the module may store a program under which the processor functions as the one or more components described above (i.e., program under which the processor executes operations of the one or more components described above), and execute the program. In another example, a program under which the processor functions as the one or more components described above may be installed in the smartphone 900, and the wireless communication interface 912 (e.g., BB processor 913), the processor 901, and/or the auxiliary controller 919 may execute the program. In this manner, the smartphone 900 or the module may be provided as an apparatus including the one or more components described above, or the program under which the processor functions as the one or more components described above may be provided. In addition, a readable recording medium in which the program is recorded may be provided.

In addition, in the smartphone 900 depicted in FIG. 24, the reception unit 205 and the transmission unit 207 described with reference to FIG. 6 may be mounted on the wireless communication interface 912 (e.g., RF circuit 914), for example. Moreover, the transmission and reception antenna 209 may be mounted on the antenna 916.

Second Application Example

FIG. 25 is a block diagram depicting an example of a schematic configuration of a car navigation apparatus 920 to which the technology of the present disclosure is applicable. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be a CPU or a SoC, and controls a navigation function and other functions of the car navigation apparatus 920. The memory 922 includes a RAM and a ROM, and stores programs executed by the processor 921 and data.

The GPS module 924 measures a position of the car navigation apparatus 920 (e.g., latitude, longitude, and altitude) using a GPS signal received from a GPS satellite. For example, the sensor 925 may include sensors such as a gyro sensor, a geomagnetic sensor, and a pressure sensor. For example, the data interface 926 is connected to an in-vehicle network 941 via a not-shown terminal, and acquires data generated by a vehicle such as vehicle speed data.

The content player 927 reproduces content stored in a storage medium (e.g., CD or DVD) inserted into the storage medium interface 928. For example, the input device 929 includes a touch sensor for detecting a touch on a screen of the display device 930, buttons or switches, and others, and receives an operation or an information input from a user. The display device 930 has a screen such as an LCD and an OLED display, and displays a navigation function or an image of content to be reproduced. The speaker 931 outputs the navigation function or voices of convent to be reproduced.

The wireless communication interface 933 supports any cellular communication method such as LTE and LTE-Advanced, and executes wireless communication. The wireless communication interface 933 may typically include a BB processor 934, an RF circuit 935 and the like. For example, the BB processor 934 may perform encoding/decoding, modulation/demodulation, multiplexing/demultiplexing and the like, and executes various signal processes. On the other hand, the RF circuit 935 may include a mixer, a filter, an amplifier and the like, and transmits and receives wireless signals via the antenna 937. The wireless communication interface 933 may be a one-chip module which integrates the BB processor 934 and the RF circuit 935. As depicted in FIG. 25, the wireless communication interface 933 may include a plurality of the BB processors 934 and a plurality of the RF circuits 935. Note that, while FIG. 25 depicts the example of the wireless communication interface 933 which includes the plurality of BB processors 934 and the plurality of RF circuits 935, the wireless communication interface 933 may include the single BB processor 934 and the single RF circuit 935.

In addition, the wireless communication interface 933 may support other types of wireless communication method such as a near field communication method, a proximity wireless communication method, and a wireless LAN method as well as the cellular communication method. In this case, the wireless communication interface 933 may include the BB processor 934 and the RF circuit 935 for each of the wireless communication methods.

Each of the antenna switches 936 switches a connection destination of the antenna 937 between a plurality of circuits included in the wireless communication interface 933 (e.g., circuits for different wireless communication methods).

Each of the antennas 937 includes a single or a plurality of antenna elements (e.g., a plurality of antenna elements constituting a MIMO antenna), and is used for transmission and reception of wireless signals through the wireless communication interface 933. As depicted in FIG. 25, the car navigation apparatus 920 may include a plurality of the antennas 937. Note that, while FIG. 25 depicts an example of the car navigation apparatus 920 which includes the plurality of antennas 937, the car navigation apparatus 920 may have the single antenna 937.

In addition, the car navigation apparatus 920 may include the antenna 937 for each of the wireless communication methods. In this case, the antenna switch 936 may be eliminated from the configuration of the car navigation apparatus 920.

The battery 938 supplies power to the respective blocks of the car navigation apparatus 920 depicted in FIG. 25 via a power supply line partially indicated by a broken line in the figure. In addition, the battery 938 accumulates power supplied from the vehicle.

In the car navigation apparatus 920 depicted in FIG. 25, one or more components of the upper layer processing unit 201 and the control unit 203 described with reference to FIG. 6 described with reference to FIG. 6 may be mounted on the wireless communication interface 933. Alternatively, at least a part of these components may be mounted on the processor 921. In an example, a module which includes a part (e.g., BB processor 934) or all of the wireless communication interface 933, and/or the processor 921 may be mounted on the car navigation apparatus 920. The one or more components described above may be mounted on the module. In this case, the module may store a program under which the processor functions as the one or more components described above (i.e., program under which the processor executes operations of the one or more components described above), and execute the program. In another example, a program under which the processor functions as the one or more components described above may be installed in the car navigation apparatus 920. The wireless communication interface 933 (e.g., BB processor 934), and/or the processor 921 may execute the program. In this manner, the car navigation apparatus 920 or the module may be provided as an apparatus including the one or more components described above, or the program under which the processor functions as the one or more components described above may be provided. In addition, a readable recording medium in which the program is recorded may be provided.

In addition, in the car navigation apparatus 920 depicted in FIG. 25, for example, the reception unit 205 and the transmission unit 207 described with reference to FIG. 6 may be mounted on the wireless communication interface 933 (e.g., RF circuit 935). Moreover, the transmission and reception antenna 209 may be mounted on the antenna 937.

In addition, the technology according to the present disclosure may be implemented as an in-vehicle system (or vehicle) 940 which includes one or more blocks of the car navigation apparatus 920 described above, an in-vehicle network 941, and a vehicle-side module 942. In other words, the in-vehicle system (or vehicle) 940 may be provided as an apparatus which includes at least any one of the upper layer processing unit 201, the control unit 203, the reception unit 205, or the transmission unit 207. The vehicle-side module 942 generates vehicle-side data such as a vehicle speed, an engine rotation speed, and failure information, and outputs the generated data to the in-vehicle network 941.

3. CONCLUSION

As described above, in the wireless communication system according to the present embodiment, the base station apparatus performs control such that a plurality of reference signals associated with respective pieces of antenna information different from each other is transmitted to the terminal apparatus. In addition, the base station apparatus acquires control information corresponding to at least any one of the plurality of reference signals (e.g., information corresponding to the reference signal selected by the terminal apparatus) from the terminal apparatus after the random access response in the random access procedure is transmitted to the terminal apparatus. Moreover, the base station apparatus controls following communication with the terminal apparatus on the basis of the antenna information corresponding to the acquired control information.

According to the wireless communication system of the present embodiment thus configured, the base station apparatus is capable of using a plurality of beams (e.g., best beam and one or more best beams next to the best beam) during communication with the terminal apparatus after the random access response in the random access procedure in the plural beam operation. In this case, the base station apparatus is capable of using a plurality of beams in downlink transmission of the message 4 and following messages in the random access procedure. Accordingly, in the wireless communication system of the present embodiment, robustness for propagation losses produced by a shield or the like of wireless signals can be secured more than in a case where only one beam is used, wherefore a procedure of an initial access can be completed more stably and rapidly.

In addition, according to the wireless communication system of the present embodiment, the base station apparatus comes into a state where a plurality of beams is usable for communication with the terminal apparatus before completion of the procedure of the initial access. Accordingly, the base station apparatus is capable of immediately starting communication using a plurality of beams without the necessity of performing a procedure to use a plurality of beams after completion of the procedure of the initial access.

In addition, according to the wireless communication system of the present embodiment as described above, correspondence (i.e., QCL) between various transmission signals and respective beams can be appropriately controlled in accordance with various conditions during communication with the terminal apparatus using a plurality of beams after the random access response.

While the preferred embodiment according to the present disclosure has been described above in detail with reference to the accompanying drawings, the technical range of the present disclosure is not limited to this example. It is apparent that various modified examples or correction examples within a scope of the technical spirit described in the claims may occur to those having ordinary knowledges in the technical field of the present disclosure. It is therefore understood that these examples obviously fall within the technical range of the present disclosure.

In addition, advantageous effects described in the present description are presented only for explanation or as examples. Advantageous effects to be produced therefore are not limited to these effects. Accordingly, the technology of the present disclosure may offer other advantageous effects obvious to those skilled in the art in the light of the description of the present description in addition to or in place of the advantageous effects described above.

Note that following configurations also fall within the technical range of the present disclosure.

(1)

A communication apparatus including:

a control unit that performs control such that a plurality of reference signals associated with pieces of antenna information different from each other is transmitted to a terminal apparatus; and an acquisition unit that acquires control information corresponding to at least any one of the plurality of reference signals from the terminal apparatus after a random access response in a random access procedure is transmitted to the terminal apparatus, in which the control unit controls following communication with the terminal apparatus on the basis of the antenna information corresponding to the acquired control information.

(2)

The communication apparatus according to (1) described above, in which the control unit controls setting of an antenna associated with communication with the terminal apparatus on the basis of the acquired control information after acquisition of the control information in the random access procedure.

(3)

The communication apparatus according to (1) or (2) described above, in which the acquisition unit acquires the control information corresponding to two or more of the plurality of reference signals from the terminal apparatus; and the control unit determines two or more pieces of the antenna information used for communication with the terminal apparatus in accordance with the acquired control information.

(4)

The communication apparatus according to any one of (1) to (3) described above, in which the control unit determines first antenna information associated with communication with the terminal apparatus before transmission of the random access response to the terminal apparatus in the random access procedure;

determines second antenna information associated with communication with the terminal apparatus on the basis of the acquired control information after transmission of the random access response; and controls communication with the terminal apparatus after acquisition of the control information on the basis of at least either the first antenna information or the second antenna information.

(5)

The communication apparatus according to (4) described above, in which the control unit controls communication with the terminal apparatus on the basis of the first antenna information before transmission of the random access response; and controls communication with the terminal apparatus on the basis of the second antenna information after transmission of the random access response.

(6)

The communication apparatus according to (4) described above, in which, in communication with the terminal apparatus after acquisition of the control information, the control unit controls communication with the terminal apparatus on the basis of the first antenna information in a case of initial transmission of transmission data, and controls communication with the terminal apparatus on the basis of the second antenna information in a case of retransmission of the transmission data.

(7)

The communication apparatus according to (4) described above, in which the control unit controls communication with the terminal apparatus on the basis of the first antenna information in a case of transmission of a signal via a physical channel belonging to a first search space, and controls communication with the terminal apparatus on the basis of the second antenna information in a case of transmission of a signal via a physical channel belonging to a second search space different from the first search space.

(8)

The communication apparatus according to (4) described above, in which the control unit controls communication with the terminal apparatus on the basis of the first antenna information in a case of transmission of a signal using a first symbol, and controls communication with the terminal apparatus on the basis of the second antenna information in a case of transmission of a signal using a second symbol different from the first symbol.

(9)

The communication apparatus according to any one of (1) to (8) described above, in which the control unit performs control such that a plurality of synchronization signal blocks as the plurality of reference signals is transmitted to a terminal apparatus within a communication range.

(10)

The communication apparatus according to any one of (1) to (8) described above, in which the control unit performs control such that a notice of information associated with respective transmission conditions of the plurality of reference signals is given to the terminal apparatus; and performs control such that the plurality of reference signals is transmitted to the terminal apparatus in accordance with the transmission conditions.

(11)

The communication apparatus according to any one of (1) to (10) described above, in which the control unit performs control such that directivity of a transmission signal associated with communication with the terminal apparatus becomes higher than directivity of the reference signals.

(2)

The communication apparatus according to any one of (1) to (11) described above, in which the antenna information includes information associated with setting of at least any one of a channel, a path, an antenna, or an antenna port.

(13)

A communication apparatus including:

a selection unit that selects at least a part of a plurality of reference signals transmitted from a base station and associated with pieces of antenna information different from each other, the part of the plurality of reference signals being selected in accordance with a reception result of the reference signals; and a notice unit that gives a notice of control information corresponding to the selected reference signal to the base station after reception of a random access response transmitted from the base station in a random access procedure.

(14)

The communication apparatus according to (13) described above, in which the selection unit performs predetermined measurement for each of the plurality of reference signals, and selects at least a part of the reference signals in accordance with a result of the measurement.

(15)

The communication apparatus according to (14) described above, in which the selection unit measures at least either communication quality or reception power of the reference signals for the measurement.

(16)

The communication apparatus according to (14) or (15) described above, in which the notice unit gives a notice of control information corresponding to a first reference signal selected from the plurality of reference signals to the base station before reception of the random access response, and gives a notice of control information corresponding to a difference of a result of the measurement between the first reference signal and a second reference signal different from the first reference signal and selected from the plurality of reference signals to the base station after reception of the random access response.

(17)

The communication apparatus according to any one of (13) to (16) described above, in which the notice unit gives a notice of control information corresponding to two or more selected reference signals to the base station after reception of the random access response.

(18)

A communication method performed by a computer, the method including:

performing control such that a plurality of reference signals associated with pieces of antenna information different from each other is transmitted to a terminal apparatus;

acquiring control information corresponding to at least any one of the plurality of reference signals from the terminal apparatus after a random access response in a random access procedure is transmitted to the terminal apparatus; and controlling following communication with the terminal apparatus on the basis of the antenna information corresponding to the acquired control information.

(19)

A communication method performed by a computer, the method including:

selecting at least a part of a plurality of reference signals transmitted from a base station and associated with pieces of antenna information different from each other, the part of the plurality of reference signals being selected in accordance with a reception result of the reference signals; and giving a notice of control information corresponding to the selected reference signal to the base station after reception of a random access response transmitted from the base station in a random access procedure.

(20)

A program under which a computer executes:

performing control such that a plurality of reference signals associated with pieces of antenna information different from each other is transmitted to a terminal apparatus;

acquiring control information corresponding to at least any one of the plurality of reference signals from the terminal apparatus after a random access response in a random access procedure is transmitted to the terminal apparatus; and controlling following communication with the terminal apparatus on the basis of the antenna information corresponding to the acquired control information.

(21)

A program under which a computer executes:

selecting at least a part of a plurality of reference signals transmitted from a base station and associated with pieces of antenna information different from each other, the part of the plurality of reference signals being selected in accordance with a reception result of the reference signals; and giving a notice of control information corresponding to the selected reference signal to the base station after reception of a random access response transmitted from the base station in a random access procedure.

REFERENCE SIGNS LIST

1 Base station apparatus
101 Upper layer processing unit
103 Control unit
105 Reception unit
1051 Decoding unit
1053 Demodulation unit
1055 Demultiplexing unit
1057 Wireless reception unit
1059 Channel measurement unit
107 Transmission unit
1071 Encoding unit
1073 Modulation unit
1075 Multiplexing unit
1077 Wireless transmission unit
1079 Link reference signal generation unit
109 Transmission and reception antenna
130 Network communication unit
2 Terminal apparatus
201 Upper layer processing unit
203 Control unit
205 Reception unit
2051 Decoding unit 2053 Demodulation unit
2055 Demultiplexing unit
2057 Wireless reception unit
2059 Channel measurement unit
207 Transmission unit
2071 Encoding unit
2073 Modulation unit
2075 Multiplexing unit
2077 Wireless transmission unit
2079 Link reference signal generation unit
209 Transmission and reception antenna

The invention claimed is:

1. A communication method, comprising:
in a communication apparatus:
controlling transmission of a plurality of reference signals associated with antenna information to a terminal apparatus, wherein the plurality of reference signals is different from one another;
determining first antenna information regarding communication with the terminal apparatus prior to a transmission of a random access response to the terminal apparatus in a random access procedure;
acquiring control information corresponding to at least one of the plurality of reference signals from the terminal apparatus subsequent to the transmission of the random access response in the random access procedure to the terminal apparatus;
determining second antenna information regarding the communication with the terminal apparatus based on the acquired control information;
communicating with the terminal apparatus based on at least one of the first antenna information or the second antenna information, wherein the communication with the terminal apparatus is associated with a reference signal of the plurality of reference signals and a DMRS; and
switching a quasi-co-location (QCL) based on the reference signal and the DMRS that is transmitted according to a determined condition.

2. The communication method according to claim 1, wherein the QCL is switched before beam adjustment prior to the transmission of the random access response and after the beam adjustment subsequent to the transmission of the random access response.

3. The communication method according to claim 1, wherein the QCL is switched at a time of initial transmission of transmission data and retransmission of the transmission data in a case where the retransmission is performed in the communication between the communication apparatus and the terminal apparatus.

4. The communication method according to claim 1, wherein the QCL is switched based on one of a search space in which the DMRS is arranged or a resource to which the DMRS is transmitted.

5. The communication method according to claim 1, further comprising:
controlling the communication with the terminal apparatus based on the first antenna information before the transmission of the random access response; and
controlling the communication with the terminal apparatus based on the second antenna information after the transmission of the random access response.

6. The communication method according to claim 1, further comprising:
controlling the communication with the terminal apparatus based on the first antenna information in a case of initial transmission of transmission data; and
controlling the communication with the terminal apparatus based on the second antenna information in a case of retransmission of the transmission data.

7. The communication method according to claim 1, further comprising:
controlling the communication with the terminal apparatus based on the first antenna information in a case of transmission of a first reference signal of the plurality of reference signals via a physical channel of a first search space; and
controlling the communication with the terminal apparatus based on the second antenna information in a case of transmission of a second reference signal of the plurality of reference signals via a physical channel of a second search space different from the first search space.

8. The communication method according to claim 1, further comprising:
controlling the communication with the terminal apparatus based on the first antenna information in a case of transmission of a first reference signal of the plurality of reference signals using a first symbol; and
controlling the communication with the terminal apparatus based on the second antenna information in a case of transmission of a second reference signal of the plurality of reference signals using a second symbol different from the first symbol.

9. The communication method according to claim 1, further comprising setting at least one parameter of an antenna for the communication with the terminal apparatus based on the acquired control information after the acquisition of the control information in the random access procedure.

10. The communication method according to claim 1, further comprising:
acquiring the control information corresponding to a first reference signal of the plurality of reference signals and a second reference signal of the plurality of reference signals from the terminal apparatus; and
determining the antenna information for the communication with the terminal apparatus based on the acquired control information corresponding to the first reference signal and the second reference signal.

11. The communication method according to claim 1, further comprising controlling communication of a plurality of synchronization signal blocks as the plurality of reference signals to the terminal apparatus, wherein the terminal apparatus is within a communication range of the communication apparatus.

12. The communication method according to claim 1, further comprising:
controlling communication of a notice of information associated with respective transmission condition of a plurality of transmission conditions corresponding to each of the plurality of reference signals to the terminal apparatus; and
controlling the communication of the plurality of reference signals to the terminal apparatus based on the plurality of transmission conditions.

13. The communication method according to claim 1, wherein the antenna information includes information associated with at least one of a channel, a path, an antenna, or an antenna port.

14. A communication apparatus, comprising:
circuitry configured to:
control transmission of a plurality of reference signals associated with antenna information to a terminal apparatus, wherein the plurality of reference signals is different from one another;
determine first antenna information regarding communication with the terminal apparatus prior to a transmission of a random access response to the terminal apparatus in a random access procedure;
acquire control information corresponding to at least one of the plurality of reference signals from the terminal apparatus subsequent to the transmission of the random access response in the random access procedure to the terminal apparatus;
determine second antenna information regarding the communication with the terminal apparatus based on the acquired control information;
communicate with the terminal apparatus based on at least one of the first antenna information or the second antenna information, wherein the communication with the terminal apparatus is associated with a reference signal of the plurality of reference signals and a DMRS; and
switch a quasi-co-location (QCL) based on the reference signal and the DMRS that is transmitted according to a determined condition.

15. A communication apparatus, comprising:
circuitry configured to:
receive a plurality of reference signals associated with antenna information from a base station, wherein
the plurality of reference signals is different from one another, and
the base station communicates with the communication apparatus based on at least one of first antenna information or second antenna information;
execute a measurement for each of the plurality of reference signals received from the base station;
select at least one reference signal of the plurality of reference signals based on a result of the measurement;
receive a random access response in a random access procedure from the base station; and
transmit a notice of control information corresponding to the selected at least one reference signal to the base station after the reception of the random access response from the base station in the random access procedure, wherein
the base station determines the first antenna information regarding communication with the communication apparatus prior to a transmission of the random access response, determines the second antenna information regarding the communication with the communication apparatus based on the control information, and switches a quasi-co-location (QCL) based on a reference signal of the plurality of reference signals and a DMRS that is transmitted according to a determined condition.

16. The communication apparatus according to claim 15, wherein the circuitry is further configured to execute the measurement of one of a communication quality or a reception power of the plurality of reference signals.

17. A communication method, comprising:
in a terminal apparatus:
receiving a plurality of reference signals associated with antenna information from a base station, wherein
the plurality of reference signals is different from one another, and
the base station communicates with the terminal apparatus based on at least one of first antenna information or second antenna information;
executing a measurement for each of the plurality of reference signals received from the base station;
selecting at least one reference signal of the plurality of reference signals based on a result of the measurement;
receiving a random access response in a random access procedure from the base station; and
transmitting a notice of control information corresponding to the selected at least one reference signal to the base station after the reception of the random access response from the base station in the random access procedure, wherein
the base station determines the first antenna information regarding communication with the terminal apparatus prior to a transmission of the random access response, determines the second antenna information regarding the communication with the terminal apparatus based on the control information, and switches a quasi-co-location (QCL) based on a reference signal of the plurality of reference signals and a DMRS that is transmitted according to a determined condition.

* * * * *